US009446314B2

(12) United States Patent
Spagnola

(10) Patent No.: US 9,446,314 B2
(45) Date of Patent: Sep. 20, 2016

(54) VECTOR-BASED GAMING CONTENT MANAGEMENT

(71) Applicant: Pearson Education, Inc., Upper Saddle River, NJ (US)

(72) Inventor: Perry M. Spagnola, Phoenix, AZ (US)

(73) Assignee: PEARSON EDUCATION, INC., Upper Saddle River, NJ (US)

( * ) Notice: Subject to any disclaimer, the term of this patent is extended or adjusted under 35 U.S.C. 154(b) by 0 days.

(21) Appl. No.: 14/524,948

(22) Filed: Oct. 27, 2014

(65) Prior Publication Data

US 2015/0119120 A1 Apr. 30, 2015

Related U.S. Application Data

(63) Continuation-in-part of application No. 14/154,050, filed on Jan. 13, 2014, and a continuation-in-part of application No. 14/137,890, filed on Dec. 20, 2013, and a continuation-in-part of application No. 14/089,432, filed on Nov. 25, 2013.

(60) Provisional application No. 61/895,556, filed on Oct. 25, 2013.

(51) Int. Cl.
G09B 19/00 (2006.01)
A63F 13/67 (2014.01)
G09B 7/00 (2006.01)
A63F 13/798 (2014.01)
A63F 13/352 (2014.01)

(52) U.S. Cl.
CPC ............. *A63F 13/67* (2014.09); *A63F 13/798* (2014.09); *G09B 7/00* (2013.01); *A63F 13/352* (2014.09)

(58) Field of Classification Search
None
See application file for complete search history.

(56) References Cited

U.S. PATENT DOCUMENTS

| 4,175,339 | A | 11/1979 | Jones |
| 6,484,010 | B1 * | 11/2002 | Sheehan ..................... 434/362 |
| 6,808,392 | B1 | 10/2004 | Walton |
| 8,016,680 | B1 * | 9/2011 | Hutter et al. ................... 463/42 |
| 8,033,831 | B2 | 10/2011 | Julia et al. |
| 8,052,426 | B2 | 11/2011 | Snyder et al. |
| 8,641,424 | B2 | 2/2014 | Soldavini |
| 8,753,200 | B1 | 6/2014 | Supanc et al. |
| 2002/0160347 | A1 | 10/2002 | Wallace |
| 2004/0009461 | A1 | 1/2004 | Snyder et al. |

(Continued)

OTHER PUBLICATIONS

Quantiles.com; The Quantile Framework for Mathematics; Feb. 18, 2006. [online], retrieved on Feb. 9, 2014]. Retrieved from the Wayback Machine, archive.org https://web.archive.org/web/20060218165157/http://www.quantiles.com/EntrancePageFlash.html?1.

(Continued)

*Primary Examiner* — Paul A D'Agostino
(74) *Attorney, Agent, or Firm* — Kilpatrick Townsend & Stockton LLP

(57) ABSTRACT

A method/apparatus/system for generation of a cross-dimensional gaming network is described herein. The gaming network contains a plurality of gaming objects each made of an aggregation of gaming content. The gaming objects of the gaming network are interconnected based on one or several skill levels embodied in the gaming content of the gaming objects. These skill levels can be based on the subject matter of the gaming content and/or can be independent of the subject matter of the gaming content. A new gaming object can be placed within the gaming network based on the skill level of the gaming object.

9 Claims, 21 Drawing Sheets

(56) References Cited

U.S. PATENT DOCUMENTS

| | | |
|---|---|---|
| 2004/0083229 A1 | 4/2004 | Porter |
| 2005/0060221 A1 | 3/2005 | Kolar et al. |
| 2006/0257841 A1 | 11/2006 | Mangano |
| 2007/0292826 A1 | 12/2007 | Goddy et al. |
| 2008/0040370 A1 | 2/2008 | Bosworth et al. |
| 2009/0075709 A1 | 3/2009 | Park |
| 2009/0170058 A1 | 7/2009 | Walker |
| 2009/0197237 A1 | 8/2009 | Couch et al. |
| 2010/0143873 A1* | 6/2010 | Keim et al. ............... 434/156 |
| 2011/0039242 A1 | 2/2011 | Packard et al. |
| 2011/0177480 A1 | 7/2011 | Menon et al. |
| 2011/0189643 A1 | 8/2011 | Hutchinson |
| 2011/0195389 A1 | 8/2011 | DeYoung et al. |
| 2012/0040326 A1 | 2/2012 | Larson-Rutter et al. |
| 2012/0231438 A1 | 9/2012 | Fakhrai |
| 2014/0024009 A1 | 1/2014 | Nealon et al. |
| 2014/0310729 A1 | 10/2014 | Chaniotakis |

OTHER PUBLICATIONS

First Action Interview Pilot Program Pre-Interview Communication mailed on Sep. 23, 2014 for U.S. Appl. No. 14/154,050, 4 pages.

Non-Final Office Action mailed on Feb. 13, 2014 for U.S. Appl. No. 14/089,432, 10 pages.

Non-Final Office Action mailed on Jul. 22, 2014 for U.S. Appl. No. 14/089,432, 5 pages.

First Action Interview Pilot Program Pre-Interview Communication mailed on Mar. 4, 2014 for U.S. Appl. No. 14/137,890, 4 pages.

Non-Final Office Action mailed on Aug. 8, 2014 for U.S. Appl. No. 14/137,890, 5 pages.

First Action Interview Pilot Program Pre-Interview Communication dated Sep. 3, 2015, in U.S. Appl. No. 14/788,228, 23 pages.

Applicant-Initiated Interview Summary dated Oct. 29, 2015, in U.S. Appl. No. 14/788,228, 13 pages.

\* cited by examiner

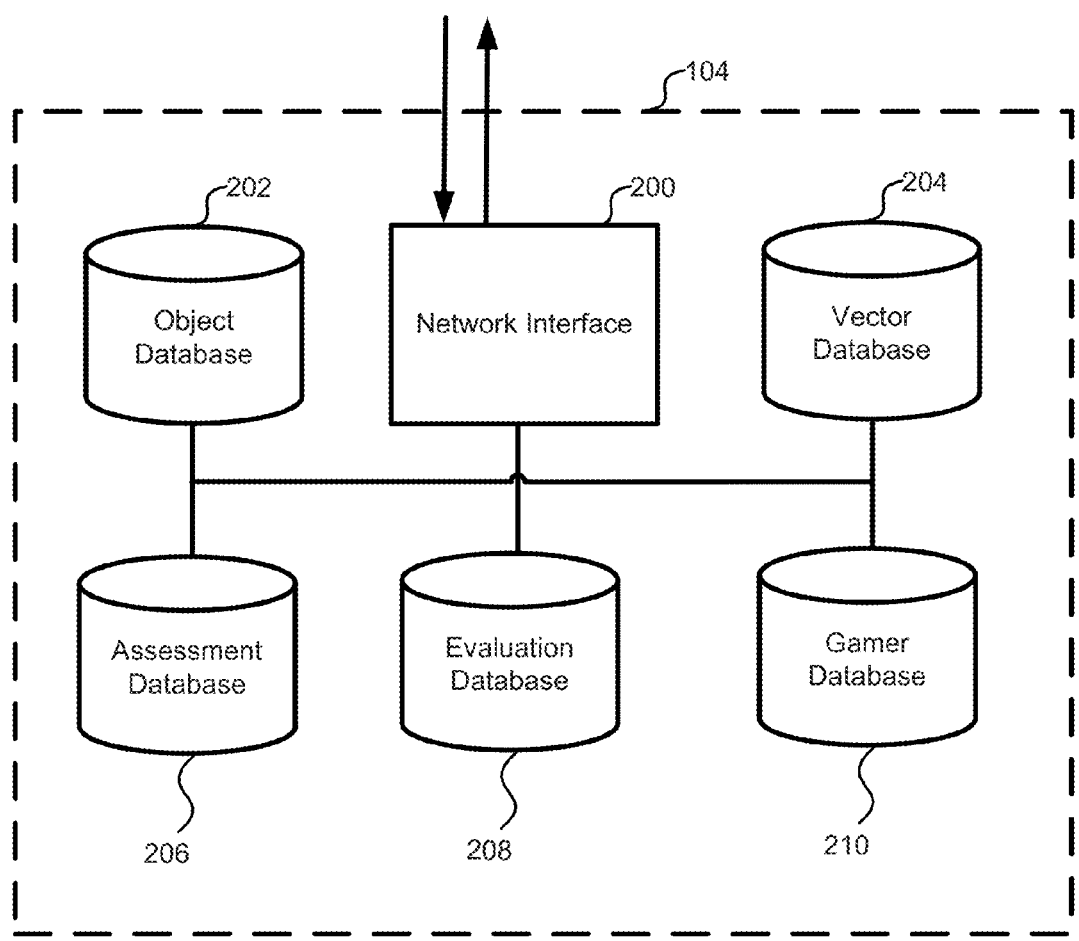
Fig. 2-A

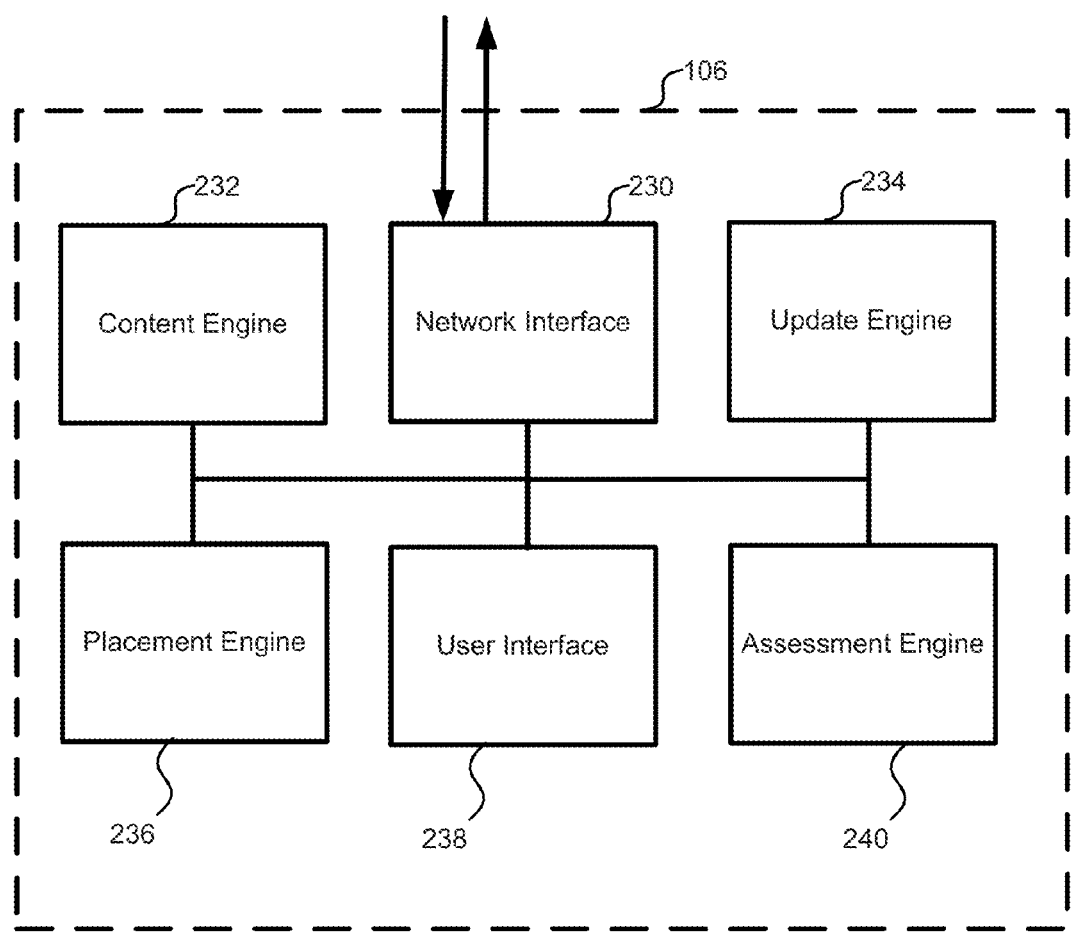
Fig. 2-B

VECTOR-BASED GAMING CONTENT MANAGEMENT

BACKGROUND OF THE INVENTION

This application is a Continuation-in-Part of U.S. application Ser. No. 14/154,050, filed on Jan. 13, 2014; a Continuation-in-Part of U.S. application Ser. No. 14/137,890, filed on Dec. 20, 2013; a Continuation-in-Part of U.S. application Ser. No. 14/089,432, filed on Nov. 25, 2013; and claims the benefit of U.S. Provisional Application No. 61/895,556, filed on Oct. 25, 2013, the entirety of each of which is hereby incorporated by reference herein.

BACKGROUND OF THE INVENTION

This disclosure relates in general to gaming and in particular to learning games. Some aspects of this disclosure relate to on-line or computerized gamified learning including, but without limitation to learning or instruction with a Learning Management System (LMS) and/or Online Homework System (OHS) and, but not by way of limitation, to assisting gamers using the LMS and/or OHS.

Numerous resources can be used in facilitating gamer achievement of an education goal. These resources can include, but not by way of limitation, instructional resources such as lectures, demonstrations, or example problems, practice resources such as practice problems or assignments, evaluation resources including, for example, a quiz, a test, or the like, and remediation resources. These resources are frequently provided according to a curriculum or syllabus. In particular, in the class-room environment, a syllabus identifies the resources that will be provided to a gamer and outlines the order in which resources will be provided to a gamer.

BRIEF SUMMARY OF THE INVENTION

One aspect of the present disclosure relates to a system for generating a request for improvement of a gaming object. The system includes a plurality of database servers that include a plurality of gaming objects including an aggregation of content associated with an assessment and information associated with the gaming objects, which information identifies an aspect of the therewith associated gaming object. The system can include a processor that can include instructions to identify a plurality of gaming objects, output a query requesting information relating to at least one of the plurality of gaming objects from at least one of the plurality of servers, receive an input from the at least one of the plurality of servers, which input can include information relating to at least one of the plurality of gaming objects, and identify a plurality of learning vectors, each of which plurality of learning vectors can connect two of the plurality of learning objects and identify a prerequisite relationship between the connected two of the plurality of learning objects. In some embodiments, each of the plurality of learning vectors can include a direction identifying the prerequisite relationship and a strength, which strength of the learning vector can be the aggregate of binary indicators based on a gamer experience with the learning vector. In some embodiments, the processor can include instructions to retrieve a strength threshold value, which strength threshold value indicates a minimum acceptable strength, compare the strength of at least some of the plurality of learning vectors to the strength threshold value, and assign a value to the learning vectors of the plurality of learning vectors according to a Boolean function. In some embodiments, a first value is assigned to one of the learning vectors of the plurality of learning vectors if the strength of the one of the learning vectors of the plurality of learning vectors exceeds the strength threshold value, and a second value is assigned to one of the learning vectors of the plurality of learning vectors if the strength of the one of the learning vectors of the plurality of learning vectors does not exceed the strength threshold value. In some embodiments, the processor can include instructions to output a message indicating a deficiency in a learning object if the learning vector associated with the learning object is assigned the second value.

In some embodiments, identifying a plurality of learning objects can include identifying the plurality of servers containing the plurality of gaming objects. In some embodiments, the plurality of gaming objects can include a first gaming object stored on a first server, and a second gaming object stored on a second server. In some embodiments, the first gaming object can be stored in a first database of the first server and the second gaming object can be stored in a second database of the second server.

In some embodiments, the processor can include instructions, such as coded instructions, to identify learning vectors assigned the second value and/or to relatively rank the plurality of learning vectors. In some embodiments, the processor relatively ranks the plurality of learning vectors according to the degree to which gamers successfully traverse the plurality of learning vectors. In some embodiments, the strength threshold value identifies a minimum acceptable relative rank.

One aspect of the present disclosure relates to a method for generating a request for improvement of a learning object. The method can include identifying a plurality of learning objects stored in at least one object database, each of which learning objects can include an aggregation of learning content that is associated with an assessment, identifying a plurality of learning vectors stored in at least one vector database, each of which plurality of learning vectors connects two of the plurality of learning objects and identifies a prerequisite relationship between the connected two of the plurality of learning objects, and each of which plurality of learning vectors includes a direction identifying the prerequisite relationship and a strength, which strength of the learning vector is the aggregate of binary indicators based on a student experience with the learning vector. In some embodiments, the method can include retrieving a strength threshold value, which strength threshold value indicates a minimum acceptable strength, comparing the strength of at least some of the plurality of learning vectors to the strength threshold value, and assigning a value to the learning vectors of the plurality of learning vectors according to a Boolean function. In some embodiments, a first value is assigned to one of the learning vectors of the plurality of learning vectors if the strength of the one of the learning vectors of the plurality of learning vectors exceeds the strength threshold value, and a second value is assigned to one of the learning vectors of the plurality of learning vectors if the strength of the one of the learning vectors of the plurality of learning vectors does not exceed the strength threshold value. In some embodiments, the method includes outputting a message indicating a deficiency in a learning object if the learning vector associated with the learning object is assigned the second value.

In some embodiments of the method, the object database and the vector database are a single database. In some embodiments, the binary indicators are generated for successful traversal of the learning vector and for failed traversals of the learning vector. In some embodiments, identifying a plurality of learning objects can include identifying a plurality of servers containing the plurality of learning objects.

In some embodiments, the plurality of learning objects can include a first learning object stored on a first server, and a second learning object stored on a second server. In some embodiments, the first learning object can be stored in a first database of the first server and the second learning object can be stored in a second database of the second server. In some embodiments, the method can include identifying learning vectors assigned the second value. In some embodiments, the method can include relatively ranking the plurality of learning vectors. In some embodiments, the plurality of learning vector can be relatively ranked according to the degree to which students successfully traverse the plurality of learning vectors. In some embodiments, the strength threshold value identifies a minimum acceptable relative rank.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIG. 2-A is a schematic illustration of one embodiment of a database server.

FIG. 2-B is a schematic illustration of one embodiment of a user device for use with the gaming system.

Figure 1:
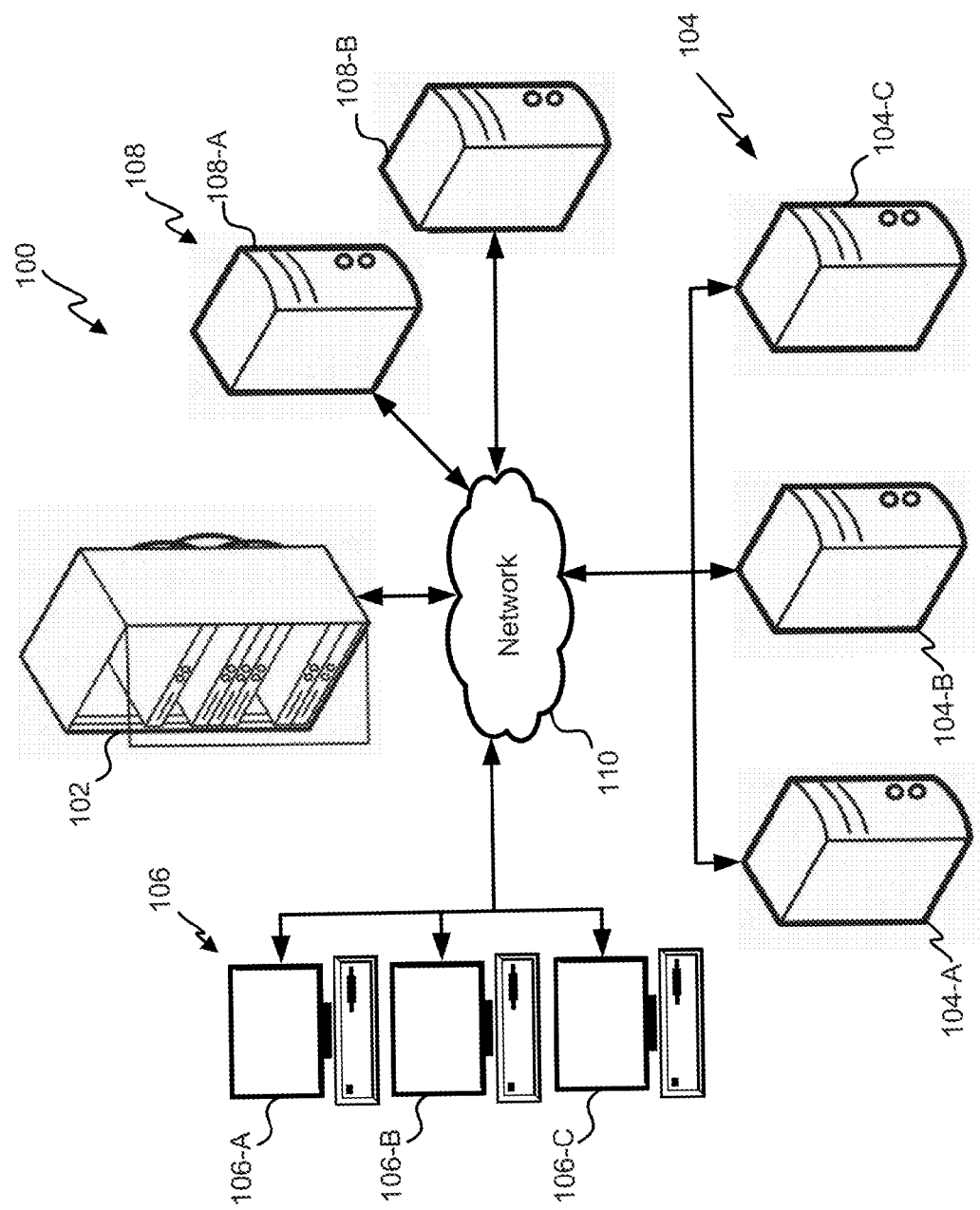
FIG. 1 is a schematic illustration of one embodiment of a gaming system.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

In one embodiment the present disclosure relates to systems and methods for generating a multidimensional object network that can be, for example, a gaming object network and/or a learning object network. The multidimensional object network can be generated by identifying multiple levels and dimensions of connectivity between a plurality of objects in the object network, and can, in some embodiments, include the identification of multiple levels and dimensions of connectivity between a first object and other objects in the object network.

The objects in the object network can be connected according to their content. These connections can provide for a progression of content such as is contained and/or described in a plot, a syllabus, a story chart, or the like. These interconnections between objects can create multiple paths with which the object network can be traversed. These multiple paths can have different traits and/or attributes and can thus have different effects on one or several individuals traversing each of the paths. In some embodiments these different traits and/or attributes can include, for example, different skills and/or skillsets taught by traversing one of the paths, different learning and/or learning experiences received by traversing one of the paths, or the like.

In some embodiments, one or several of the objects of the object network can be defined by one or several dimensions that can describe the content of the one or several objects, the level of the one or several objects, or the like. These dimensions can be used to create the interconnections within the object network, and/or these dimensions can be used to link one or several objects across object networks. Specifically, a first object can be connected with one or several other objects, some or all of which other objects are in object networks other than the object network of the first object. Such connecting can result in the interlinking of a plurality of object networks based on these one or several dimensions of one or several objects.

The objects can include content that can include learning content and assessment content. The learning content can be organized into one or several content objects, which content objects will be discussed at greater length below.

The learning content can be selected to teach the gamer skills and/or material for successfully completing the assessment. The assessment can include interactive features, such as, for example, an opponent, one or several questions, or the like, that can be used to evaluate the degree to which the gamer learned and/or mastered one or several skills and/or material.

The objects, and particularly, the content and/or the assessment of the objects can have one or several levels that describe the degree of difficulty associated with one or several aspects of the object. In some embodiments, one or several of the aspects of the content of the object can be the primary aspect evaluated in the assessment, and one or several of the aspects of the content can be non-primary aspects evaluated by the assessment and/or can be unevaluated by the assessment.

By way of example, in one embodiment the object contains written material used to teach a skill. The written material can be described by a first level, such as a lexile level, and the skill can be described by a second level. In this example, as the level of the written material is not primarily evaluated in the assessment, this level is described as a non-subject level or alternatively as a subject-independent level. Such non-subject levels can include, for example, a lexile level, a quantile level, or the like. In contrast, the second level is the primarily evaluated in the assessment, and is described as a subject level.

In some embodiments, the object can be linked with one or several objects either in or outside of the object network according to the one or several levels associated with the object. In some embodiments, for example, the object can be linked to one or several other objects according to one or several subject levels and/or according to one or several non-subject levels. These levels can be described by the one or several dimensions mentioned above.

In some embodiments, an object, a content object, topic of the content object, or the like can be evaluated and a skill level thereof can be identified. The identified skill level of an object, a content object, or the like, can be used to identify one or several objects, one or several content objects, and/or one or several topics of the one or several content objects having a skill level that is either lower or higher than the identified skill level.

In some embodiments, vectors can be established between the evaluated object, content object, topic, or the like and the identified objects, content objects, topics, or the like. In some embodiments, these vectors can indicate a prerequisite relationship between the evaluated and the identified one or several objects, the one or several content objects of the one or several objects, and/or the topics.

Information relating to the degree to which the gamer learned and/or mastered one or several skills and/or material can be stored in a database. This information can be aggregated from a large number of gamers and can be used to identify how a specific gamer can best move through the object network to achieve a desired goal, how objects in the object network can be linked, and/or to identify objects in the object network that can be improved, and how those identified objects in the object network can be improved.

The object network is created using a number of networked devices. These can include multiple servers at multiple locations, and a large number of user devices via which gamers access the object network. Particularly, the object network can be created from content having multiple authors and/or sources of control, and thus the creation of the object network can include the creation of a physical network of linked servers under different sources of control. In such an embodiments, the physical connecting of these servers can roughly correspond with the connectivity of the object network. These servers can include one or several content servers that can contain the objects of the object network, one or several servers that can contain information relating to vectors connecting the object of the object network, and/or one or several servers containing gamer information.

In some embodiments, the interaction between large numbers of gamers and the networked devices hosting the object network can be transformed into massive amounts of data that can be stored in one or several database servers. This data can relate to one or several traits of the garners, to one or several traits of the objects and/or the object network, or the like. This aggregated data can be used to select routes for individual garners through the object network, which route will provide the greatest likelihood of achieving a desired result.

With reference now to FIG. 1, a block diagram of one embodiment of a gaming system 100 is shown. The gaming system 100 can be, for example, a learning system including a gamified learning system. The gaming system 100 can be an aggregation of interconnected hardware devices that can together store the objects, also referred to herein as gaming objects and/or learning objects, that form one or several object networks. The gaming system 100 can be used to generate one or several vectors, also referred to herein as one or several gaming vectors and/or learning vectors, which vectors connect the objects of the object network, the gaming system 100 can determine one or several paths through the object network and recommend these one or several paths to users, and the gaming system 100 can identify weak objects within the object network.

The gaming system 100 collects, receives, and stores data relating to the actions of one or several garners within a gaming object network, which gaming object network can be a learning object network and/or a gamified learning object network. In some embodiments, the gaming object network can include a plurality of learning objects that are linked in prerequisite relationships via a plurality of learning vectors. The gaming system 100 utilizes this data to create, maintain, and update learning vectors connecting learning objects within the gaming object network. In some embodiments, the learning vectors can be updated based on the success and/or failure of a gamer in traversing the learning vector, the context of the learning vector, and/or the gamer context. In some embodiments, the learning vector context, as referred to herein as the vector context or the gaming vector context, can be the aggregated information relating to the learning vector. This can include identification of the prerequisite relationship between the learning objects directly connected by the learning vector, the magnitude of the learning vector, the strength of the learning vector, and/or any other desired parameter of the learning vector. In some embodiments, the strength of the learning vector context can vary based on the gamer context. Thus, in some embodiments, the strength and/or magnitude of the learning vector can vary with respect to different gamer contexts. Thus, some gamer contexts may correspond to an increased strength and/or magnitude of the learning vector whereas other gamer contexts may correspond to a decreased strength and/or magnitude of the learning vector.

The gaming system 100 includes a central server 102. The central server 102 can provide instructions to and receive information from the other components of the gaming system 100. The central server 102 can act according to stored instructions, which stored instructions can be located in memory associated with the central server 102 and/or in other components of the gaming system 100. The central server 102 can include one or several computing devices, computers, processors, including, for example, one or several microprocessors, such as a microprocessor from Intel® or Advanced Micro Devices, Inc.®, or the like.

The gaming system 100 can include one or several database servers 104. The one or several database servers 104 can comprise one or several storage media that can be arranged in any desired fashion. In one embodiment, for example, the database servers 104 can comprise one or several memory blade server, hard drive server, or the like. As depicted in FIG. 1, in some embodiments, the gaming system 100 can include a plurality of database servers 104. In some embodiments, these database servers can be redundant in that some or all of the information contained on the database server 104 is contained on another database server 104 in the gaming system 100, and in some embodiments, the database servers 104 can be non-redundant in that the information stored on the database server 104 is not stored on another database server 104 within the gaming system 100. Thus, in some embodiments, some or all of database servers 104-A, 204, and 206 can contain unique information.

With reference now to FIG. 2-A, a schematic illustration of one embodiment of the database servers 104 is shown. The exemplary embodiment of FIG. 2-A is displayed as containing a plurality of databases 202-210. However, in some embodiments, some or all of the database servers 104-A, 204, 206 may not contain all of the databases 202-210 shown in FIG. 2-A.

The database servers 104 can comprise stored data relevant to the functions of the gaming system 100. The database servers 104 can include an object database 202. The object database 202 can include data relating to one or several gaming objects. In some embodiments, a gaming object can be an aggregation of content, including gaming content, learning content, or the like, that can be, for example, associated with an assessment such as, for example, an opponent, a test, quiz, one or several practice problems or questions, homework, or the like. The object database 202 can, in some embodiments, include the learning objects, including any subcomponents of the learning objects such as, for example, one or several content objects containing instructional material, and specifically comprising a presentation of learning material and/or one or several assessment objects which can comprise a content object that includes features configured to assess the learning and/or mastery of the subject matter of one or several content objects by the gamer. In some embodiments, the gaming object can include an initial content object and/or assessment object, one or several intermediate content objects and/or assessment objects, and one or several terminal content objects and/or assessment objects. In one embodiment, the terminal assessment object can assess the gamer's mastery of the content contained in some or all of the content objects within the learning object. In some embodiments, an intermediate assessment object can correspond to an intermediate opponent, and a terminal assessment object can, for example, correspond to opponent faced before, for example, passing a level and/or stage in a game.

The object database 202 can include information to allow customization of the gamer learning experience. In one embodiment, for example, the object database 202 can include threshold data that can be used in connection with gamer results to determine if a gamer is meeting expectations, exceeding expectations, far exceeding expectations, failing to meet expectations, or providing completely unsatisfactory results. In some embodiments, the object database 202 can include thresholds that can be used to trigger the providing of learning objects to the gamer, which learning objects are not included in the selected gaming path, also referred to herein as a learning path. In one embodiment, the object database 202 can include one or several enhancement thresholds, and in some embodiments, the object database 202 can include one or several remediation thresholds. In some embodiments, these learning objects can be one or several enhancement objects for a gamer who is exceeding and/or far exceeding expectations, and in some embodiments the learning objects can be one or several remedial objects for a gamer who is not meeting expectations.

The database servers 104 can include a vector database 204. The vector database 204 can include information relating to one or several learning vectors. In some embodiments, and as discussed above, the gaming object network can contain a plurality of objects. These objects can be connected via a plurality of vectors, also referred to herein as gaming vectors and/or as learning vectors. A gaming vector can connect a first gaming object to a second gaming object and can indicate a prerequisite relationship between the first and second gaming objects, which prerequisite relationship can indicate the temporal order in which the first and second gaming objects should be completed and/or attempted. In some embodiments, the first gaming object, which is a prerequisite to the second gaming object within the set defined by the first and second gaming objects connected within a prerequisite relationship by the learning vector, can be identified as the incident gaming object ($LO_I$), and the second gaming object can be identified as the terminal gaming object ($LO_T$).

In some embodiments, the vector database 204 can include information relating to a variety of parameters of the learning vector. In some embodiments, this can include, for example, the strength of the learning vector, which strength can indicate the effectiveness of the learning vector and/or the degree to which gamers successfully traverse the learning vector and complete the terminal gaming object, the magnitude of the learning vector, which magnitude can provide an indicator of the rate at which one or several gamers have traversed and/or are expected to traverse the learning vector, a learning vector context including, for example, information identifying the strength and/or magnitude of the learning vector for one or several gamer contexts, or the like.

The database servers 104 can include an assessment database 206. The assessment database 206 can include information identifying the connection and/or connections between gaming objects within the gaming object network. In some embodiments, the assessment database 206 can include information relating to multidimensional linking between one or several learning objects. In some embodiments, one or several of the multiple dimensions of the gaming object network can relate to the subject matter of the gaming object network and/or to skills that are relevant to the completion and/or comprehension of the subject matter of the gaming object network. In some embodiments, one or several of the multiple dimensions of the gaming object network and/or gaming object can relate to subject independent skills and/or knowledge, which are skills and/or knowledge, the development of which, are not the purpose of the gaming object. Such skills and/or knowledge may include, for example, reading (lexile) skills and math (quantile) skills, history knowledge, science knowledge, geography knowledge, or the like. Thus, in a game intended to teach geography, reading skills acquired through the learning of geography would be subject independent, and geography skills and/or knowledge are subject dependent skills and/or knowledge. Additionally, in some embodiments, information contained within the assessment database 206 can be used in placing the learning objects within the gaming object network and/or in connecting new learning objects with other objects within the gaming object network.

The database servers 104 can include an evaluation database 208. The evaluation database 208 can include information used in evaluating the effectiveness of one or several objects, one or several sequences of objects, referred to herein as a learning sequence and/or a gaming sequence, one or several content objects, one or several assessment objects, and/or the like. In some embodiments, for example, this information can include one or several effectiveness thresholds which can define the boundary between satisfactory results associated with one or several of the above and unsatisfactory results associated with one or several of the above.

The database servers 104 can include a gamer database 210. The gamer database 210 can include information relating to one or several gamers. In some embodiments, a gamer can be any individual that accesses one or several objects via the gaming system 100, and can include, for example, a student, a trainee, a learner, or the like. In some embodiments, the information contained in the gamer database 210 can include, for example, gamer contexts for one or several gamers. In some embodiments, a gamer context can contain information relating to past gaming and/or learning completed by the associated gamer, objectives of the gamer, which objectives can be the learning goals of the gamer including, for example, the achievement of a desired or specified position within the gaming object network, and/or the learning capability of the gamer, which can be, for example, a learning style. In some embodiments, the information contained within gamer database 210 can be updated based on the results of interactions between the gamer and the gaming object network. In some embodiments, and based on continual updates to the gamer context, information contained within the gamer database 210 can be biased for temporal significance in that a biasing function can be applied to information contained within the gamer database to place greater weight on recently collected data. In some embodiments, the temporal biasing function can advantageously allow recently collected data to more significantly affect the gamer context than older, and potentially stale data relating to the gamer.

Returning again to FIG. 1, the gaming system 100 can include one or several user devices 106, which can include, a gamer device 106-A, an administrator device 106-B, and/or a supervisor device 106-C. The user devices 106 allow a user, including a gamer, an evaluator, a supervisor, a teacher, and/or a trainer to access the gaming system 100. In some embodiments, the gaming system can include a large number of gamer devices 106-A such as, for example, 100, 500, 1,000, 2,000, 4,000, 6,000, 8,000, 10,000, 50,000, 100,000, 250,000, 1,000,000, 5,000,000, 10,000,000, 100,000,000, 500,000,000 and/or any other or intermediate number of gamer devices 106-A. In some embodiments, the large number of gamer devices 106-A can enable the functioning of the gaming system 100. Specifically, the large number of gamer devices 106-A can allow a large number of gamers to interact with the gaming system 100 to thereby generate the data volume to enable performing of the methods and processes discussed at length below. In some embodiments, this volume of data can be so large that it cannot be processed by human. Such a volume of data is referred to herein as a massive data volume. The details and function of the user devices 106 will be discussed at greater length in reference to FIG. 2-B below.

The gaming system 100 can include one or several data servers 108, also referred to herein as one or several data sources. The data servers 108 can be the source of the one or several learning objects, content objects, assessment objects, or the like, and can be the source of some or all of the gamer information stored within the gamer database 210, and in some embodiments, the gamer database 210 can be stored in the one or several of the data servers 108.

The data servers 108 can include, for example, a content server 108-A, also referred to herein as an educational server and/or an educational source, and a gamer server 108-B, also referred to herein as a gamer source and/or a student source. In some embodiments, the educational server 108-A can be a part of a Learning Management System (LMS), an educational institution, a training institution, or the like, and a gamer source 108-B can include, for example, any source of information relating to the gamer and/or past gamer performance. In some embodiments, the gamer database 210 can be located on the gamer source 108-B and/or generated from information received from the gamer sources 108-B.

The gaming system 100 can include a network 110. The network 110 allows communication between the components of the gaming system 100. The network 110 can be, for example, a local area network (LAN), a wide area network (WAN), a wired network, wireless network, a telephone network such as, for example, a cellphone network, the Internet, the World Wide Web, or any other desired network. In some embodiments, the network 110 can use any desired communication and/or network protocols.

With reference now to FIG. 2-B, a block diagram of one embodiment of a user device 106 is shown. As discussed above, the user device 106 can be configured to provide information to and/or receive information from other components of the gaming system 100. The providing of data and/or information, as described herein, can correspond to the outputting of one or several electric signals containing data, and the receiving of data and/or information, as described herein, can correspond to the receiving of an input of one or several electric signals containing data.

The user device can access the gaming system 100 through any desired means or technology, including, for example, a webpage, a web portal, or via network 110. As depicted in FIG. 2-B, the user device 106 can include a network interface 230. The network interface 230 allows the user device 106 to access the other components of the gaming system 100, and specifically allows the user device 106 to access the network 110 of the gaming system 100. The network interface 230 can include features configured to send and receive information, including, for example, an antenna, a modem, a transmitter, receiver, or any other feature that can send and receive information. The network interface 230 can communicate via telephone, cable, fiber-optic, or any other wired communication network. In some embodiments, the network interface 230 can communicate via cellular networks, WLAN networks, or any other wireless network.

The user device 106 can include a content engine 232. The content engine 232 can receive one or several learning objects and/or content objects from the object database 202, and can communicate them to the user via the user interface of the user device 106. Thus, the content engine 232 can receive one or several inputs from the other components of the gamer system 100 via, for example, the network interface 230, and can provide one or several outputs to the gamer/user.

The user device 106 can include an update engine 234. In some embodiments, the update engine 234 can be configured to receive information relating to the traversal of one or several learning vectors and update the learning vectors based on the gamer experience associated with the terminal gaming object of the one or several learning vectors. In some embodiments, the update engine 234 can be configured to update the learning vector according to the gamer context and/or the context of the learning vector. In some embodiments, this can include updating the learning vector according to one or several learning styles. In some embodiments, the update engine 234 can receive information from, and/or provide information to the vector database 204.

The user device 106 can include a placement engine 236. The placement engine 236 can be configured to place one or several learning objects within the gaming object network. Specifically, in some embodiments, the placement engine 236 can be configured to identify prerequisite relationships for a new learning object. In some embodiments, these prerequisite relationships can be within the subject matter of the gaming object, and in some embodiments, these prerequisite relationships can be outside of the subject matter of the learning object. In some embodiments, the placement engine 236 can receive information from, and/or send information to the assessment database 206.

The user device 106 can include a user interface 238 that communicates information to, and receives inputs from a user. In some embodiments, the user interface 238 can each include one or several sensors configured to sense a physical result of one or several user actions, and to convert this sensed result into an electric signal. In some embodiments, the one or several sensors can be configured to sense pressure and/or pressures exceeding a threshold value, and can include, for example, a keyboard, a touchscreen, a mouse, or the like. In some embodiments, the one or several sensors can be configured to sense sound and/or pressure waves, and can include, for example, one or several microphones. Thus, in some embodiments, the user interface 238 can include features configured to receive an input from a user and to convert the input into an electrical signal. The user interface 238 can further include one or several features configured to convert an electrical signal into a human usable output. These features can include, for example, one or several visual displays such as one or several screens, monitors, lights, projectors, or the like, one or several tactile displays, one or several audible outputs such as, for example, one or several speakers, or the like.

The user device 106 can include an assessment engine 240. The assessment engine can be configured to assess the effectiveness of one or several items within the gaming object network including, for example, one or several learning objects, one or several learning sequences, and/or one or several content objects. In some embodiments, the assessment engine 240 can assess the contents of the gaming object network in connection with information stored within the evaluation database 208. In some embodiments, the assessment engine 240 can send information to, and/or receive information from the evaluation database 208.

Figure 3:
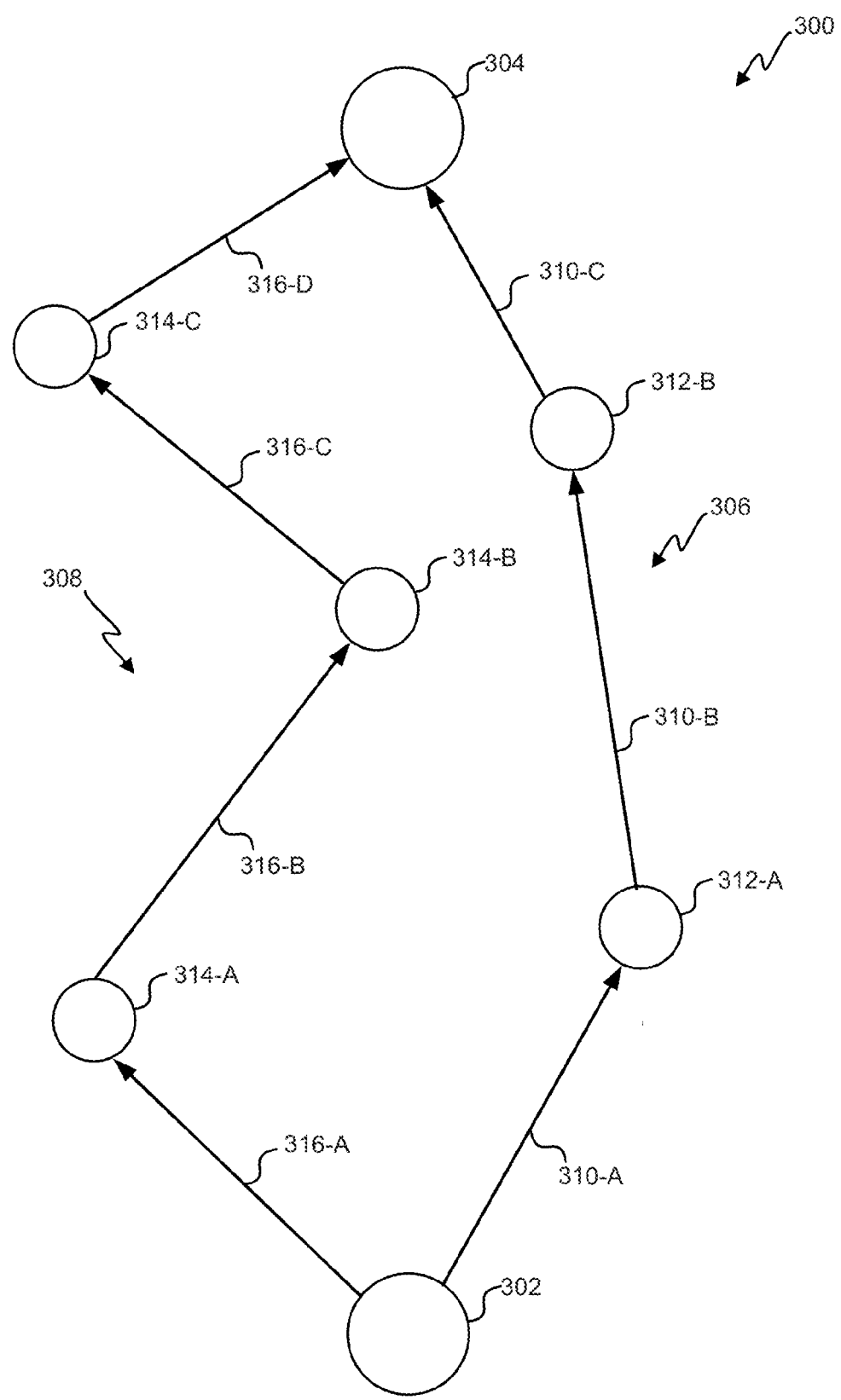
FIG. 3 is a schematic illustration of one embodiment of a gaming object network containing two indicated learning sequences.

With reference now to FIG. 3, a schematic illustration of one embodiment of the gaming object network 300 is shown. Some aspects of object networks and methods of managing the same are disclosed in U.S. application Ser. No. 14/089,432, filed Nov. 25, 2013; Ser. No. 14/137,890, filed Dec. 20, 2013; and Ser. No. 14/154,050, filed Jan. 13, 2014, the entirety of all of which is hereby incorporated by reference herein.

In some embodiments, the gaming object network 300 can comprise a plurality of gaming objects connected via a plurality of gaming vectors. In the embodiment depicted in FIG. 3, the gaming object network 300 includes a starting gaming object 302 and a destination gaming object 304. As seen in FIG. 3, the starting gaming object 302 and the destination gaming object 304 are connected by a first learning sequence 306 and a second learning sequence 308. The first learning sequence 306 comprises learning objects 312-A and 312-B which are connected with each other and with both of the starting object 302 and the destination object 304 via learning vectors 310-A, 310-B, and 310-C. Similarly, the second learning sequence 308 comprises learning objects 314-A, 314-B, and 314 C, which are connected with each other and with both of the starting gaming object 302 and the destination gaming object 304 via learning vectors 316-A, 316-B, 316-C, and 316-D. As seen in FIG. 3, the magnitude of the learning vectors 310-A, 310-B, 310-C, 316-A, 316-B, 316-C, 316-D varies between objects, and some of the learning vectors 310-A, 310-B, 310-C, 316-A, 316-B, 316-C, 316-D have a greater magnitude than others of the learning vectors 310-A, 310-B, 310-C, 316-A, 316-B, 316-C, 316-D. Similarly, some of the learning vectors 310-A, 310-B, 310-C, 316-A, 316-B, 316-C, 316-D have a lesser magnitude than others of the learning vectors 310-A, 310-B, 310-C, 316-A, 316-B, 316-C, 316-D. As further seen, the aggregate magnitude of the first learning sequence 306, which aggregate magnitude is the sum of the magnitudes of the learning vectors 310-A, 310-B, 310-C in the first learning sequence 306, is less than the aggregate magnitude of the second learning sequence 308, which aggregate magnitude is the sum of the magnitudes of the learning vectors 316-A, 316-B, 316-C, 316-D in the second learning sequence 308. In some embodiments, the magnitude of the learning vectors 310-A, 310-B, 310-C, 316-A, 316-B, 316-C, 316-D and/or the magnitude of the learning sequence 306, 308 can correspond to the length of time required to complete a learning vector 310-A, 310-B, 310-C, 316-A, 316-B, 316-C, 316-D and/or a learning sequence 306, 308, by the effectiveness and teaching mastery of the subject matter of the same.

The present disclosure relates to systems and methods for generating a gaming object network that can be, for example, a multidimensional gaming object network. The gaming object network can connect a plurality of gaming object based on, for example, the content and/or subject of the gaming objects. The multidimensional gaming object network can be generated by identifying multiple levels and dimensions of connectivity between a first gaming object and other gaming objects in the gaming object network. Similar to connection of subject matter within a syllabus, a gaming object can be connected to other gaming objects in the gaming object network based on a progression of subject matter within a subject. In such an embodiment, one subject topic is a prerequisite to one or several other subject topics. In addition to this connectivity of a gaming object within a gaming object network, additional dimensions of connectivity can be generated within a gaming object network to create a multidimensional gaming object network.

The connectivity within a gaming object network can be limited to one or several topics, subjects, courses of study, or the like, and in some embodiments, this connectivity can extend beyond one or several topics, subjects, courses of study, or the like. In one embodiment, for example, one or several gaming objects, one or several content objects of the one or several gaming objects and/or the topics of the one or several gaming objects or of the one or several content objects associated with the one or several gaming objects can be evaluated to identify a skill level of the same. The skill level can be a subject independent skill level such as, for example, a lexile and/or quantile skill level, or alternatively, the skill level can be a subject dependent skill level. The identified skill level can be used to find one or several gaming objects, one or several content objects of the one or several gaming objects, and/or topics of the one or several learning objects or of the one or several content objects associated with the one or several gaming objects having a skill level that is either lower or higher than the skill level of the evaluated one or several gaming objects, one or several content objects of the one or several gaming objects, and/or the topics of the one or several gaming objects or of the one or several content objects associated with the one or several gaming objects.

Gaming vectors can be established between the evaluated one or several gaming objects, the one or several content objects of the one or several gaming objects, and/or the topics of the one or several gaming objects or of the one or several content objects associated with the one or several gaming objects and the identified one or several gaming objects, one or several content objects of the one or several gaming object and/or the topics of the one or several gaming objects or of the one or several content objects associated with the one or several gaming objects. In some embodiments, these gaming vectors can indicate the prerequisite relationship between the evaluated and the identified one or several gaming objects, the one or several content objects of the one or several gaming objects, and/or the topics of the one or several gaming objects or of the one or several content objects associated with the one or several gaming objects.

Figure 4:
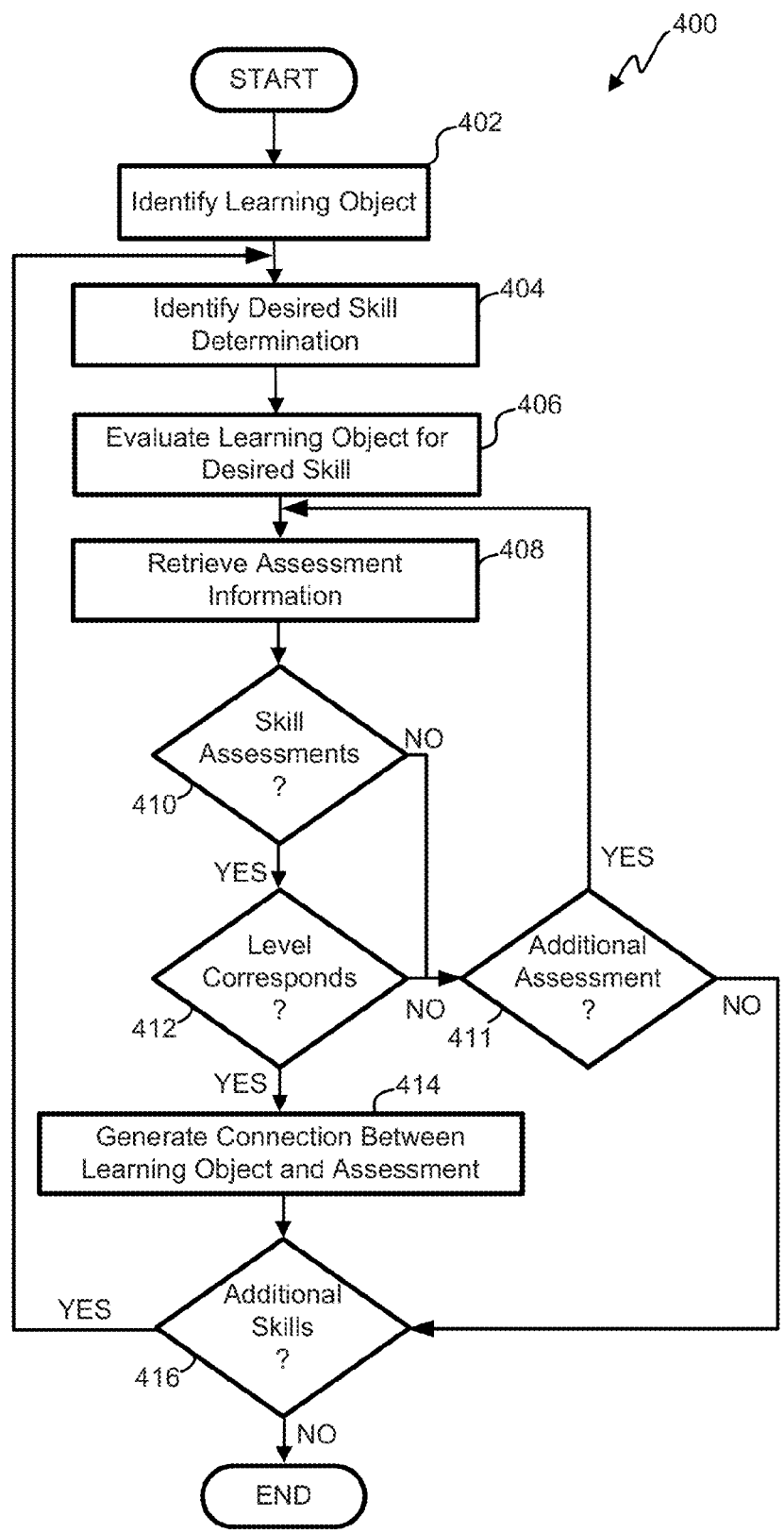
FIG. 4 is a flowchart illustrating one embodiment of a process for associating a content object with an assessment.

With reference now to FIG. 4, a flowchart illustrating one embodiment of a process 400 for associating learning content, such as contained by a content object, with an assessment is shown. In some embodiments, the process 400 can be performed when a new gaming object is added to the gaming object network, or with learning objects already contained within the gaming object network. The process 400 can be performed by the gaming system 100 and/or one or several components thereof. The process 400 begins at block 402 wherein a gaming object and/or content object in the gaming object is identified. In some embodiments, the identified gaming object can be a gaming object that is being added to the gaming object network, a gaming object that has been recently added to the gaming object network, and/or a gaming object that is already within the gaming object network. In some embodiments, the gaming object can be identified by retrieving information from one of the database servers 104 such as the object database 202. In one such embodiment, the object database 202 can contain information indicating whether the process 400 has been performed on any, some, or all of the learning objects in the gaming object network. This information can be analyzed to identify a subset of the learning objects for which process 400 has not been performed. From the subset, one or several of the learning objects can be selected, and after completion of process 400, the information indicating whether the process 400 has been performed on the one or several selected learning objects can be updated.

In some embodiments, and as part of block 402, portions of the learning content of one or several of the learning objects can be selected. In one such embodiment, for example, one or several content objects within the one or several learning objects can be selected for evaluation. In this embodiment, the one or several content objects can be selected via similar process to that used in selecting the learning objects, and specifically by identifying a subset of the content objects for which process 400 has not been completed and selecting one or several of the content objects from the identified subset of the content objects.

After the gaming object has been identified, the process 400 proceeds to block 404 wherein a desired skill determination is identified. In some embodiments, for example, one or several analyses can be performed on a gaming object to evaluate the gaming object for one or several skill levels. In some embodiments, the skill level can relate to the subject matter of the learning object, and in some embodiments, the skill level can be a non-subject skill level that does not relate to the subject of the learning object. In some embodiments, skill levels can include a quantile skill level, a lexile skill level, or the like. In some embodiments, one of the database servers 104, such as the object database 202 can include information indicating analyses that have been performed on the identified learning object. In some embodiments, this information can include information indicating whether a skill level has been identified for the learning object. In such an embodiment, the process 400 can include retrieving this information from the one of the database servers 104 and identifying a subset of analyses that have not been performed on the identified gaming object and/or skill levels that have not been identified for the identified learning object. In one embodiment, one or several desired skill determinations can be selected from the subset of analyses that have not been performed on the identified gaming object and/or skill levels that have not been identified for the identified learning object. In such an embodiment, this information can be updated upon the completion of process 400.

After the desired skill determination has been identified, the process 400 proceeds to block 406 wherein the gaming object is evaluated for the desired skill level. In some embodiments, this evaluation can be performed by the processor 102 and/or other component of the gaming system 100. In some embodiments, for example, this evaluation of the gaming object can include retrieving data associated with the gaming object and/or content object and identifying the skill level of the learning content of the gaming object and/or of the content object from the retrieved data. In some embodiments, this evaluation can include an evaluation of the learning content of the gaming object and/or of the content object for skill level indicators. These skill level indicators can be any feature that indicates a skill level and can include, for example, word usage, vocabulary, mathematical and/or scientific symbols, sentence structure, used grammatical rules, and/or the like. In some embodiments, the existence of one or several of these skill level indicators can correspond to a skill level and in some embodiments, the existence of certain skill level indicators can correspond to a first skill level and the existence of second and/or first and second skill level indicators can correspond to a second skill level. In some embodiments, the gaming object and/or content object is evaluated for the desired skill by identifying one or several skill level indicators within the learning content of the gaming object and/or of the content object and correlating the identified skill level indicators to a skill level.

After the gaming object has been evaluated for the desired skill, the process 400 proceeds block 408 wherein assessment information is retrieved. In some embodiments, the assessment information can be associated with an assessment and can identify attributes of the assessment. In some embodiments, the assessment information can be stored within one of the database servers 104 such as, for example, the assessment database 206. In one embodiment, for example, the assessment information can identify a skill evaluated by the assessment and a skill level of the assessment.

After the assessment information has been retrieved, the process 400 proceeds to decision state 410 wherein it is determined if the skill evaluated by the assessment corresponds to the desired skill. In some embodiments, this determination can be made by the processor 102 by retrieving information indicating the desired skill and extracting information identifying the skill evaluated by the assessment from the assessment information. The information indicating the desired skill can be compared to the information identifying the skill evaluated by the assessment to determine if both the desired skill and the skill evaluated by the assessment are the same.

If it is determined that the assessment evaluates a different skill than the desired skill, then the process 400 proceeds to decision state 411 and determines if there are additional assessments. In some embodiments, this can include querying one the database servers 104, such as the assessment database 206 for information regarding assessments. In some embodiments, this information can identify whether some or all of the assessments have been evaluated for correspondence to the learning content currently the subject of process 400. If it is determined that there are additional assessments, then the process 400 returns to block 408 wherein assessment information for additional assessments is retrieved.

Returning again to decision state 410, if it is determined that the assessment evaluates the same skill as the desired skill, then the process 400 proceeds to decision state 412 wherein it is determined if the skill level of the assessment matches the skill level of the learning content of the gaming object and/or of the content object. In some embodiments, this can include a comparison of the determined skill level of learning content of the content object and/or of the gaming object and the skill level identified within the assessment information. In some embodiments, this comparison can be performed by the processor 102.

If it is determined that the skill level evaluated by the assessment does not match the skill level of the learning content of the gaming object and/or of the content object a different skill than the desired skill, then the process 400 proceeds to decision state 411 and determines if there are additional assessments. In some embodiments, this can include querying one the database servers 104, such as the assessment database 206 for information regarding assessments. In some embodiments, this information can identify whether some or all of the assessments have been evaluated for correspondence to the learning content currently the subject of process 400. If it is determined that there are additional assessments, then the process 400 returns to block 408 wherein assessment information for additional assessments is retrieved.

Returning again to decision state 412, if it is determined that the skill levels of the assessment and of learning content correspond, then the process 400 proceeds block 414 wherein a connection between the learning content and the assessment is generated. In some embodiments, this connection can be stored in one of the databases of one or more of the database servers 104 such as, for example, the object database 202 and/or the assessment database 206. In such an embodiments, the server 102 can output an indicator of the connection between the learning content and the assessment, which output can be received by the recipient database server 104, and can be used to update the desired database.

In some embodiments, and as part of block 414, connections between evaluated learning content in the gaming object and/or the content objects can be connected with other learning content contained within other learning objects and/or other content objects within the gaming object network. The details of the generation of connections throughout the gaming object network will be discussed at greater length below.

After the connection between the learning content and the assessment has been generated, or returning again to decision state 411 if it is determined that there are no additional assessments, then the process 400 proceeds to decision state 416 wherein it is determined whether to perform additional skill level evaluations on the learning content of the gaming object and/or the content object. In some embodiment, this determination can be made by identifying whether the learning content has been evaluated for all of a desired set of skills. If the learning content has not been evaluated for all of the desired set of skills, then the process 400 returns to decision state 404. If the learning content has been evaluated for all of the desired set of skills, then the process 400 terminates or continues with other steps.

Figure 5:
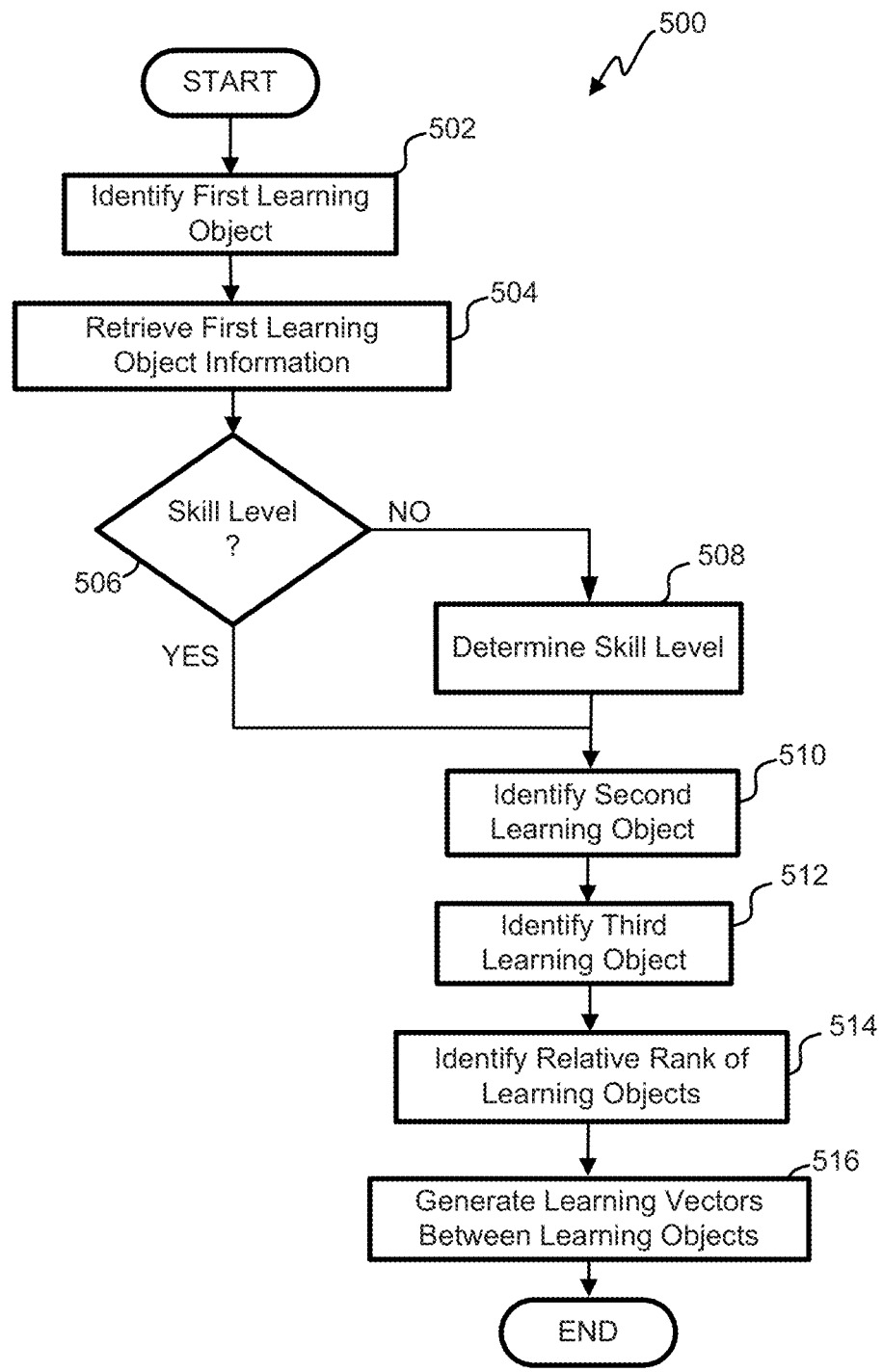
FIG. 5 is a flowchart illustrating one embodiment of a process for placing a gaming object within a gaming object network.

With reference now to FIG. 5, a flowchart illustrating one embodiment of a process 500 for placing learning content such as contained within a gaming object or a content object within a gaming object network is shown. In some embodiments, this placement can be such that both the gaming object and the gaming object network share a common subject and/or subject matter. As the process 500 relates to learning content in both learning objects and in content objects, following references to learning objects broadly encompass learning content contained within learning objects and/or content objects. In some embodiments, the process 500 can be performed when a new gaming object is added to the gaming object network. The process 500 can be performed by the gaming system 100 and/or one or several components thereof. The process 500 begins at block 502 wherein a first gaming object is identified. In some embodiments, the first gaming object can be the gaming object that is being added to the gaming object network. The first gaming object can be stored within one of the database servers 104 including, for example, the object database 202, and can be identified by accessing information from the same.

After the first gaming object has been identified, the process 500 proceeds to block 504 wherein first gaming object information is retrieved. In some embodiments, the first gaming and/or learning object information can include metadata providing information relating to the content of the first gaming object such as, for example, metadata identifying aspects of the content objects composing the first learning object. In some embodiments, the first gaming object information can be associated with the gaming object in one of the database servers 104 such as, for example, the object database 202.

After the first gaming object information has been retrieved, the process 500 proceeds to decision state 506 wherein it is determined if a subject dependent skill level, also referred to herein as a subject skill level, is associated with the first learning object. In some embodiments, the subject skill level is dependent on the subject matter of the gaming object. In one exemplary embodiment, for example, the gaming object network can be directed at history, and thus, the subject skill level of the gaming object can be the level of difficulty associated with the history related content of the gaming object. In some embodiments, the subject dependent skill level can be identified in the metadata associated with the gaming object retrieved in block 504. Alternatively, in some embodiments, a subject independent skill level can be determined for the gaming object. In such an embodiment, the metadata associated with the gaming object can comprise one or several values identifying the subject dependent skill level of the gaming object such as, for example, a value identifying the lexile level associated with the gaming and/or learning object and/or the quantile level associated with the gaming and/or learning object.

If it is determined that the first gaming object is not associated with a subject dependent skill level, then the process proceeds to block 508 wherein the subject dependent skill level is determined. Alternatively, in some embodiments, the subject independent skill level can be determined in block 508. In some embodiments, this determination can be made by the processor 102 and/or other component of the gaming system 100. In one embodiment, for example, substantive analysis of the content of the gaming object can be performed to determine the skill level, including, for example, the subject independent skill level of the learning object and/or the subject dependent skill level of the learning object. In one embodiment, for example, this analysis can comprise content analysis, lexile analysis, and/or quantile analysis. In some embodiments, the determination of the skill level of the gaming object can include storing a value associated with the gaming object and indicative of the skill level of the gaming object in one of the database servers 104 such as, for example, the object database 202.

After the skill level has been determined or, returning to decision state 506 if it is determined that the gaming object is associated with the skill level, the process 500 proceeds to block 510 wherein a second gaming object is identified. In some embodiments, the second gaming object comprises one of the learning objects stored within one of the database servers 104 such as the object database 202, and the second gaming object can be associated with metadata including a value indicative of the skill level of the second learning object. In some embodiments, the skill level of the second gaming object can be one increment higher and/or one decrement lower than the skill level of the first learning object. In some embodiments, the second gaming object can be identified by the processor 102 or by another component of the gaming system 100.

After the second gaming object has been identified, the process 500 proceeds to block 512 wherein a third gaming object is identified. In some embodiments, the third gaming object comprises one of the learning objects stored within one of the database servers 104 such as the object database 202, and the third gaming object can be associated with metadata including a value indicative of the skill level of the third learning object. In some embodiments, the skill level of the third gaming object can be one increment higher and/or one decrement lower than the skill level of the first learning object. In some embodiments, the third gaming object can be identified by the processor 102, or by another component of the gaming system 100.

After the third gaming object has been identified, the process proceeds to block 514 wherein the relative rank of the learning objects is identified. In some embodiments, this can include retrieving values identifying the skill level of the learning objects from one of the database servers 104 such as the object database 202, and comparing those values identifying the skill level of the learning objects. In some embodiments, this relative ranking of the learning objects can be performed by the processor 102 and/or by another component of the gaming system 100.

After the relative rank of the learning objects has been identified, the process 500 proceeds to block 516 wherein learning vectors between the three learning objects are generated. In some embodiments, the learning vectors between the three learning objects are generated to reflect the incrementing skill level, starting with the gaming object having the lowest skill level. In some embodiments, for example, the gaming object having the lowest skill level can be connected by a learning vector to the gaming object having a higher skill level, and that gaming object can be connected via a learning vector to the gaming object having the highest skill level. In some embodiments, learning vectors connecting the learning objects can identify a prerequisite relationship so as to enable identification of which gaming object is a skill level that is prerequisite to the next learning object. Advantageously, the generation of such learning vectors allows placement of a new gaming object within the gaming object network.

In some embodiments, the generation of the learning vectors can further include storing data relating to the generated learning vectors and/or storing the generated learning vectors in one of the database servers 104. In some embodiments, this can include, for example, outputting the learning vector and/or data relating to the learning vector to the recipient one of the database servers 104, and, after receiving the learning vector and/or the data relating to the learning vector, storing the same in the recipient one of the database servers 104.

Figure 6:
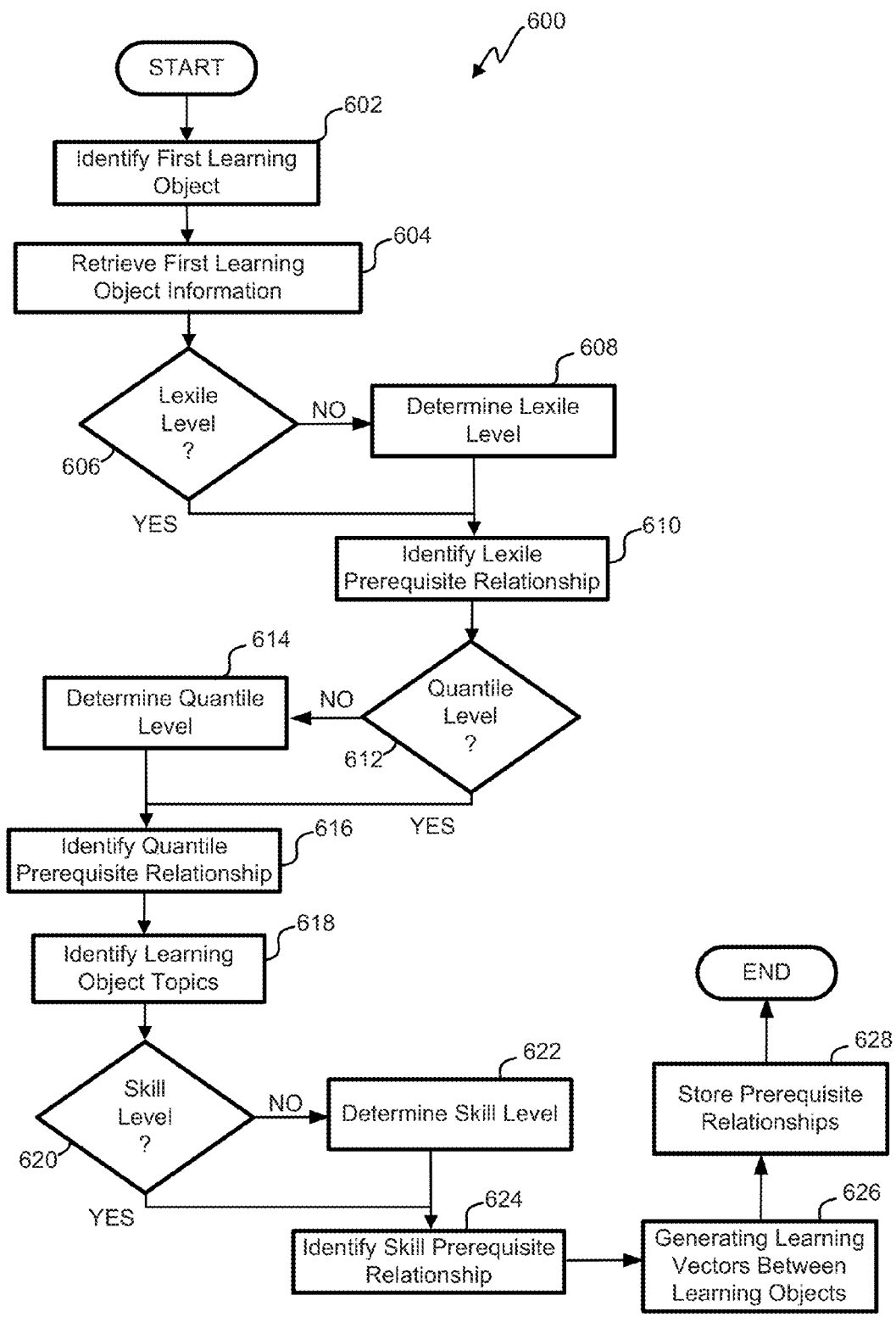
FIG. 6 is a flowchart illustrating one embodiment of a process for generating a multidimensional gaming object network.

With reference now to FIG. 6, a flowchart illustrating one embodiment of a process 600 for generating a multidimensional gaming object network is shown. In some embodiments, the process 600 can be performed as an alternative to process 500 shown in FIG. 5, and in some embodiments, the steps of process 600 and process 500 can be intermixed. The process 600 specifically relates to a process for generating a multidimensional learning content network that can connect learning content contained within one or several learning objects and/or content objects. As the process 600 relates to learning content contained in both learning objects and/or content objects, the following references to learning objects broadly encompass content objects.

In some embodiments, the process 600 can be performed as an alternative to process 500 shown in FIG. 5, and in some embodiments, the steps of process 600 and process 500 can be intermixed. In some embodiments, process 600 can be performed as part of adding a gaming object to the gaming object network. The process 600 can be performed by the gaming system 100 and/or one or several components thereof. The process 600 begins at block 602 wherein a first gaming object is identified. In some embodiments, the first gaming object can be the gaming object that is being added to the gaming object network. In some embodiments, the first gaming object can be identified with information stored within one of the database servers 104 including, for example, the object database 202.

After the first gaming object has been identified, the process 600 proceeds to block 604 wherein first gaming object information is retrieved. In some embodiments, the first gaming object information can include metadata providing information relating to the content of the first gaming object such as, for example, metadata identifying aspects of the content objects composing the first learning object. In some embodiments, the first gaming object information can be associated with the gaming object in one of the database servers 104 such as, for example, the object database 202.

After the first gaming object information has been retrieved, the process 600 proceeds to decision state 606 wherein it is determined if a lexile level is associated with the first learning object. In some embodiments, the lexile level is independent of the subject matter of the gaming object and relates instead to the generic lexile level of the learning object. In some embodiments, the lexile level can be identified in the metadata associated with the gaming object retrieved in block 604. In such an embodiment, the metadata associated with the gaming object can comprise one or several values identifying the lexile level of the learning object.

If it is determined that the first gaming object is not associated with a lexile level, then the process proceeds to block 608 wherein the lexile level is determined. In some embodiments, this determination can be made by the processor 102 and/or other components of the gaming system 100. In one embodiment, for example, substantive analysis of the content of the gaming object can be performed to determine the lexile level of the learning object. In one embodiment, for example, this analysis can be lexile analysis. In some embodiments, the determination of lexile level of the gaming object can include storing a value associated with the gaming object and indicative of the lexile level of the gaming object in one of the database servers 104 such as, for example, the object database 202.

After the lexile level has been determined or, returning to decision state 606 if it is determined that the gaming object is associated with a lexile level, the process 600 proceeds to block 610 wherein the lexile prerequisite relationship is identified. In some embodiments, the identification of the lexile prerequisite relationship can include identifying one or several learning objects having a lexile level that is one decrement less than the lexile level of the first gaming object and identify one or several learning objects having a lexile level that is one increment greater than the lexile level of the first learning object. In some embodiments, this identification can be made based on metadata stored within one of the database servers 104 and specifically the object database 202. In one particular embodiment, metadata including values identifying lexile levels of one or several learning objects is retrieved from the object database 202, and the values identifying the lexile level of the one or several learning objects are compared to identify prerequisite relationships between the first gaming object and one or several other learning objects. In some embodiments, this identification can be performed by the processor 102 and/or another component of the gaming system 100.

After the lexile prerequisite relationship has been identified, the process 600 proceeds to decision state 612 wherein it is determined if a quantile level is associated with the first learning object. In some embodiments, the quantile level is independent of the subject matter of the gaming object and relates instead to the generic quantile level of the learning object. In some embodiments, the quantile level can be identified in the metadata associated with the gaming object retrieved in block 604. In such an embodiment, the metadata associated with the gaming object can comprise one or several values identifying the quantile level of the learning object.

If it is determined that the first gaming object is not associated with a quantile level, then the process 600 proceeds to block 614 wherein the quantile level is determined. In some embodiments, this determination can be made by the processor 102 and/or other components of the gaming system 100. In one embodiment, for example, substantive analysis of the content of the gaming object can be performed to determine the quantile level of the learning object. In one embodiment, for example, this analysis can be quantile analysis. In some embodiments, the determination of the quantile level of the gaming object can include storing a value associated with the gaming object and indicative of the quantile level of the gaming object in one of the database servers 104 such as, for example, the object database 202.

After the quantile level has been determined or, returning to decision state 612 if it is determined that the gaming object is associated with a quantile level, the process 600 proceeds to block 616 wherein the quantile prerequisite relationship is identified. In some embodiments, the identification of the quantile prerequisite relationships can include identifying one or several learning objects having a quantile level that is one decrement less than the quantile level of the first gaming object and identify one or several learning objects having a quantile level that is one increment greater than the quantile level of the first learning object. In some embodiments, this identification can be made based on metadata stored within one of the database servers 104 and specifically in the object database 202. In one particular embodiment, metadata including values identifying quantile levels of one or several learning objects is retrieved from the object database 202, and the values identifying the quantile level of the one or several learning objects are compared to identify prerequisite relationships between the first gaming object and one or several other learning objects. In some embodiments, this identification can be performed by the processor 102 and/or another component of the gaming system 100.

After the quantile prerequisite relationship has been identified, the process 600 proceeds to block 618 wherein gaming object topics are identified. In some embodiments, and as discussed above, the gaming object can include a plurality of content objects and an assessment associated with the content objects. In such an embodiment, each of the content objects can represent a different topic within the gaming object and/or some or all of the content objects can represent a plurality of topics. In such an embodiment, the process 600 can identify some or all of the plurality of topics associated with the learning object. This identification can be done by the processor's 102 analysis of metadata associated with the gaming object that can be retrieved from one of the database servers 104 such as the object database 202.

After the gaming object topics have been identified, the process 600 proceeds to decision state 620 wherein it is determined if a skill level is associated with some or all of the topics of the first learning object. In some embodiments, a skill level can be one or both of the quantile level and the lexile level, and in some embodiments, the skill level can include other subject related and/or subject independent skill metrics. In some embodiments, the skill level can be identified in the metadata associated with the gaming object retrieved in block 618. In such an embodiment, the metadata associated with the gaming object can comprise one or several values identifying the skill level of some or all of the topics of the learning object.

If it is determined that the evaluated topic of the first gaming object is not associated with a skill level, then the process 600 proceeds to block 622 wherein the skill level is determined. In some embodiments, this determination can be made by the processor 102 and/or other components of the gaming system 100. In one embodiment, for example, substantive analysis of the evaluated topic of the gaming object can be performed to determine the skill level of the evaluated topic of the learning object. In one embodiment, for example, this analysis can be quantile analysis, lexile analysis, or analysis associated with any other subject related and/or subject independent skill level. In some embodiments, the determination of the skill level of the evaluated topic of the gaming object can include storing a value associated with the evaluated topic of the gaming object and indicative of the skill level of the evaluated topic of the gaming object in one of the database servers 104 such as, for example, the object database 202.

After the skill level of the evaluated topic has been determined or, returning to decision state 620 if it is determined that some of the of the topics of the gaming object are associated with a known skill level, the process 600 proceeds to block 624 wherein the skill prerequisite relationship is identified. In some embodiments, the identification of the skill prerequisite relationships can include identifying one or several learning objects and/or topics of learning objects having a skill level that is one decrement less than the skill level of the one or several evaluated topics of the first gaming object and/or identify one or several learning objects and/or topics of learning objects having a skill level that is one increment greater than the skill level of the one or several evaluated topics of the first learning object. In some embodiments, this identification can be made based on metadata stored within one of the database servers 104 and specifically the object database 202. In one particular embodiment, metadata including values identifying skill levels of one or several learning objects and/or of one or several topics associated with learning objects is retrieved from the object database 202, and the values identifying the skill level of the one or several learning objects and/or of the one or several topics associated with the learning objects are compared to identify prerequisite relationships between the one or several topics of the first gaming object and one or several other learning objects and/or one or several topics of one or several other learning objects. In some embodiments, this identification can be performed by the processor 102 and/or other component of the gaming system 100.

After the skill prerequisite relationship has been identified, the process 600 proceeds to block 626 wherein learning vectors between the identified learning objects and/or the identified topics of learning objects are generated. In some embodiments, the learning vectors are generated to reflect the identified prerequisite relationships and to indicate the relationship of the identified skill levels of the learning objects and/or the topics associated with the learning objects. Advantageously, the generating of such learning vectors allows placement of a new gaming object within the gaming object network and the movement of a gamer between learning objects to remediate and/or supplement a gamer learning experience. After the learning vectors have been generated, the process 600 proceeds to block 628, wherein the prerequisite relationships and the generated learning vectors are stored. In some embodiments, these prerequisite relationships and generated learning vectors can be associated with the learning objects and/or the gaming object topics to which they relate, and can be stored in one of the database servers 104 such as, for example, the object database 202. This can include, for example, providing the prerequisite relationships and the generated learning vectors to one of the database servers 104, and storing the prerequisite relationships and the generated learning vectors in one of the databases of the recipient database server 104 such as, for example, in the object database 202.

The present disclosure relates to systems and methods for optimizing gaming vectors. The optimization of the gaming vectors can include the compilation of the gamer generated data, and the analysis of that data to determine the effectiveness of the gaming object associated with the gaming vector. This effectiveness can be characterized by a binary value indicating whether the gamer successfully traversed the gaming vector and successfully completed material associated with the gaming object. If the gamer successfully traversed the gaming vector and completed material associated with the gaming object, then a binary value indicative of the successful completion of the gaming object would be associated with the gamer outcome and would be applied to the gaming vector. This binary value would increase the strength of the gaming vector to thereby indicate the success of the gamer in traversing the gaming vector. If the gamer did not successfully traverse the gaming vector and complete material associated with the gaming object, then a binary value indicative of the failure of the gamer to successfully complete the gaming object would be associated with the gamer outcome and would be applied to the gaming vector. This binary value would decrease the strength of the gaming vector to thereby indicate the failure of the gamer in traversing the gaming vector.

Additionally, the present disclosure relates to systems and methods for optimizing gaming vectors with respect to one or several gamer contexts including, for example, a gamer learning style. In some embodiments, the optimization of the gaming vectors with respect to one or several gamer contexts can include the compilation of gamer generated data, and the analysis of that data to determine the effectiveness of the gaming object associated with the gaming vector for one or several gamer contexts. This effectiveness can be characterized by a binary value indicating whether the gamer successfully traversed the gaming vector and completed material associated with the gaming object. If the gamer successfully traversed the gaming vector, the gamer contexts can be compared to a context of the gaming vector. The gamer context can include information relating to a gamer's learning type and/or gaming style as well as other information relating to past performance by the gamer. The context of the gaming vector can include information relating to rates of success of gamers having different gamer contexts including, for example, different learning styles. If the gamer context matches the gaming vector context, then the vector can be strengthened, and if the gamer context does not match the gaming vector context, then the gamer information can be updated based on the effectiveness of the gaming vector. Similarly, if the gamer fails to successfully traverse the gaming vector, the gamer context can be compared to the context of the gaming vector. If the gamer context matches the gaming vector context, then the vector can be weakened, and if the gamer context does not match the gaming vector context, then the gamer information can be updated based on the ineffectiveness of the gaming vector.

Figure 7:
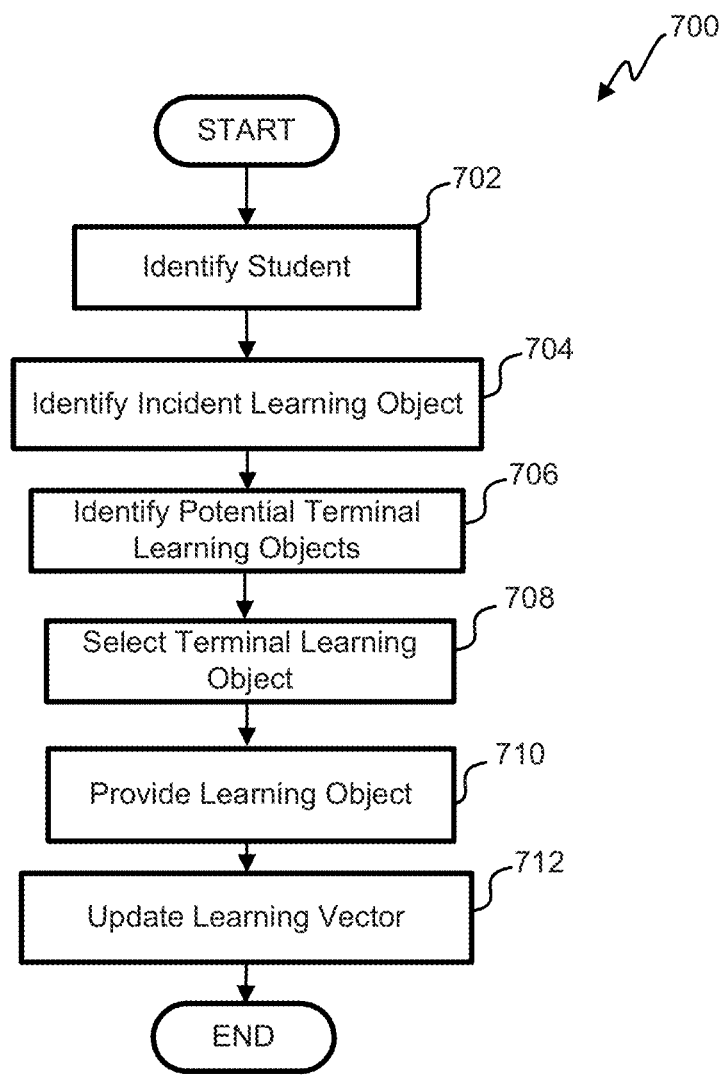
FIG. 7 is a flowchart illustrating one embodiment of a process for selecting a terminal gaming object and updating a gaming vector.

With reference now to FIG. 7, a flowchart illustrating one embodiment of a process 700 for selecting a terminal learning object and updating a learning vector is shown. The process 700 begins at block 702 wherein a gamer is identified. In some embodiments, the gamer is identified based on inputs received from the user device 106 and/or based on information stored within the gamer database 104-E. After the gamer has been identified, the process 700 proceeds to block 704 wherein the incident learning object is identified. In some embodiments, after the gamer has been identified, information relating to the gamer's progress in the gaming object network 300 can be retrieved from the gamer database 104-E. This information can include, for example, the gamer context. This information can identify learning objects that the gamer has completed and can be used to thereby identify the incident learning object. In some embodiments, for example, the gamer context can include one or several values associated with one or several of the learning objects, which values can indicate whether the gamer has completed the one or several of the learning objects. In one embodiment, for example, these values can be extracted from the gamer context and the processor 102 can identify the incident learning object as the learning object from which no learning vector has been traversed.

After the learning object has been identified, the process 700 proceeds block 706 wherein potential terminal learning objects are identified. In some embodiments, for example, the potential terminal learning objects are learning objects connected to the incident learning object via a single learning vector. In one embodiment, for example, after the processor 102 has identified the incident learning object, the processor 102 can retrieve information relating to learning vectors from the incident learning object. The processor 102 can then identify the learning objects at which the identified learning vectors terminate. These identified learning objects are the potential terminal learning objects. In some embodiments, a value can be associated with the potential terminal learning objects, which value can identify the potential terminal learning objects.

After the potential terminal learning objects have been identified, the process 700 proceeds to block 708 wherein a terminal learning object is selected, for example, from one of the identified potential terminal learning objects. In some embodiments, for example, the selection can be made by the processor 102 based on information relating to the terminal learning objects and/or the learning vector leading to the terminal learning object. In some embodiments, for example, the combination of the gamer context as well as the learning vector context can be used by the processor 102 in selecting the terminal learning object.

After the terminal learning object has been selected, the process 700 proceeds to block 710 wherein the learning object is provided. In some embodiments, for example, the learning object can be provided to the user including, for example, the gamer, via the user device 106, and specifically via the network interface 230, the content engine 232, and/or the user interface 238. In some embodiments, providing learning object to the user can further include receiving answers which can be, for example, the inputs provided by the user in response to the assessment and/or answer data which answer data can be, for example, data generated based on the answers such as an indication of correct or incorrect answers, a score, an evaluation, or the like.

After the learning object has been provided, the process 700 proceeds to block 712 wherein the learning vector is updated. In some embodiments, for example, the learning vector can be updated, by the processor 102 and/or the user device 106, according to the received answers and/or answer data. In some embodiments, the learning vector can be updated to reflect an aspect of the gamer performance in traversing the learning vector and/or in completing the terminal learning object of the learning vector.

This can include, for example, generating an update value and providing the update value to one or several of the database servers 104 that contain the one or several databases including the learning vector. This update value can be received by the recipient database server 104, and can be used to update the appropriate learning vector.

The following flowcharts illustrate embodiments of processes for updating a learning vector and/or for generating data used in updating the learning vector. These processes can be performed as part of process 700 depicted in FIG. 7, or separate from the process 700 depicted in FIG. 7.

Figure 8:
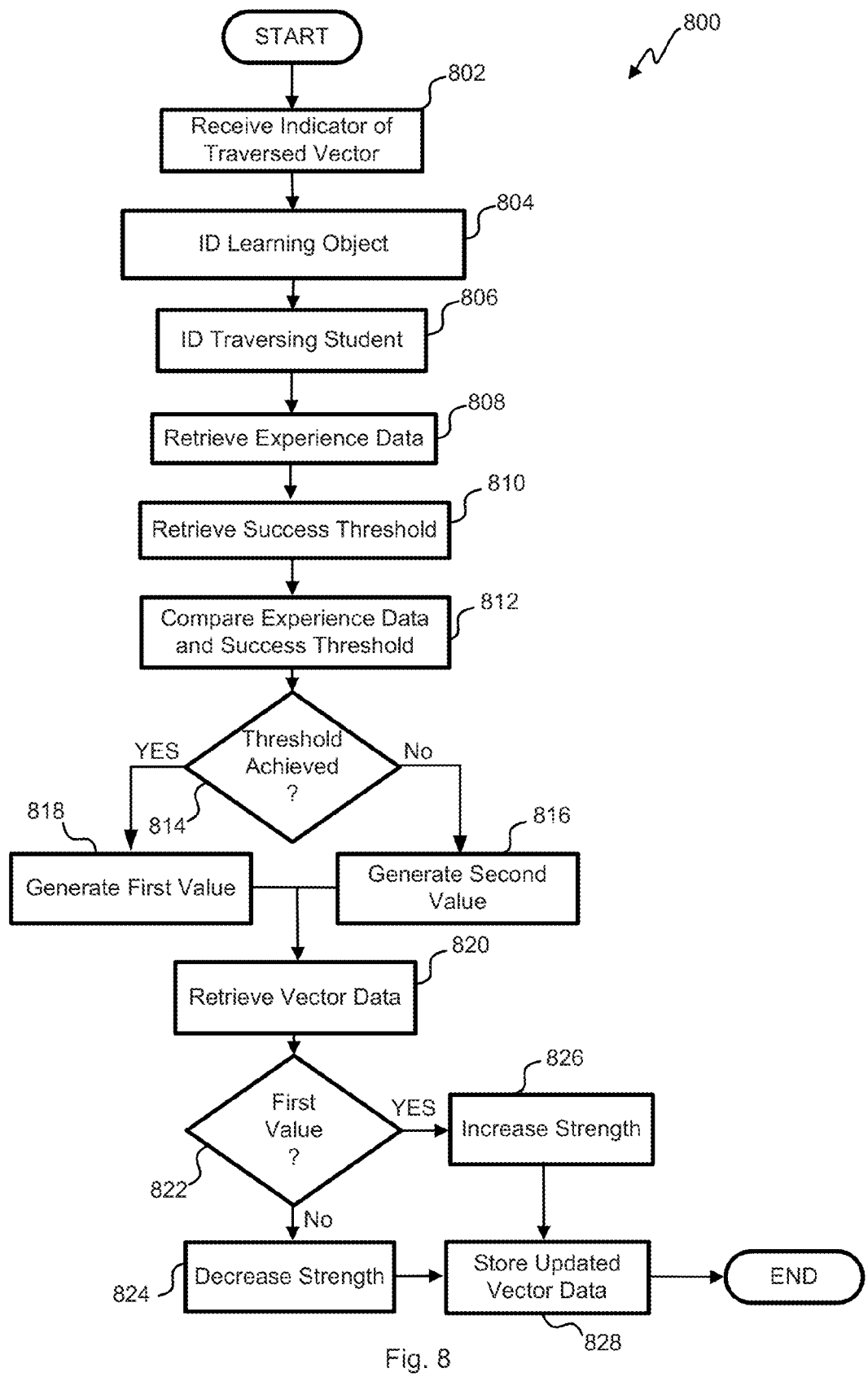
FIG. 8 is a flowchart illustrating one embodiment of a process for updating a gaming vector based on a gamer outcome.

With reference now to FIG. 8, a flowchart illustrating one embodiment of a process 800 for updating a learning vector based on a gamer outcome is shown. In some embodiments, the process 800 can be performed by the gaming system 100 and/or by a component thereof. The process 800 begins at block 802 wherein an indicator of the traversed vector is received. In some embodiments, the indicator of the traversed vector can indicate the incident learning object to the traversed learning vector, the terminal learning object to the learning vector, and information relating to the traversal of the learning vector. In some embodiments, this information can be received from, for example, the user device 106, the data source 108, and/or one of the database servers 104.

After the indicator of the traversed vector has been received, the process 800 proceeds to block 804 wherein the terminal learning object of the learning vector is identified. In some embodiments, this step can include evaluation of the indicator of the traversed vector for information identifying the terminal learning object of the learning vector. This can be performed by, for example, the processor 102, the user device 106, and/or a component of either of these.

After the terminal learning object of the learning vector has been identified, the process 800 proceeds to block 806 wherein the gamer that traversed the learning vector is identified. Similar to block 804, in some embodiments, this step can include evaluation of the indicator of the traversed learning vector for information identifying the traversing gamer. In some embodiments, this information can be a username, gamer identification number, an encrypted identifier, or any other data or information that identifies the gamer. The identification of the gamer can be, for example, performed by the processor 102, the user device 106, or any component of either of the processor 102 and the user device 106.

After the traversing gamer has been identified, the process 800 proceeds to block 808 wherein experience data is retrieved. In some embodiments, the experience data can identify the gamer experience with the learning vector and the terminal learning object associated with the learning vector. Specifically, the experience data can identify the success and/or degree of success of the gamer in traversing the learning vector, the speed with which the gamer traversed the learning vector, or the like. In some embodiments, this data can be extracted from the indicator of the traversed vector received in block 802, and in some embodiments, this information can be received from one of the database servers 104, the user device 106, and/or the data source 108.

After the experience data has been retrieved, the process 800 proceeds to block 810 wherein a success threshold is retrieved. In some embodiments, the success threshold can be a threshold that identifies the boundary between gamer performance corresponding to the successful completion of a learning object and/or traversal of a learning vector. The success threshold can be retrieved from one of the database servers 104 such as for example, the evaluation database 208.

After the success threshold has been retrieved, the process 800 proceeds to block 812 wherein the experience data is compared with the success threshold. In some embodiments, this comparison can include determining if the experience data exceeds the success threshold such as if the value representing the experience data is larger than the value representing the success threshold. In some embodiments, this comparison can be performed by the processor 100 and/or by any other component of the gaming system 100.

After the experience data has been compared with the success threshold, then the process 800 proceeds to decision state 814 wherein it is determined if the success threshold has been achieved. In some embodiments, for example, this can include receiving results of the comparison performed in block 812 determining, based on the results of the comparison performed in block 812, if the success threshold has been achieved. This determination can be performed by the processor 102 and/or by one of the user devices 106. If the success threshold has been achieved, then the process 800 proceeds to block 818 wherein a first value is generated and/or associated with the indicator of the traversed vector, the identification of the traversing gamer, the identification of the learning object, the experience data, and/or the like. In some embodiments, the first value can be generated according to a Boolean function by, for example, the processor 102 and/or the user device 106. Returning again to decision state 814 if it is determined that the threshold value has not been achieved, then the process 800 proceeds to block 816 wherein a second value is generated and/or associated with the indicator of the traversed vector, the identification of the traversing gamer, the identification of the learning object, the experience data, and/or the like. In some embodiments, for example, the second value can be generated according to a Boolean function by, for example, the processor 102 and/or the user device 106.

After the first or second value has been generated, the process 800 proceeds to block 820 wherein the vector data is retrieved. In some embodiments, vector data can include information identifying the vector strength and/or the magnitude of the vector. In some embodiments, for example, the vector data can be retrieved from the vector database 204. In such an embodiment, for example, the first value, which can be, for example, the first value after the vector data has been retrieved, the process 800 proceeds to decision state 822 wherein it is determined if the first value is generated. In some embodiments, this can include determining if the first value was associated with the indicator of the traversed vector, with the identification of the traversing gamer, with the identification of the learning object, with the experience data, and/or the like.

If it is determined that the first value was generated, then the process proceeds to block 826 wherein the strength of the vector is increased. In some embodiments, for example, the strength of the vector can be increased by positively incrementing a value associated with the vector strength. Returning again to decision state 822, if it is determined that the first value was not generated, then the process proceeds to block 824 wherein the strength of the vector is decreased. In some embodiments, for example, the strength of the vector can be decreased by decrementing a value associated with the vector strength. After the strength of the vector has been updated according to one of blocks 824, 826, the process 800 proceeds to block 828 wherein the updated vector data is stored. In some embodiments, the updated vector data can be stored within one of the database servers 104 such as, for example, the vector database 204. This storage can include outputting the updated vector data to the desired one of the database servers 104, and storing the updated vector data therein.

Figure 9:
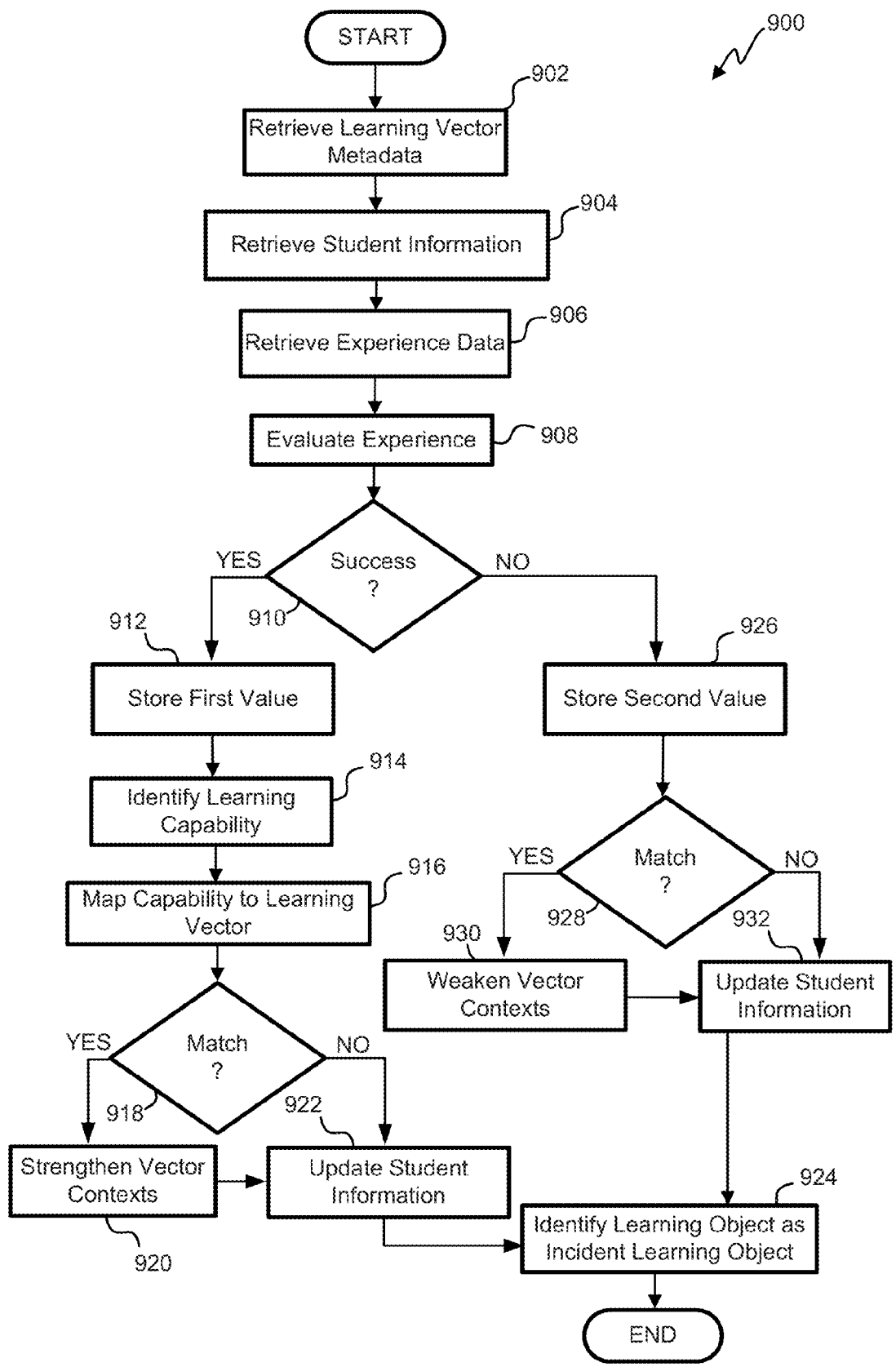
FIG. 9 is a flowchart illustrating one embodiment of a process for updating a gaming vector based on the gamer outcome and the gaming vector context.

With reference now to FIG. 9, a flowchart illustrating one embodiment of a process 900 for updating a learning vector based on the gamer outcome in the learning vector context is shown. The process 900 can be performed by the gaming system 100, by a component of the gaming system 100, by the user device 106, and/or by a component thereof. The process 900 begins at block 902 wherein learning vector metadata is received. In some embodiments, the learning vector metadata can be received from the vector database 204, and can include information identifying the strength, magnitude, direction, or other aspects of the vector. In some embodiments, the vector metadata can include information identifying a learning vector context. The learning vector context can comprise aggregated data relating to gamers who have traversed the learning vector. In some embodiments, this information can include correlations between all or portions of the gamer context and outcomes of traversing the learning vector. In some embodiments this information can include correlations between the learning style of the gamer and the expected level of success in traversing the learning vector.

After the learning vector metadata has been received, the process 900 proceeds to block 904 wherein gamer information is retrieved. In some embodiments, the gamer information can comprise gamer context information, which gamer context can identify a gamer's learning style, the gamer's current learning objectives, and/or the gamer's learning performance history which can be, for example, biased for temporal significance. In some embodiments, the gamer context can be received from the gamer database 104-E.

After the gamer information has been retrieved, the process 900 proceeds to block 906 wherein experience data is retrieved. In some embodiments, the experience data can identify the gamer experience in traversing the learning vector. Specifically, the experience data can identify the success and/or degree of success of the gamer in traversing the learning vector, the speed with which the gamer traversed the learning vector, or the like. In some embodiments, the experience data can be retrieved from the user device 106 and/or the data source 108.

After the experience data has been retrieved, the process 900 proceeds block 908 wherein the gamer experience is evaluated. In some embodiments, the evaluation of the gamer experience can be performed by the processor 102 and/or by the user device 106. In some embodiments, this evaluation can include determining whether the gamer successfully traversed the learning vector and successfully completed material associated with the learning object. After the gamer's experience with the learning vector has been evaluated, the process 900 proceeds to decision state 910 wherein it is determined if the gamer successfully traversed the learning vector. In some embodiments, this determination can be made by the processor 102 or the user device 106. In some embodiments, the determination of the gamer success can include associating a value, according to a Boolean function, with the gamer. In such an embodiment, a first value can be associated with the gamer if the gamer successfully traversed the learning vector, and a second value can be associated with the gamer if the gamer did not successfully traverse the learning vector.

If it is determined that the gamer successfully traversed the learning vector, then the process 900 proceeds to block 912 wherein the first value is stored. In some embodiments, the first value can be stored in one of the database servers 104 including, for example, the gamer database 210. After the first value has been stored, the process 900 proceeds to block 914 wherein the learning capability of the gamer is identified. In some embodiments, the identification of the learning capability the gamer can include retrieving information from the gamer context identifying the gamer's learning style and/or the gamer's historic learning experiences. In some embodiments, this information can identify how a gamer learns, best modes for the gamer to learn, subject matter abilities or difficulties, or the like. In some embodiments, this identification can be performed by the processor 102, by the user device 106, or by a component of either of these.

After the learning capability of the gamer is identified, the process 900 proceeds to block 916 wherein the learning capability of the gamer is mapped to the learning vector, and specifically to the learning vector metadata including the learning vector context. In some embodiments, this step can include determining whether aspects of the gamer context, and specifically the gamer learning style correspond with information generated by gamers that have previously traversed the learning vector. In one embodiment, for example, this can include determining whether previously traversing gamers had the same learning style and/or same or similar learning context as the current traversing gamer. In some embodiments, this mapping can be performed by the processor 102 and/or by the user device 106.

After the capability of the gamer has been mapped to the learning vector, the process 900 proceeds to decision state 918 wherein it is determined if the gamer learning capability, and particularly, if the gamer learning style corresponds to the learning styles of gamers who successfully traversed the learning vector. This determination can be made, in some embodiments, by the processor 102 and/or by the user device 106. If it is determined that there is a match, then the process 900 proceeds to block 920 wherein the vector contexts are strengthened. In some embodiments, this can include strengthening the learning vector as discussed to block 426 above, or strengthening the vector with respect to the specific and/or matching learning context between the gamer learning capability and the learning vector. In some embodiments, for example, the strength of the vector context can be increased by positively incrementing a value associated with the vector strength.

After the vector contexts have been strengthened, or, returning again to decision state 918, if it is determined that there is not a match, then the process 900 proceeds to block 922 wherein gamer information is updated. In some embodiments, for example, this can include updating the gamer context to reflect the success of the gamer in traversing the learning vector. In some embodiments, for example, this can further include updating the gamer context to either strengthen the identification of the gamer learning style identified within the gamer context, or to weaken the identification of the gamer learning style identified with the gamer context. In some embodiments, for example, in which the gamer learning capability matches learning capabilities of garners who successfully traversed the learning vector, the identification of the gamer learning style within the gamer context can be strengthened by, for example, positively incrementing a value associated with the learning style. In some embodiments, for example, in which the gamer learning capability does not match the learning capabilities of garners who successfully traverse the learning vector, the identification of the gamer learning style within the gamer context can be weakened by, for example, decrementing a value associated with the learning style. In one embodiment, for example, a new learning style can be identified, which learning style can be the learning style shared by garners who successfully traversed the learning vector.

After the gamer information has been updated, the process 900 proceeds to block 924 wherein the completed learning object is identified as an incident learning object and the new terminal learning object and the associated learning vector is identified. In some embodiments, this identification can be performed by the processor 102 or the user device 106 and can be based on information contained within one or more of the database servers 104.

Returning again to decision state 910, if it is determined that the gamer did not successfully traverse the learning vector, then the process 900 proceeds to block 926 wherein the second value is stored. In some embodiments, the second value can be stored in one of the database servers 104 including, for example, the gamer database 210.

After the second value has been stored, the process 900 proceeds to decision state 928 wherein it is determined if the learning capability of the gamer that currently traversed the learning vector, and particularly, if that gamer's learning style corresponds to the learning styles of garners who previously did not successfully traverse the learning vector. In some embodiments, this can include identifying the learning capability of the gamer as discussed in block 914 and/or mapping the learning capability of the gamer to the learning vector, and particularly to the context of the learning vector as discussed in block 916. This determination can be made, in some embodiments, by the processor 102 and/or by the user device 106. If it is determined that there is a match, then the process 900 proceeds to block 930 wherein the vector context are weakened. In some embodiments, this can include weakening the learning vector as discussed to block 424 above, or weakening the vector with respect to the specific and matching learning contexts between the gamer learning capability and the learning vector. In some embodiments, for example, the strength of the vector context can be decreased by decrementing a value associated with the vector strength.

After the vector contexts have been weakened, or, returning again to decision state 928, if it is determined that there is not a match, then the process 900 proceeds to block 932 wherein gamer information is updated. In some embodiments, for example, this can include updating the gamer context to reflect the failure of the gamer in traversing the learning vector. In some embodiments, for example, this can further include updating the gamer context to either strengthen the identification of the gamer learning style identified within the gamer context, or to weaken the identification of the gamer learning style identified with the gamer context. In some embodiments, for example, in which the gamer learning capability matches learning capabilities of gamers who did not successfully traverse the learning vector, the identification of the gamer learning style within the gamer context can be strengthened by, for example, positively incrementing a value associated with the learning style. In some embodiments, for example, in which the gamer learning capability does not match the learning capabilities of gamers who did not successfully traverse the learning vector, the identification of the gamer learning style within the gamer context can be weakened by, for example, decrementing a value associated with the learning style. In one embodiment, for example, a new learning style can be identified, which learning style can be the learning style shared by gamers who did not successfully traverse the learning vector.

After the gamer information has been updated, the process 900 proceeds to block 924 wherein the completed learning object is identified as an incident learning object and the new terminal learning object and the associated learning vector is identified. In some embodiments, this identification can be performed by the processor 102 or the user device 106 and can be based on information contained within one or more of the database servers 104. This identification can include, in some embodiments, outputting an indicator of the identified learning object to the user such as, for example, via a screen, monitor, display, or the like.

Figure 10:
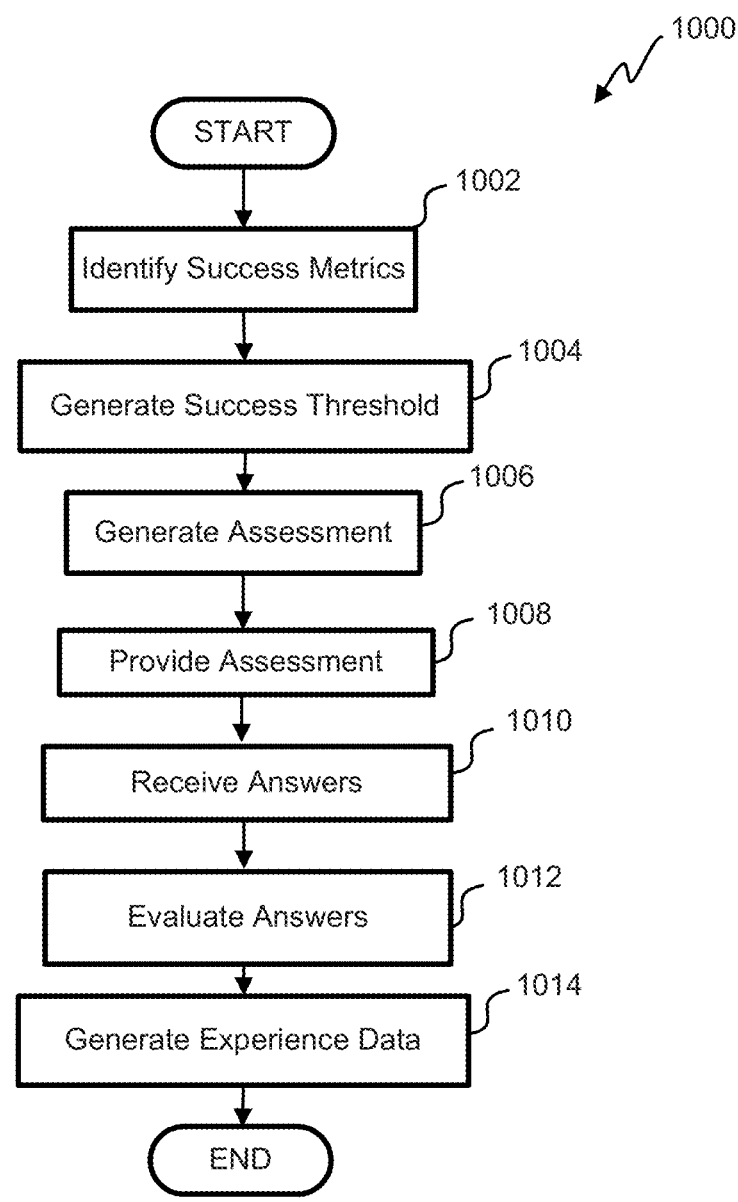
FIG. 10 is a flowchart illustrating one embodiment of a process for generating experience data.

With reference now to FIG. 10, a flowchart illustrating one embodiment of a process 1000 for generating experience data is shown. In some embodiments, the experience data characterizes gamer activity in traversing the learning vector. In some embodiments, the experience data characterizes the degree of gamer success in traversing the learning vector and in some embodiments, for example, the experience data can be a binary indicator of the success or failure of the gamer in traversing the learning vector. Thus, in embodiments in which mere success or failure may be indicated, and not a degree of success or failure. Alternatively, in some embodiments, the degree of success or failure may be indicated. The process 1000 can be performed by the gaming system 100 and/or a component thereof including, for example, the processor 102 and/or the user device 106.

The process 1000 begins at block 1002 wherein a success metric is identified. The success metric can identify a desired outcome resulting from the completion of the gaming object and can relate to any aspect of the gaming object. In some embodiments, the success metric can identify parameters of the comprehensive successful traversal of the learning vector and/or the comprehensive successful completion of the gaming object. In some embodiments, the comprehensive successful traversal of the learning vector and/or the comprehensive successful completion of the gaming object can be based on the gamer mastery of all of the content of the gaming object.

In some embodiments, the success metric can comprise a plurality of parameters that each identify the successful traversal of the learning vector and/or the successful completion of the gaming object with respect to a subset of the content of the gaming object. In some embodiments, this subset of the content of the gaming object can include, for example, quantile content of the terminal gaming object, lexile content of the terminal gaming object, the topic of the terminal gaming object, the quantile, lexile, or topic of any or all of the content objects of the gaming object, or the like. In some embodiments, the success metric can be retrieved from one of the database servers 104 and/or can be in good into the gaming system 100 via one of the user devices 106 and/or one of the other data sources 108.

After the success metric has been identified, the process 1000 proceeds to block 1004 wherein the success threshold is generated. In some embodiments, the success threshold can be a value defining a successful traversal of the learning vector and defining an unsuccessful traversal of the learning vector. The success threshold can be generated based on the success metric, and in some embodiments in which a plurality of success metrics have been identified, the success threshold can comprise a plurality of thresholds associated with the learning vector. In one such embodiment, each of the thresholds of the success threshold can be associated with one or several of the success metrics and thus, in one embodiment, for example, one of the thresholds of the success threshold can be associated with the quantile performance of the gamer in traversing the learning vector, one of the thresholds of the success threshold can be associated with the lexile performance of the gamer in traversing the learning vector, one of the thresholds of the success threshold can be associated with the gamer level of mastery of the subject matter of the gaming object, one of the thresholds of the success threshold can be associated with gamer mastery of subject matter associated with one or several of the content objects of the gaming object, one of the thresholds of the success threshold can be associated with a gamer attribute such as, for example, gamer education history, gamer learning style and/or learning tendency, or the like. In some embodiments, each of the thresholds of the success threshold can be used to identify the successful traversal of the learning vector with respect to one or more of the success metrics. Thus, in one embodiment, for example, a gamer may successfully traverse the learning vector with respect to the quantile performance of the gamer and a gamer may simultaneously fail to successfully traverse the learning vector with respect to the lexile performance of the gamer. In one such embodiment, the threshold associated with quantile performance may indicate the gamer's successful traversal of the learning vector and the threshold associated with lexile performance may indicate the gamer's failure to successfully traverse the learning vector. In some embodiments, the success threshold can be stored in one of the database servers 104 such as, for example, the evaluation database 208.

After the success threshold has been generated, the process 1000 proceeds to block 1006 wherein an assessment is generated. In some embodiments, for example, the assessment can be generated based on the content objects of the gaming object and can be configured to provide data corresponding to the success metrics and/or the generated success threshold to allow the determination of whether the gamer successfully traversed the learning vector and successfully completed the terminal gaming object of the learning vector. In some embodiments, the assessment can be generated based on the quantile level, the lexile level, or the subject matter of the gaming object and/or of the content objects of the gaming object. The assessment can be generated by the processor 102, the user device 106 and/or one of the data sources 108.

After the assessment has been generated, the process 1000 proceeds to block 1008 wherein the assessment is provided. In some embodiments, the assessment can be provided to the gamer via, for example, the user device 106 and specifically via the user interface 238. After the assessment has been provided, the process 1000 proceeds to block 1010 wherein answers and/or answer data is received. In some embodiments, the answers and/or the answer data can be received from the gamer via, for example, the user device 106 and/or the user interface 238 of the user device. After the answers and/or answer data has been received, the process 1000 proceeds to block 1012 wherein the answers are evaluated. In some embodiments, the answers and/or the answer data can be evaluated by comparing the answers and/or the answer data to a correction key and/or an evaluation metric. This comparison can be performed by the processor 102, the user device 106, or a component of either of these.

After the answers have been evaluated, the process 1000 proceeds to block 1014 wherein experience data is generated. In some embodiments, the experience data can be generated based on the results of the evaluation of the answers, and the experience data can reflect the degree to which the gamer demonstrated mastery of the subject matter of the gaming object and/or the one or several content objects of the gaming object. In some embodiments, the experience data can include information corresponding to some or all of the plurality of success metrics and/or some or all of the plurality of thresholds in the success threshold. The experience data can be generated by the processor 102, the user device 106, or a component of either of these. In some embodiments, the generation of the experience data can further include the updating of one of the databases of one of the database servers 104 via, for example, the outputting of experience data to the desired one of the database servers 104.

The present disclosure relates to systems and methods for recommending a gaming path. The recommending of a gaming path can include, for example, identifying a gamer's location within a gaming object network that can be made of a plurality of gaming objects that are interconnected by a plurality of gaming vectors. The gaming objects can each be an aggregation of content that can be, and some embodiments, associated with an assessment. The gaming vectors can each connect two of the gaming objects and thereby define a prerequisite relationship wherein the prerequisite gaming object is referred to as the incidental gaming object and the other gaming object is referred to as the terminal gaming object. Systems and methods for recommending a gaming path can further include identifying a gamer target gaming object and multiple paths made up of unique combinations of gaming objects and gaming vectors to reach the target gaming object from the gamer's current position within the gaming object network.

Gamer information can be retrieved. This information can include gamer context which can identify a gamer's past performance and/or performance history and/or one or more learning styles of the gamer. In some embodiments, information relating to the gaming objects in the various gaming paths can be retrieved. This information can identify the speed with which previous gamers traversed the gaming vectors in the gaming paths, the degree of success had by previous gamers in traversing the gaming vectors of the gaming path, and one or both of the speed with which previous gamers traversed the gaming vectors in the gaming path and the/or the degree of success had by previous gamers in traversing the gaming vectors in the gaming paths adjusted for the gamer context of the current gamer. After the gamer context and the gaming vector context are retrieved, the magnitudes of the different gaming paths are calculated. These magnitudes can indicate the expected speed with which the gamer will traverse the gaming path. In some embodiments, the strengths of the different gaming paths are calculated, which strength indicate the expected degree of success a gamer will have in traversing the gaming vector. The gaming paths are relatively ranked based on one or both of the magnitudes and strengths of the gaming paths. In one embodiment, one of the gaming paths is selected based on one or both of the magnitudes and strengths of the gaming paths, and the selected gaming path is provided to the gamer.

Figure 11:
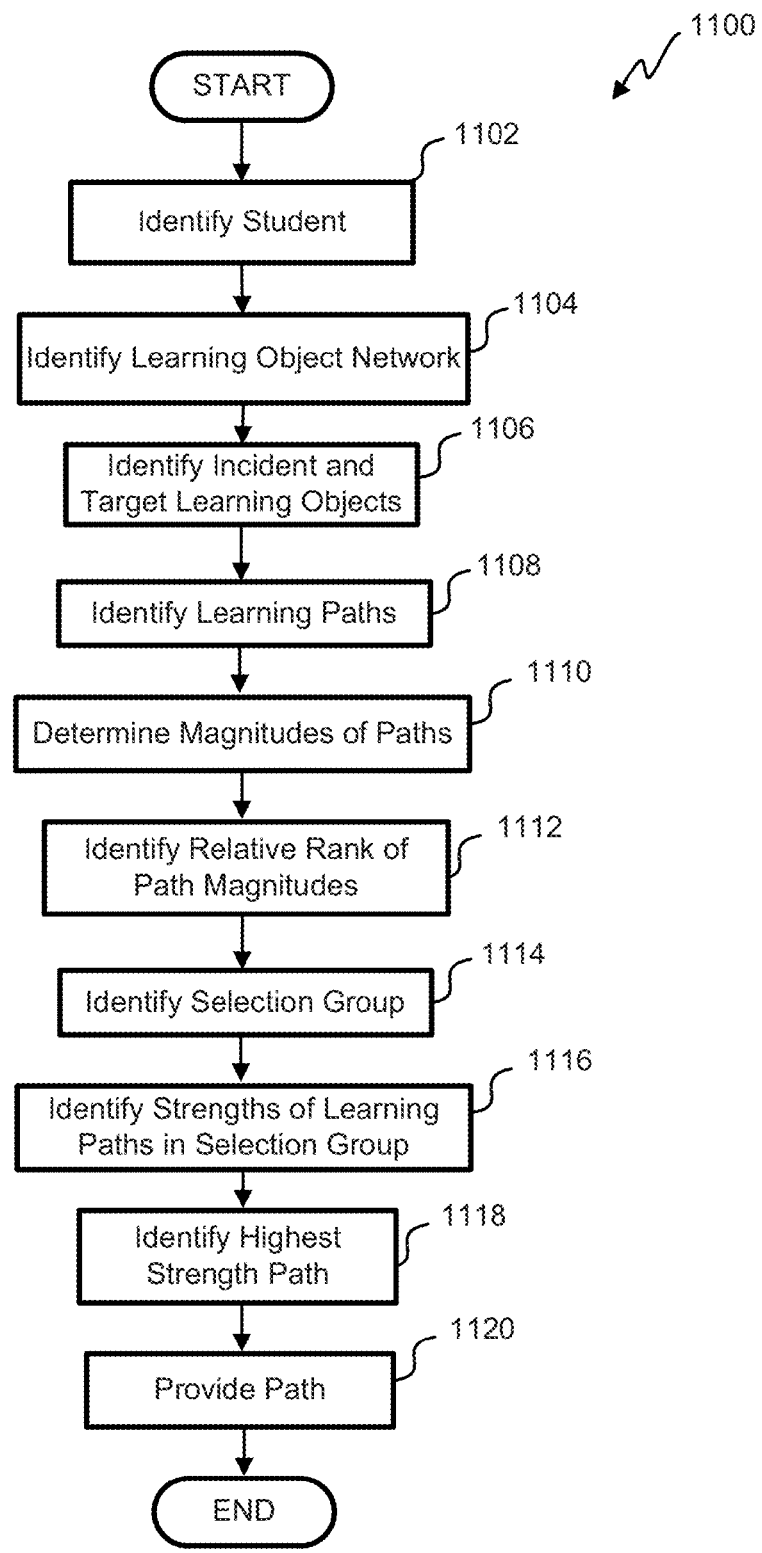
FIG. 11 is a flowchart illustrating one embodiment of a process for gaming path assignment.

With reference now to FIG. 11, a flowchart illustrating one embodiment of a process 1100 for learning path assignment is shown. In some embodiments, the process 1100 can be used in connection with the gaming object network to evaluate one or several learning paths. In some embodiments, this evaluation of the learning paths can facilitate in providing a learning path to the gamer. In some embodiments, the process 1100 can be performed by the gaming system 100 or a component thereof including, for example, the processor 102 and/or the user device 106.

The process 1100 begins at block 1102 wherein the gamer is identified. In some embodiments, for example, the gamer can be identified based on gamer interactions with the gaming system 100. These interactions can include, for example, the gamer accessing the gaming system 100 including, for example, the gamer logging onto the gaming system 100. In some embodiments, the identification of the gamer can further include the retrieval of gamer information including, for example, the gamer context from the gamer database 104-E.

After the gamer has been identified, the process 1100 proceeds to block 1104 wherein the gaming object network is identified. In some embodiments, for example, the gaming system 100 can include information relating to a plurality of gaming object networks, and in some embodiments, the gamer can be involved with and/or complete gaming objects in a plurality of gaming object networks. In some embodiments, the identification of the gaming object network can include, for example, retrieving information from the gamer database 104-E to identify gaming object networks in which the gamer is involved, or in which the gamer has completed gaming objects. In some embodiments, the identification of the gaming object network can include retrieving information relating to some or all of the gaming object networks contained in the database servers 104 including, for example, object database 202. In some embodiments, the gaming object networks can be provided to the gamer in connection with a prompt for the gamer to select one of the gaming object networks, and the gaming object network can be selected based on the gamer input received by the gaming system 100.

In some embodiments, the gaming system 100 can identify one or several gaming object networks in which the gamer is involved and/or in which the gamer has completed gaming objects and can retrieve gamer context information from the gamer database 104-E. In some embodiments, the gaming system 100 can extract information identifying one or several gamer goals from the gamer context information and can use this goal information in selecting a gaming object network. In one embodiment, for example, the gaming system 100 can identify the gaming object network corresponding to the goal requiring the greatest amount of time to complete; corresponding to a highest priority, corresponding to a gamer's learning weakness, or the like.

After the gaming object network has been identified, the process 1100 proceeds to block 1106 wherein incident and target gaming objects are identified. In some embodiments, the incident gaming object can identify the current location of the gamer within the gaming object network, and can correspond to, for example, the gaming object most recently completed by the gamer, or a gaming object designated as the incident gaming object by a user such as, for example, the gamer, the teacher, or the like. In some embodiments, the incident gaming object can be identified with information retrieved from the gamer database 104-E including, for example, the gamer context. In some embodiments, the gamer context can include information indicating the gamer's position within the gaming object network. In some embodiments, the processor 102 and/or the user device 106 can analyze information retrieved from the gamer database 104-E to identify the incident gaming object.

In some embodiments, the target gaming object can identify a gaming object, the completion of which is identified as a goal of the gamer's interaction with the gaming object network. In some embodiments, the target gaming object can be identified by a user including, for example, the gamer, the teacher, or the like. In some embodiments, the target gaming object can be separated from the incident gaming object by one or more learning vectors. In some embodiments, the target gaming object can be identified with information retrieved from the gamer database 104-E. The information retrieved from the gamer database 104-E can include the gamer context, which gamer context can include information identifying the target gaming object. In some embodiments, the processor 102 and/or the user device 106 can analyze information retrieved from the gamer database 104-E to identify the target gaming object.

After the incident target gaming object have been identified, the process 1100 proceeds to block 1108 wherein learning paths are identified. In some embodiments, the learning path can be one or several learning vectors that connect the incident gaming object to the target gaming object. In some embodiments in which the learning path comprises a plurality of learning vectors, the learning path can further include one or several gaming objects that, in connection with the learning vectors, connect the incident gaming object and the target gaming object. In some embodiments, one or several learning paths can be identified by the evaluation of prerequisite relationships between one or both of the incident gaming object and the target gaming object. This evaluation can be performed by the processor 102 and/or the user device 106.

After one or several learning paths have been identified, the process 1100 proceeds to block 1110 wherein the magnitudes of the learning paths are determined. In some embodiments, this determination can include the identification of all of the learning vectors within one of the learning paths, the retrieval of information relating to the learning vectors within one of the learning paths from the vector database 204, the determination of the magnitude of the learning vectors within one of the learning paths, and the summation of the magnitudes of the learning vectors within the one of the learning paths. In some embodiments, this determination can further include associating a value indicative of the completion of the calculation of the magnitude of the learning path with the learning path for which the magnitude was calculated, determining if a magnitude has been determined for all of the learning paths, and if the magnitude has not been determined for all the learning pounds, calculating a magnitude for the others of the learning paths. In some embodiments, this step can be performed by the processor 102 and/or by the user device 106.

After the magnitudes of the paths have been determined, the process 1100 proceeds to block 1112 wherein the relative rank of the path magnitudes is identified. In some embodiments, this can include comparing the magnitudes of the learning paths, and associating the learning paths with a value indicative of the size and/or relative size of the magnitudes of the learning paths. In some embodiments, the aggregate of these values can allow the ranking of the learning paths from largest to smallest magnitude. In some embodiments, this step can be performed by the processor 102 and/or by the user device 106.

In some embodiments, for example, the identification of the relative rank of the path magnitudes can include storing a value indicative of and/or representing the magnitude of each of the learning paths. The identification of the relative rank of the path magnitudes can further include the comparison of the values indicative of and/or representing the magnitude of each of the learning paths. In some embodiments, a first value associated with the first learning path can be compared to a second value associated with the second learning path and any other values associated with any other additional learning paths to determine which of the first, second, or other values represents a relatively larger and/or smaller magnitude and/or largest or smallest magnitude. In some embodiments, a binary value can be associated with some or all of the compared learning paths. In one embodiment, for example, a first binary value can be associated with the one of the values indicative of magnitudes of learning paths that represents a comparatively smaller magnitude and a second binary value can be associated with the one of the values indicative of the magnitudes of learning paths that represents the comparatively larger magnitude. In some embodiments, the magnitudes of the learning paths and/or the values representing the magnitudes of the learning paths can all be relatively ranked.

After the relative ranking of the magnitudes of the learning paths and/or of the values representing the magnitudes of the learning paths has been completed, one or several values indicating the relative ranking of the magnitudes of the learning paths and/or of the values representing the magnitudes of the learning paths can be stored. In some embodiments, these can be stored within one of the database servers 104.

After the relative rank of the path magnitudes has been identified, the process 1100 proceeds to block 1114 wherein a selection group is identified. In some embodiments, the selection group can comprise a subset of the identified learning paths that meet a selection condition. In some embodiments, the selection group can comprise the subset of the identified learning paths from which the provided path is selected. The selection condition can be any condition that can be used to identify one or several learning paths. In some embodiments, the selection condition can correspond to an absolute aspect of a learning path such as, for example, an attribute of the learning path, the existence of which determines the inclusion of the learning paths within the selection group, and in some embodiments, the selection condition can correspond to a relative aspect of the learning path such as, for example, an attribute of the learning path relative to the identified learning paths, the existence of which determines the inclusion of the learning path within the selection group. In one embodiment, an absolute aspect can include, a maximum or a minimum number of gaming objects and/or learning vectors within the learning path, a maximum or minimum magnitude of the learning path or of learning vectors within the learning path. In some embodiments, a relative aspect can include selecting, for example, 2 learning paths, 3 learning paths, 4 learning paths, 5 learning paths, 10 learning paths, 20 learning paths, or any other or intermediate number of learning paths having the largest or smallest magnitudes. In some embodiments, the selection group can be identified by the gaming system 100 or component thereof including the processor 102 and/or the user device 106.

In some embodiments, steps 1116 and 1118 can be skipped. In such embodiments, the process 1100 proceeds to block 1120 and the learning path having the largest or smallest magnitude is provided to the user. In some embodiments, the learning path can be provided to the user by the user device 106, and specifically by the user interface 238 of the user device 106.

In embodiments in which steps 1116 and 1118 are not skipped, the process 1100 proceeds to block 1116 wherein the strength of the learning paths in the selection group is identified. In some embodiments, the strength of one of the learning paths can comprise a value corresponding to the strength of the learning vectors within the one of the learning paths. In some embodiments, the strength of the one of the learning paths can be the average of the strength of the learning vectors within the one of the learning paths.

The strength of the learning paths can be determined by the retrieval of strength information for the learning vectors of the one of the learning paths from the vector database 204. In some embodiments, the strength information can be the generic strength of the learning vectors in the one of the learning paths, and in some embodiments, the strength information can be strength of aspects of the learning vector context that correspond to aspects of the gamer context. After the strength information has been retrieved from the vector database 204, the processor 102 and/or the user device 106 can generate the value indicative of the strength of the learning path. In some embodiments, this process can be repeated until the strength of all of the learning paths within the selection group has been identified.

After the strengths of the learning paths in the selection group have been identified, the process 1100 proceeds to block 1118 wherein the learning path having the highest strength is identified. In some embodiments, for example, this identification can be achieved via the comparison of the strengths of the learning paths in the selection group. This comparison can be performed by the processor 102 and/or the user device 106.

In some embodiments, the identification of the path having the highest strength can comprise generating a value from a combination of the learning path strength and learning path magnitude. In some embodiments, this value can be optimized to reflect a combination of likelihood of success in traversing the learning vector and expected speed of the traversal of the learning vector. In some embodiments, the learning path corresponding to the value indicating the best combination of the likelihood of success in traversing the learning vector and expected speed of traversal of the learning vector can be selected. This comparison can be performed by the processor 102 and/or the user device 106.

After the learning path having the highest strength has been identified, the process 1100 proceeds to block 1120 wherein the learning path having the highest strength is provided. In some embodiments, the learning path can be provided to the user by the user device 106, and specifically by the user interface 238 of the user device 106. The providing of this learning path can include outputting this learning path to the user device 106, and specifically to the user interface 238 of the user device 106.

Figure 12:
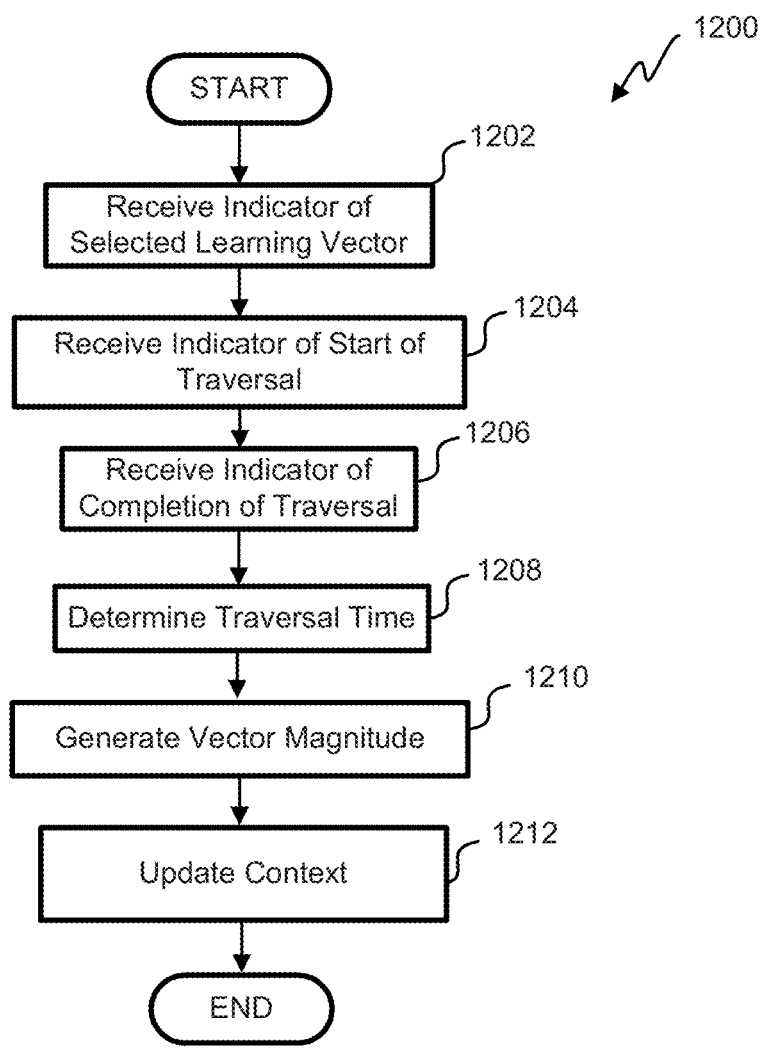
FIG. 12 is a flowchart illustrating one embodiment of a process for generating a magnitude of a gaming vector.

With reference now to FIG. 12, flowchart illustrating one embodiment of a process 1200 for generating a magnitude of a learning vector is shown. In some embodiments, the process 1200 can be performed by the processor 102 and/or the user device 106 to generate the magnitude of the learning vector and/or to determine the amount of time spent in traversing the learning vector. The process 1200 begins at block 1202 wherein an indicator of a selected learning vector is received. In some embodiments, this indicator can be received by the user device 106 in response to the user selection of the learning vector for traversal.

After the indicator of the selected learning vector is received, the process 1200 proceeds to block 1204 wherein an indicator of the start of the traversal is received. In some embodiments, the indicator of the start of the traversal can be an indicator of gamer action relating to one or several of the content objects of the terminal gaming object of the learning vector. In one embodiment, for example, the indicator of the start of the traversal of the learning vector can be provided when the user accesses the content of the terminal gaming object. In some embodiments, this access can be satisfied when a user merely opens and/or retrieves content from the terminal gaming object, and in some embodiments, this access is satisfied when the user achieves and/or maintains a desired level of interaction with the content of the terminal gaming object. Advantageously, determining access based on user levels of interaction with the content of the terminal gaming object can increase the accuracy of the determination of the magnitude of the learning vector by allowing the elimination of nonproductive time in which the content of the terminal gaming object is merely open and in which the user is not interacting with the content of the terminal gaming object and/or in which the user is trivially interacting with the content of the terminal gaming object such as when the user's interaction with the content of the terminal gaming object does not reach a desired level. In some embodiments, the indicator of the start of the traversal of the learning vector can comprise a timestamp indicating the date and/or time at which the user accessed the content of the terminal gaming object and/or interacted with the content of the terminal gaming object at a desired level.

After the indicator of the start of the traversal has been received, the process 1200 proceeds to block 1206 wherein an indicator of the completion of the traversal of the learning vector is received. In some embodiments, for example, the indicator of the completion of the traversal of the learning vector can identify when the user has completed the tasks associated with the terminal gaming object and/or ended access to content associated with the terminal gaming object. In some embodiments, the indicator of the completion of the traversal of the learning vector can comprise a timestamp identifying the date and/or time at which the user completed the tasks associated with the terminal gaming object and/or ended access to content associated with the terminal gaming object. In some embodiments, steps 1202 to 1206 can be repeated until the learning vector has been traversed.

After the indicator of the completion of the traversal of the learning vector has been received, the process 1200 proceeds to block 1208 wherein the traversal time is determined. In some embodiments, this determination of the traversal time can comprise determining the total time between the receipt of the indicator of the start of the traversal of the learning vector and the receipt of the indicator of the completion of the traversal of the learning vector, determining the amount of time between the receipt of the indicator of the start of the traversal of the learning vector and the receipt of the indicator of the completion of the traversal of the learning vector in which the user was interacting with the content of the terminal gaming object at or above a satisfactory level, repeating the previous two steps if multiple indicators of the start of the traversal of the learning vector and the completion of the traversal of the learning vector were received, and, if multiple indicators of the start of the traversal of the learning vector and of the completion of the traversal of the learning vector were received, aggregating the time, including one or both of the total time and the time in which the user interaction with the content of the terminal learning terminal object is at or above a satisfactory level.

After the traversal time has been determined, the process 1200 proceeds to block 1210 wherein the vector magnitude is generated. In some embodiments, the vector magnitude can comprise a value indicative of the amount of time used in traversing the learning vector. This value can be generated with, for example, the processor 102 and/or the user device 106. In some embodiments, when a magnitude for the learning vector has already been generated using data relating to previous gamer traversals of the learning vector, the magnitude of the learning vector can be updated with the traversal time determined in block 1208.

After the vector magnitude has been generated, the process 1200 proceeds to block 1212 wherein the learning vector context is updated. In some embodiments, for example, the update of the learning vector context can be performed by retrieving the learning vector context from one of the database servers 104, updating the learning vector context with the new and/or updated magnitude of the learning vector, and saving the updated learning vector context in one of the database servers 104 such as, for example, the vector database 204 by outputting the learning vector context to the desired one of the database servers.

Figure 13:
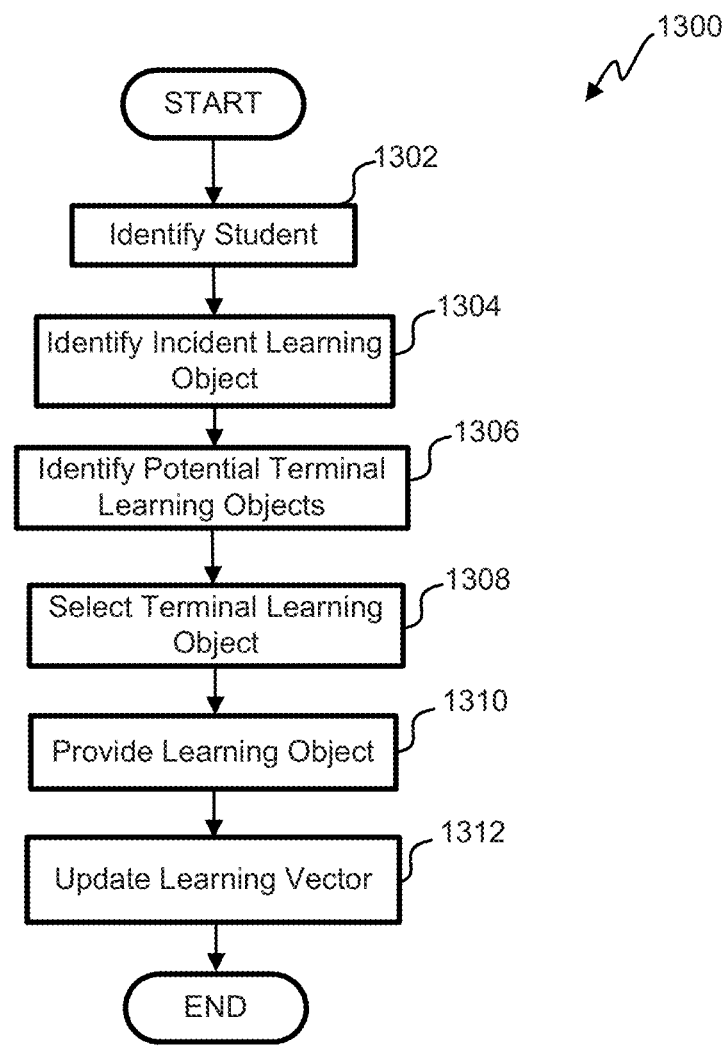
FIG. 13 is a flowchart illustrating one embodiment of a process for selecting a terminal gaming object and updating a gaming vector.

With reference now to FIG. 13, a flowchart illustrating one embodiment of a process 1300 for selecting a terminal gaming object and updating a gamer context is shown. The process 1300 begins at block 1302 wherein a gamer is identified. In some embodiments, the gamer is identified based on inputs received from the user device 106 and/or based on information stored within the gamer database 104-E. After the gamer has been identified, the process 1300 proceeds to block 1304 wherein the incident gaming object is identified. In some embodiments, after the gamer has been identified, information relating to the gamer's progress in the gaming object network 300 can be retrieved from the gamer database 104-E. This information can include, for example, the gamer context. This information can identify gaming objects that the gamer has completed and can be used to thereby identify the incident gaming object. In some embodiments, for example, the gamer context can include one or several values associated with one or several of the gaming objects, which values can indicate whether the gamer has completed the one or several of the gaming objects. In one embodiment, for example, these values can be extracted from the gamer context and the processor 102 can identify the incident gaming object as the gaming object from which no learning vector has been traversed.

After the gaming object has been identified, the process 1300 proceeds block 1306 wherein potential terminal gaming objects are identified. In some embodiments, for example, the potential terminal gaming objects are gaming objects connected to the incident gaming object via a single learning vector. In one embodiment, for example, after the processor 102 has identified the incident gaming object, the processor 102 can retrieve information relating to learning vectors from the incident gaming object. The processor 102 can then identify the gaming objects at which the identified learning vectors terminate. These identified gaming objects are the potential terminal gaming objects. In some embodiments, a value can be associated with the potential terminal gaming objects, which value can identify the potential terminal gaming objects.

After the potential terminal gaming objects have been identified, the process 1300 proceeds to block 1308 wherein a terminal gaming object is selected, for example, from one of the identified potential terminal gaming objects. In some embodiments, for example, the selection can be made by the processor 102 based on information relating to the terminal gaming objects and/or the learning vector leading to the terminal gaming object. In some embodiments, for example, the combination of the gamer context as well as the learning vector context can be used by the processor 102 in selecting the terminal gaming object.

After the terminal gaming object has been selected, the process 1300 proceeds to block 1310 wherein the gaming object is provided. In some embodiments, for example, the gaming object can be provided to the user including, for example, the gamer, via the user device 106, and specifically via the network interface 230, the content engine 232, and/or the user interface 238. In some embodiments, providing the gaming object to the user can further include receiving answers which can be, for example, the inputs provided by the user in response to the assessment and/or answer data which answer data can be, for example, data generated based on the answers such as an indication of correct or incorrect answers, a score, an evaluation, or the like.

After the gaming object has been provided, the process 1300 proceeds to block 1312 wherein the gamer context is updated. In some embodiments, for example, the gamer context can be updated, by the processor 102 and/or the user device 106, according to the received answers and/or answer data. In some embodiments, the gamer context can be updated to reflect an aspect of gamer performance in traversing the learning vector and/or in completing the terminal gaming object of the learning vector. The gamer context can be updated by outputting one or several signals containing data indicative of an update to the gamer context to the one or several of the database servers 104 containing the gamer context. This data is then used by the one or several database servers 104 to update the gamer context.

The following flowcharts illustrate embodiments of processes for updating a learning vector and/or for generating data used in updating the learning vector. These processes can be performed as part of process 1300 depicted in FIG. 13, or separate from the process 1300 depicted in FIG. 13.

Figure 14:
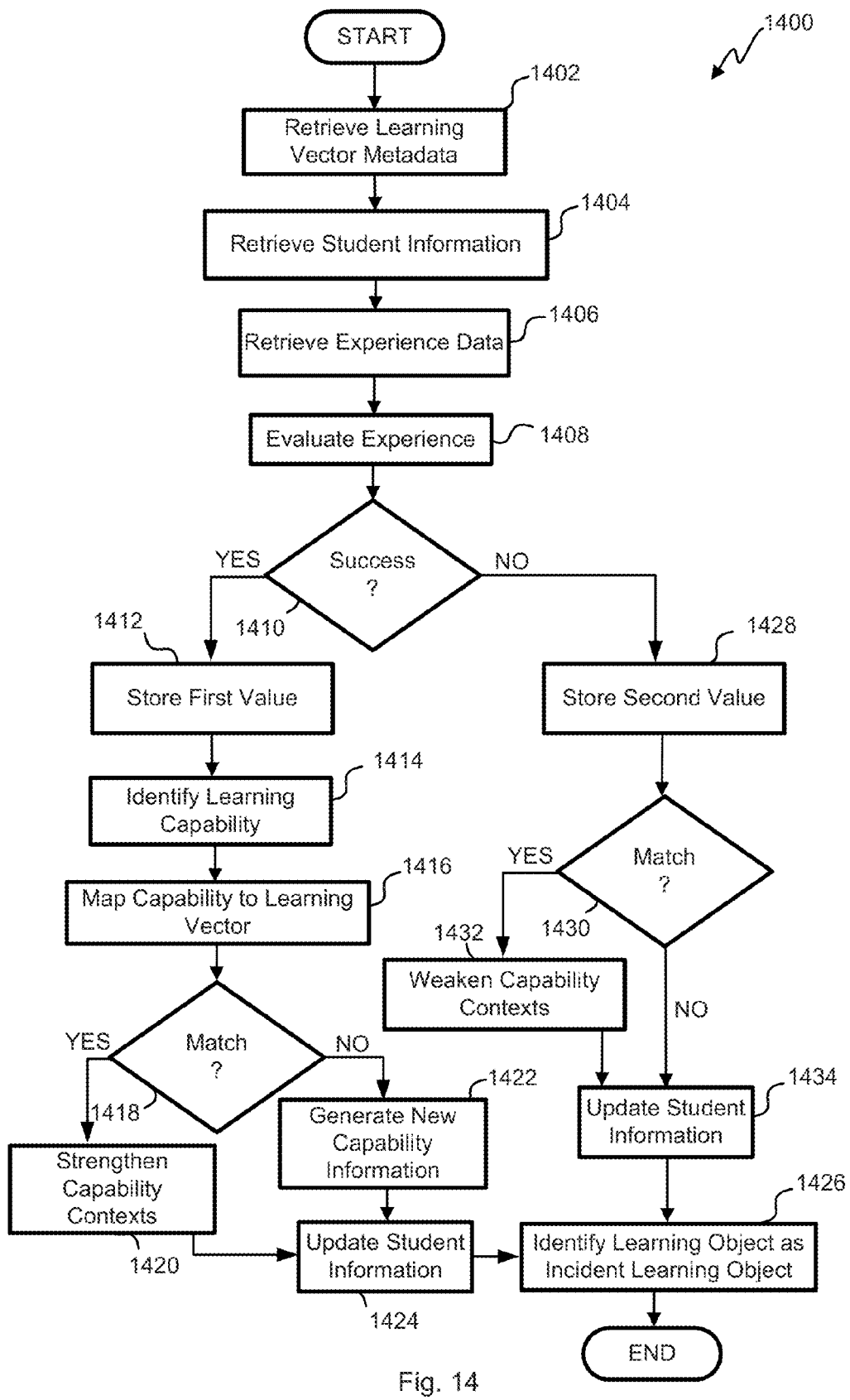
FIG. 14 is a flowchart illustrating one embodiment of a process for updating a gamer context based on the gamer outcome and a gaming vector context.

With reference now to FIG. 14, a flowchart illustrating one embodiment of a process 1400 for updating a gamer context based on a gamer outcome and a learning vector context is shown. The process 1400 can be performed by the gaming system 100 or by a component thereof including, for example, the processor 102 and/or the user device 106. The process 1400 begins at block 1402 wherein learning vector metadata is received. In some embodiments, the learning vector metadata can be received from the vector database 204, and can include information identifying the strength, magnitude, direction, or other aspects of the vector. In some embodiments, the vector metadata can include information identifying a learning vector context. The learning vector context can comprise aggregated data relating to gamers who have traversed the learning vector. In some embodiments, this information can include correlations between all or portions of the gamer context and outcomes of traversing the learning vector. In some embodiments this information can include correlations between the learning style of the gamer and the expected level of success in traversing the learning vector.

After the learning vector metadata has been received, the process 1400 proceeds to block 1404 wherein gamer information is retrieved. In some embodiments, the gamer information can comprise gamer context information, which gamer context can identify a gamer's learning style, the gamer's current gaming objectives, and/or the gamer's learning performance history which can be, for example, biased for temporal significance. In some embodiments, the gamer context can be received from the gamer database 104-E.

After the gamer information has been retrieved, the process 1400 proceeds to block 1406 wherein experience data is retrieved. In some embodiments, the experience data can identify the gamer experience in traversing the learning vector. Specifically, the experience data can identify the success and/or degree of success of the gamer in traversing the learning vector, the speed with which the gamer traversed the learning vector, or the like. In some embodiments, the experience data can be retrieved from the user device 106 and/or the data source 108.

After the experience data has been retrieved, the process 1400 proceeds to block 1408 wherein the gamer experience is evaluated. In some embodiments, the evaluation of the gamer experience can be performed by the processor 102 and/or by the user device 106. In some embodiments, this evaluation can include determining whether the gamer successfully traversed the learning vector and successfully completed material associated with the gaming object. After the gamer's experience with the learning vector has been evaluated, the process 1400 proceeds to decision state 1410 wherein it is determined if the gamer successfully traversed the learning vector. In some embodiments, this determination can be made by the processor 102 or the user device 106. In some embodiments, the determination of the gamer success can include associating a value, according to a Boolean function, with the gamer. In such an embodiment, a first value can be associated with the gamer if the gamer successfully traversed the learning vector, and a second value can be associated with the gamer if the gamer did not successfully traverse the learning vector.

If it is determined that the gamer successfully traversed the learning vector, then the process 1400 proceeds to block 1412 wherein the first value is stored. In some embodiments, the first value can be stored in one of the database servers 104 including, for example, the gamer database 210. After the first value has been stored, the process 1400 proceeds to block 1414 wherein the learning capability of the gamer is identified. In some embodiments, the identification of the learning capability the gamer can include retrieving information from the gamer context identifying the gamer's learning style and/or the gamer's historic learning experiences. In some embodiments, this information can identify how a gamer learns, best modes for the gamer to learn, subject matter abilities or difficulties, or the like. In some embodiments, this identification can be performed by the processor 102, by the user device 106, or by a component of either of these.

After the learning capability of the gamer is identified, the process 1400 proceeds to block 1416 wherein the learning capability of the gamer is mapped to the learning vector, and specifically to the learning vector metadata including the learning vector context. In some embodiments, this step can include determining whether aspects of the gamer context, and specifically the gamer learning style correspond with information generated by gamers that have previously traversed the learning vector. In one embodiment, for example, this can include determining whether previously traversing garners had the same learning style and/or same or similar learning context as the current traversing gamer. In some embodiments, this mapping can be performed by the processor 102 and/or by the user device 106.

After the capability of the gamer has been mapped to the learning vector, the process 1400 proceeds to decision state 1418 wherein it is determined if the gamer learning capability, and particularly, if the gamer learning style corresponds to the learning styles of garners who successfully traversed the learning vector. This determination can be made, in some embodiments, by the processor 102 and/or by the user device 106. If it is determined that there is a match, then the process 1400 proceeds to block 1420 wherein the gamer contexts are strengthened. In some embodiments, this can include strengthening the aspects of the gamer context that relate to one or several learning styles. In some embodiments, for example, the strength of the gamer context can be increased by positively incrementing a value associated with the gamer context.

Returning again to decision state 1418, if it is determined that the gamer learning capability does not correspond to the learning styles of garners who have successfully traversed the learning vector, the process 1400 proceeds to block 1422, wherein new capability information is generated. In some embodiments, the new capability information can be information that relates to one or several learning styles, and can be information that can be added to the gamer context that can be, for example, stored in the gamer database 104-E. In some embodiments, the new capability information can correspond to the learning styles of garners that have successfully traversed the current learning vector. In some embodiments, the new capability information can be generated by the processor 102 and/or the user device 106.

After the new capability information has been generated, or, returning again to block 1420, after the capability contexts have been strengthened, the process 1400 proceeds to block 1424 wherein gamer information is updated. In some embodiments, the gamer information can be updated by storing information relating to the strengthening of capability contexts and/or to new capability information in the gamer database 210 via, for example, the outputting of this information to the gamer database 210. After this information has been updated, the process 1400 proceeds to block 1426 wherein the completed gaming object of the traversed learning vector is identified as a new incident gaming object. In some embodiments, this can include associating a value with the completed gaming object, and storing this value in, for example, the gamer database 104-E. In some embodiments, this step can further include identifying a new terminal gaming object and the therewith associated learning vector. In some embodiments, this identification can be performed by the processor 102 or the user device 106, and can be based on information contained within one or more of the database servers 104.

Returning again to decision state 1410, if it is determined that the gamer did not successfully traverse the learning vector, then the process 1400 proceeds to block 1428 wherein the second value is stored. In some embodiments, the second value can be stored in one of the database servers 104 including, for example, the gamer database 104-E.

After the second value has been stored, the process 1400 proceeds to decision state 1430 wherein it is determined if the learning capability of the gamer that currently traversed the learning vector, and particularly, if that gamer's learning style corresponds to the learning styles of gamers who previously successfully traversed the learning vector. In some embodiments, this can include identifying the learning capability of the gamer as discussed in block 1414 and/or mapping the learning capability of the gamer to the learning vector, and particularly to the context of the learning vector as discussed in block 1416. This determination can be made, in some embodiments, by the processor 102 and/or by the user device 106. If it is determined that there is a match between the learning capability of the gamer that currently traversed the learning vector and gamers that previously successfully traversed the learning vector, then the process 1400 proceeds to block 1432 wherein the gamer context of the gamer that currently traversed the learning vector is weakened. In some embodiments, this can include weakening aspects of the gamer context indicative of one or several learning styles. In some embodiments, this weakening can include decrementing a value associated with the gamer context.

After the gamer context has been weakened, or, returning again to decision state 1430, if it is determined that there is not a match between the gamer context of the gamer that currently traversed the learning vector and gamers that previously successfully traversed the learning vector, then the process 1400 proceeds to block 1434 wherein gamer information is updated. In some embodiments, for example, this can include updating the gamer context to reflect the failure of the gamer in traversing the learning vector. In some embodiments, for example, this can further include updating the gamer context to reflect the weakening of block 1432. This updating can include the outputting of data indicative of the update of the gamer context to the one or several of the database servers 104 containing the gamer context. The one or several recipient database servers 104 can then use this information to update the gamer context.

After the gamer information has been updated, the process 1400 proceeds to block 1426 wherein the completed gaming objective is identified as an incident gaming objective and the new terminal gaming objective and the associated learning vector is identified. In some embodiments, this identification can be performed by the processor 102 and/or the user device 106 and can be based on information contained within one or more of the database servers 104.

Figure 15:
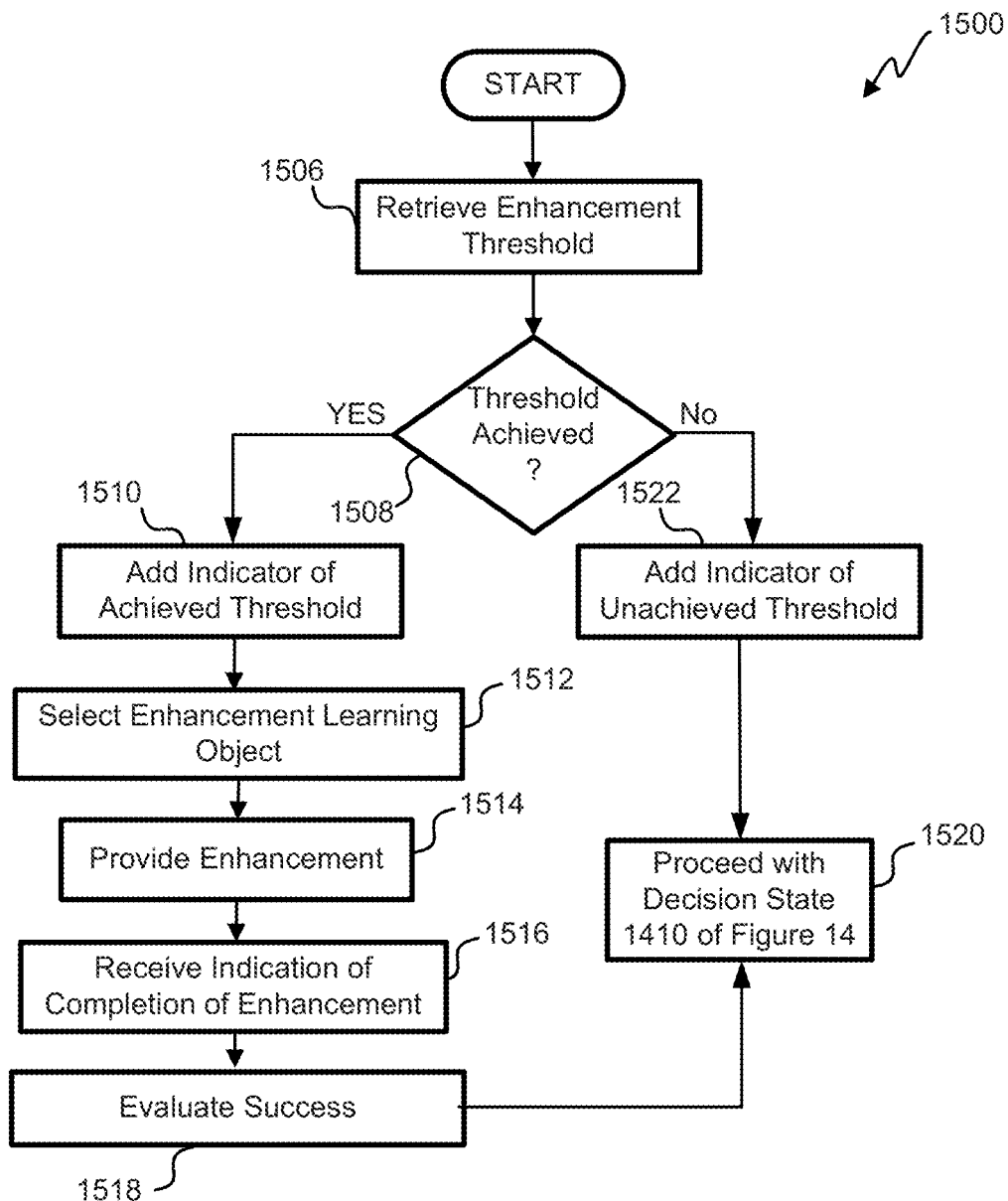
FIG. 15 is a flowchart illustrating one embodiment of a process for providing education enhancement to a gamer.

With reference now to FIG. 15, a flowchart illustrating one embodiment of a process 1500 for providing education enhancement is shown. In some embodiments, the process 1500 can be performed when a gamer's progress through gaming objects exceeds a threshold. In such embodiments, this exceeding of the threshold indicates that the gamer has additional learning capacity. In some embodiments, this threshold can be a speed threshold indicating that the gamer is rapidly progressing through subject matter associated with one or several gaming objects, and in some embodiments, the threshold can be an accuracy threshold indicating a high degree of gamer comprehension of the subject matter of the gaming objects. In some embodiments, the threshold can be triggered based on gamer performance with respect to a single gaming object, and in some embodiments, the threshold can be triggered based on gamer performance within a learning path comprising a plurality of gaming objects. Thus, in one embodiment, if the speed with which the gamer completes a single learning vector, or completes a group of learning vectors exceeds a threshold, the gamer can be designated for enhancement. In some embodiments, for example, the enhancement designation can occur without gamer input, and in some embodiments, the enhancement designation can include gamer input. Thus, in some embodiments, the gamer can choose whether to receive an enhancement gaming object. The process 1500 can be performed as a part of process 1400 depicted in FIG. 14, and specifically after the step of block 1408 of FIG. 14. The process 1500 can be performed by the gaming system 100 and/or by a component thereof including, for example, the processor 102 or the user device 106.

The process 1500 begins at block 1506 wherein an enhancement threshold is retrieved. The enhancement threshold can define the boundary that when, surpassed, identifies a gamer as qualifying for an enhancement. In some embodiments, and as discussed above, the enhancement can include the providing of one or several additional gaming objects, which gaming objects are not included in the learning path. In some embodiments, the enhancement threshold can define an accuracy, a velocity, or any other indicator of gamer performance. In one embodiment, for example, the enhancement threshold can specify a velocity for completion of the gaming object and/or a degree of success for completion of a gaming object. In some embodiments, for example, when a gamer completes the gaming object with a velocity higher than the threshold value and/or with a degree of success higher than the threshold value, the gaming system 100 can recommend enhancement.

In some embodiments, the enhancement threshold can be retrieved from one of the database servers 104 such as, for example, the object database 202. In some embodiments, the enhancement threshold can be associated with a single gaming object, and in some embodiments, the enhancement threshold can be associated with the plurality of gaming objects. Thus, in some embodiments, an enhancement threshold is retrieved that is specific to the currently traversed gaming object, and in some embodiments, an enhancement threshold is retrieved that is nonspecific to the currently traversed gaming object.

After the enhancement threshold has been retrieved, the process 1500 proceeds to decision state 1508 wherein it is determined if the enhancement threshold has been achieved. In some embodiments, for example, this can include comparing experience data with the enhancement threshold. In some embodiments, a binary value can be associated with the gamer experience data so as to indicate whether the threshold has been achieved. In one embodiment, for example, the determination of whether the threshold has been achieved can be performed according to a Boolean function wherein a first value is assigned if the threshold has been triggered and a second value is assigned if the threshold is not triggered. In some embodiments, this determination can be made by the processor 102 and/or the user device 106.

If it is determined that the threshold has been achieved, then the process 1500 proceeds to block 1510 wherein an indicator of the achieved threshold is added. In some embodiments, for example, this can include the storing of the first value assigned according to the Boolean function in one of the database servers 104 such as, for example, in the gamer database 104-E.

After the indicator of the achieved threshold has been added, the process 1500 proceeds to block 1512 wherein the enhancement gaming object is selected. In some embodiments, the enhancement gaming object can be selected in a variety of manners. In some embodiments the enhancement gaming object can comprise the same subject matter as the currently traversed learning vector and the currently completed gaming object, and in some embodiments, the enhancement gaming object can comprise subject matter different than that of the currently traversed learning vector. In some embodiments, the enhancement gaming object can comprise the same subject matter as the currently completed gaming object, but can have, for example, an increased quantile and/or lexile level. In some embodiments, the enhancement gaming object can comprise information related to the subject matter of the currently traversed learning vector and the currently completed gaming object such as, for example, in the event that the currently completed gaming object is a non-history topic, the enhancement gaming object may include history relating to the subject matter of the currently completed gaming object. Thus, in some embodiments, the enhancement gaming object can provide information that is relevant to and/or related to the subject matter of the currently completed gaming object, but which information is not included in the current learning path.

The enhancement gaming object can be selected in a variety of ways. In some embodiments, the enhancement gaming object can be stochastically selected, and in some embodiments, the enhancement gaming object can be selected based on the gamer context. Thus, in one embodiment, the enhancement gaming object can be selected to facilitate the gamer's improvement in either expanding the gamer's learning styles, expanding the gamer's skills, and/or the like. In one embodiment, for example, the gaming system 100 can analyze a gamer context to identify a weakness in the gamer skills and the enhancement gaming objective can be selected so as to strengthen and/or improve this gamer weakness. In some embodiments, the enhancement gaming object can be selected by, for example, the processor 102 and/or the user device 106.

After the enhancement gaming object has been selected, the process 1500 proceeds to block 1514 wherein the enhancement gaming object is provided. In some embodiments, the enhancement gaming object can be provided to the gamer via the user device 106, and specifically via the user interface 238 of the user device 106. After the enhancement gaming object has been provided, the process 1500 proceeds to block 1516 wherein an indication of the completion of the enhancement and/or the traversal of the enhancement vector is received. In some embodiments, this indication can be received by and/or from the user device 106 and can be provided to the other components of the gaming system 100. In some embodiments, this indication can comprise an indication that the gamer received the learning material of one or several content objects of the enhancement gaming object. In one embodiment, for example, the indication can comprise one or several answers provided in response to the content of the assessment object of the enhancement gaming object.

After the indication of the completion of the enhancement object has been received, the process 1500 proceeds to block 1518 wherein the gamer success is evaluated. In some embodiments, the gamer success can be evaluated by comparing the indication of the completion of the enhancement gaming object to answer data stored within one of the database servers 104 such as, for example, the object database 202. In some embodiments, a score can be generated based on the number of questions that the gamer correctly answered and/or the level of accuracy provided by the gamer in response to the prompts of the assessment object.

After the gamer success has been evaluated, the process 1500 proceeds to block 1520 and proceeds with block 1410 of FIG. 14. In some embodiments, for example, the process of FIG. 14 can be performed to update the gamer context with both information from the completed gaming object that gave rise to the enhancement, as well as with the information from the completion of the enhancement gaming object.

Returning again to decision state 1508, if it is determined that the threshold has not been achieved, then the process 1500 proceeds to block 1522 wherein an indicator of the unachieved threshold is added. In some embodiments, for example, this can include the storing of the second value assigned according to the Boolean function in one of the database servers 104 such as, for example, the gamer database 104-E. After the indicator of the non-achievement of the threshold has been added, the process 1500 proceeds to block 1520 and continues with block 1410 of FIG. 14. In some embodiments, for example, the remaining steps of the process of FIG. 14 can be performed to update the gamer context with both information from the completed gaming object that gave rise to the enhancement, as well as with the information from the completion of the enhancement gaming object.

Figure 16:
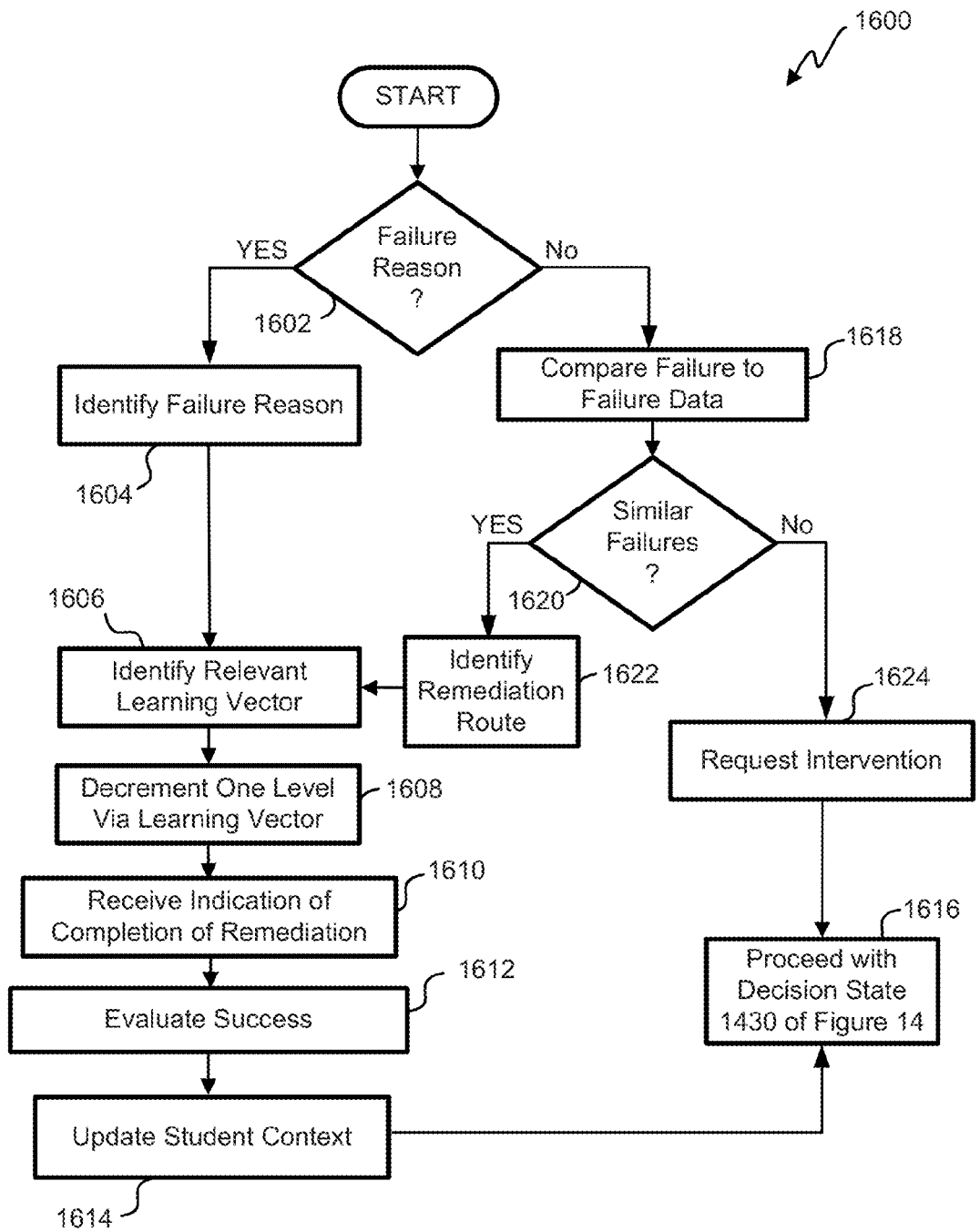
FIG. 16 is a flowchart illustrating one embodiment of a process for providing remediation to a gamer.

With reference now to FIG. 16, flowchart illustrating one embodiment of a process 1600 for providing remediation to a gamer is shown. In some embodiments, the process 1600 can be performed in response to a gamer failure with respect to one or several gaming objects. The failure with respect to one or several gaming objects can take a variety of forms. In one embodiment, for example, the failure can be based on responses provided to one or several assessment objects. The process 1600 can be performed by the gaming system 100 and/or a component thereof including, for example, the processor 102 and/or the user device 106.

The process begins at decision state 1602 wherein it is determined if there is an identifiable failure reason. In some embodiments, for example, a gamer may fail to complete a learning objective based on, for example, a deficiency in unrelated subject matter such as a quantile and/or lexile deficiency, and in some embodiments, the gamer may fail based on a subject matter deficiency, such as, for example, failing to adequately master some or all prerequisite material. In some embodiments, this determination can be performed by the processor 102 and/or the user device 106.

If there is an identifiable failure reason, then the process 1600 proceeds to block 1604 wherein the failure reason is identified. In some embodiments, the failure reason can be identified by analysis of the gamer context and/or inputs provided in response to the assessment object. In some embodiments, the failure reason can be determined by analysis of information relating to the gaming object and/or the learning vector such as the vector context which can be retrieved from, for example, the object database 202 and/or the vector database 204. In some embodiments, for example, a learning vector and/or a gaming object can be associated with a lexile level and/or quantile level and in some embodiments, the determination of decision state 1602 can include a comparison of the quantile and/or lexile levels of the gaming object with context information relating to the gaming object and/or the learning vector. In some embodiments, the determination of the failure reason can be performed by the processor 102 and/or the user device 106.

After the failure reason has been identified, the process 1600 proceeds to block 1606 wherein the relevant learning vector is identified. In some embodiments, for example, the relevant learning vector is the learning vector that addresses the source of the failure. Thus, in some embodiments, the relevant learning vector can correspond to a gaming object that will facilitate in increasing the quantile and/or lexile level of the gamer, and in some embodiments, the relevant learning vector can correspond to a learning vector that will facilitate increasing the gamer's comprehension of prerequisite subject matter. After the relevant learning vector has been identified, the process 1600 proceeds to block 1608 wherein the gamer is stepped back to a lower level gaming object via the identified learning vector. In some embodiments, for example, this can correspond to the gamer being stepped back to subject matter having a lower quantile and/or lexile level and/or being stepped back to a gaming object comprising prerequisite subject matter. In some embodiments, this step can further comprise providing the gamer with the decremented gaming object via, for example, the user interface 238 of the user device 106.

After the gaming object has been provided to the gamer, the process 1600 proceeds to block 1610 wherein an indication of the completion of the remediation gaming object is received. In some embodiments, the indication of the completion of the remediation gaming object is received via the user interface 238 of the user device 106. In some embodiments, and as discussed above with respect to block 1516 of FIG. 15, this indication can comprise gamer inputs provided in response to a prompt of one or several content objects of the gaming object including, for example, one or several assessment objects.

After the indication of the completion of the remediation gaming object is received, the process 1600 proceeds to block 1612 wherein the level of gamer success in completion of the remediation gaming object is evaluated. In some embodiments, the gamer success can be evaluated by comparing the indication of the completion of the remediation gaming object to answer data stored within one of the database servers 104 such as, for example, the object database 202. In some embodiments, score can be generated based on the number of questions that the gamer correctly answered and/or the level of accuracy provided by the gamer in response to the prompts of the assessment object.

After the success of the gamer has been evaluated, the process proceeds to block 1614 wherein the gamer context is updated. In some embodiments, for example, the gamer context can be updated according to the process depicted in block 1410 through 1434 of FIG. 14. In some embodiments, the updated gamer context can further include the update of the vector context associated with the gaming object. After the gamer context has been updated, the process 1600 proceeds to block 1616 and continues with block 1430 of FIG. 14.

Returning again to decision state 1602, if it is determined that there is not an identifiable failure reason, then the process 1600 proceeds to block 1618 wherein the current failure of the gamer in traversing the learning vector and in completing the gaming object is compared to failure data. In some embodiments, this failure data can be retrieved from one of the database servers 104 such as, for example, the object database 202. In some embodiments, the failure data can comprise an identification of gamer contexts of gamers that failed to successfully traverse the learning vector and complete the gaming object. In some embodiments, the comparison of the failure of the gamer in traversing the current learning vector to the failure data can include retrieving a failure data from one of the database servers 104, and specifically from the object database 202. In some embodiments, the comparison of the failure data to the current failure of the gamer to traverse the learning vector can include the identification of any common traits and/or attributes of the gamer context of the gamer that currently failed to traverse the learning vector with the gamer contexts of gamers who previously failed to traverse the learning vector.

After information relating to the current gamer failure to traverse the learning vector has been compared with failure data, the process 1600 proceeds to decision state 1620 wherein it is determined if similar failures are identified within failure data. In some embodiments, the similar failures can be identified based on commonalities between the gamer context of gamers who previously failed to traverse the learning vector and the gamer context of the gamer who currently failed to traverse the learning vector. In some embodiments, the determination can be made according to a Boolean function wherein a first value is associated with the experience data of the gamer who currently failed to traverse the learning vector if that gamer shares commonalities with gamers who previously failed to successfully traverse the learning vector, and wherein a second value is associated with the experience data of the gamer who currently failed to traverse the learning vector if that gamer does not share commonalities with gamers who previously failed to traverse the learning vector.

If it is determined that the gamer who currently failed to traverse the learning vector shares commonalities with gamers that previously failed to successfully traverse the learning vector, then the process 1600 proceeds to block 1622 and the remediation route is identified. In some embodiments, the remediation route can comprise one or several gaming objects that were used to remedy the failure of gamers who previously failed to traverse the learning vector. After the remediation route is identified, the process 1600 proceeds to block 1606 and continues as outlined above.

Returning to decision state 1620, if it is determined that the gamer who currently failed to traverse the learning vector does not share commonalities with gamers who previously failed to successfully traverse the learning vector, the process 1600 proceeds to block 1624 wherein intervention is requested. In some embodiments, the intervention can comprise an intervention request that can include associating a value indicative of the request for intervention with the gamer experience information and adding the value indicative of the request for intervention to one of the database servers 104 such as, for example, the gamer database 104-E. After the value indicative of the request for intervention has been associated with the gamer experience data, a request for information can be provided to the user via the user device 106. After the request for intervention has been made, the process 1600 proceeds to block 1616 and continues with block 1430 of FIG. 14.

Figure 17:
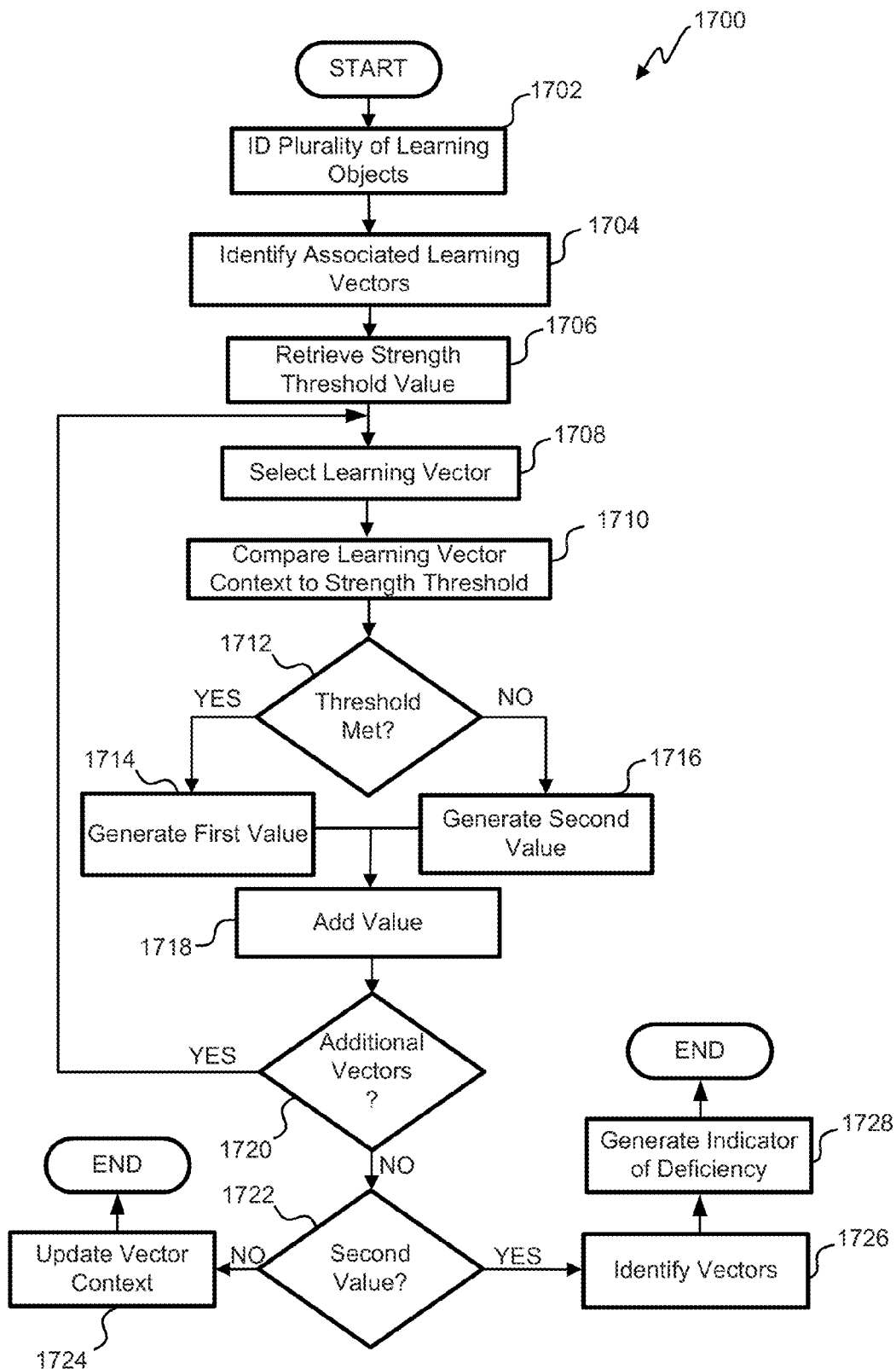
FIG. 17 is a flowchart illustrating one embodiment of a process for identifying a gaming object for improvement via comparison to a strength threshold.

With reference now to FIG. 17, a flowchart illustrating one embodiment of a process 1700 for optimizing a gaming object is shown. In some embodiments, the process 1700 can be used in connection with the gaming object network 300 to identify gaming objects for optimization, improvement, and/or update. In some embodiments, the process 1700 can be performed by the gaming system 100 and/or a component thereof including, for example, the processor 102 and/or the user device 106. The process begins at block 1702 wherein a plurality of gaming objects is identified. In some embodiments, the plurality of gaming objects can correspond to a set of gaming objects that can include every gaming object within the gaming object network 300, or can include a portion of the gaming objects within the gaming object network 300.

The plurality of gaming objects can be identified in any desired manner. In some embodiments, for example, the plurality of gaming objects can be identified based on association with a subject matter, a skill, a learning ability, a learning style, a gamer, a teacher, or any other desired parameter. In one embodiment, for example, the plurality of gaming objects can be randomly selected from the gaming objects contained within the gaming object network 300. In some embodiments, the processor 102 can identify a plurality of gaming objects by retrieving and using information relating to the gaming objects from the object database 202 and/or the vector database 204.

In some embodiments, identifying the plurality of learning objects can include, for example, identifying the plurality of servers including, for example, database servers 104 and/or data sources 108 that contain the desired learning objects. After the servers storing the desired learning objects are identified, identifying the plurality of learning objects can include outputting a request to the identified servers for the desired learning objects. In response to this request, the identified servers can provide a response such as, for example, providing information relating to the desired learning objects to the server 102 and/or providing the desired learning objects to the server 102.

After the plurality of gaming objects has been identified, the process 1700 proceeds to block 1704 wherein learning vectors associated with the learning objects are identified. In some embodiments, the learning vectors associated with the learning objects can include learning vectors coming to the learning objects and learning vectors going from the learning objects. In some embodiments, the processor 102 can identify the associated learning vectors by retrieving and using information relating to the learning objects from the object database 202 and/or the vector database 204. In some embodiments, this can also include identifying the one or several servers containing the learning vectors and/or information relating thereto. In some embodiments, this can be, for example, the same one or several servers containing the learning objects, and in some embodiments, this can be one or several different servers than those containing the learning objects. In some embodiments, the one or several servers containing the learning vectors can be identified through a series of queries and response, and the information relating to the learning vectors and/or the learning vectors can be provided to the server 102.

After the associated learning vectors have been identified, the process 1700 proceeds to block 1706 wherein a strength threshold value is retrieved. In some embodiments, the strength threshold value can identify a minimum vector strength and/or vector magnitude that is acceptable. In some embodiments, the strength threshold value can be any value and can, in some embodiments, be selected based on a desired educational outcome. The strength threshold value can be retrieved by the processor 102 and/or the user device 106 from, for example, the evaluation database 208. In some embodiments, the strength threshold value can be retrieved by querying the evaluation database 208 for the strength threshold value, and, in response to the query, receiving an input containing the strength threshold value from the evaluation database 208.

After the strength threshold value has been retrieved, the process 1700 proceeds to block 1708 wherein a learning vector is selected. In some embodiments, for example, the learning vector can be randomly selected, and in some embodiments, the learning vector can be selected according to a selection pattern. In one embodiment, for example, the gaming objects within the plurality of gaming objects can be assigned a value based on the skill and/or knowledge level associated with each of the gaming objects, based on the prerequisite relationships between the gaming objects, or the like. In some embodiments, the learning vector can be selected based on its skill and the/or knowledge level, based on a prerequisite relationship, or in any other desired fashion. In some embodiments, a learning vector can be selected that is one of the identified associated learning vectors and that has not been analyzed as part of process 1700 and/or for which a condition has been met such as, for example, a specified amount of time has not passed since the last time the learning vector was analyzed as part of process 1700.

After the learning vector has been selected, the process 1700 proceeds to block 1710 wherein aspects of the learning vector context are compared to the strength threshold. In some embodiments, the comparison of aspects of the learning vector context can include the retrieval of the learning vector context from the vector database 204 and the identification and selection of learning vector context information relevant to the strength threshold value. In some embodiments, for example, the relevant aspects of the learning vector context can include, the vector strength, the vector strength as a function of gamer context, the vector magnitude, the vector magnitude as a function a gamer context, or the like. After the vector context information has been retrieved, and, if desired, relevant aspects of the vector context data have been identified, the vector context data can be compared to the strength threshold value according to a Boolean function. This comparison can be performed by the processor 102 and/or by the user device 106.

After the learning vector context has been compared to the strength threshold, the process 1700 proceeds to decision state 1712 wherein it is determined if the threshold is met. In some embodiments, this determination can be made by the processor 102 and/or the user device 106. If it is determined that the threshold has been met, then the process 1700 proceeds to block 1714 wherein a first, true value indicative of the threshold being met is generated, and in some embodiments, if it is determined that the threshold has not been met, then the process 1700 proceeds to block 1716 wherein a second, false value indicative of the threshold not being met is generated.

After either the first or the second value has been generated, the process 1700 proceeds to block 1718 wherein the generated value is added to the vector context data for the therewith associated learning vector. In some embodiments, this value can be added to one of the database servers 104 including, for example, the vector database 204. After the value has been added, the process 1700 proceeds to decision state 1720 wherein it is determined if there are additional vectors. In some embodiments, this can include determining if all of the learning vectors have been compared to the strength threshold value, or if any of the learning vectors have not been compared to the strength threshold value. In some embodiments, this determination can be made by identifying the learning vectors associated with the plurality of gaming objects, retrieving the vector context information for the identified learning vectors, and determining if any of the identified learning vectors is not associated with either the first or the second value. If additional learning vectors are identified, or in one embodiment, if a learning vector is identified that is not associated with either the first or the second value, then the process 1700 returns to block 1708 and continues as outlined above.

Returning again to decision state 1720, if no additional learning vector is identified, or in one embodiment, it is determined that all of the learning vectors are associated with either the first or the second value, then the process 1700 proceeds to decision state 1722 wherein it is determined if any of the learning vectors did not meet the strength threshold. In some embodiments, this can include identifying learning vectors associated with the plurality of gaming objects and determining if any of those learning vectors is associated with the second value. If none of the learning vectors are associated with the second value, then the process 1700 proceeds to block 1724 wherein the learning vector context is updated. In some embodiments, for example, the learning vector context can be updated with a value indicating the comparison of the gaming object to the strength threshold. In some embodiments, this value can identify a time and/or date of the comparison of the gaming object to the strength threshold, can identify the level of the aspect of the learning vector context compared to the strength threshold, and/or the number of gamers who had traversed the learning vector at the time of the comparison of the learning vector context to the strength threshold value. In some embodiments, this value can be stored in the vector database 204.

Returning again to decision state 1722, if it is determined that second value has been added to one or several of the learning vectors associated with the identified gaming objects, then the process 1700 proceeds to block 1726 wherein those learning vectors are identified. In some embodiments, the learning vectors can be identified by the processor 102 and/or by the user device 106 by retrieving the learning vector context information from the vector database 204 and searching the learning vector context information for the second value. In some embodiments, learning vectors associated with the second value can be added to a database of inadequate learning vectors. In some embodiments, this database of the inadequate learning vectors can be a sub database within the vector database 204. In some embodiments, inadequate learning vectors can be prioritized within the sub database such that learning vectors failing to meet the strength threshold by the greatest margin are identifiable.

After learning vectors have been identified that are associated with the second value, then the process 1700 proceeds to block 1728 wherein an indicator of the deficiency of the learning vector is generated. In some embodiments, this indicator can be, for example, a message identifying one or several inadequate learning vectors. This message can be generated by the processor 102 and/or the user device and can be provided to a user via the user interface 238 and/or be provided to a data source 108 such as an educational resource 108-A. In some embodiments, this indicator of the deficiency of the learning vector can be used as a prompt to modify and/or update the terminal gaming object of the learning vector and/or to evaluate the prerequisite relationship between the incident gaming object in the terminal learning objects connected by the identified learning vector. This indicator of deficiency can be output to one of the database servers 104, and can be, for example, stored in the object database of the recipient one of the database servers 104. In some embodiments, this indicator can be provided to one of the data servers 108, and specifically to the content server 108-A.

Figure 18:
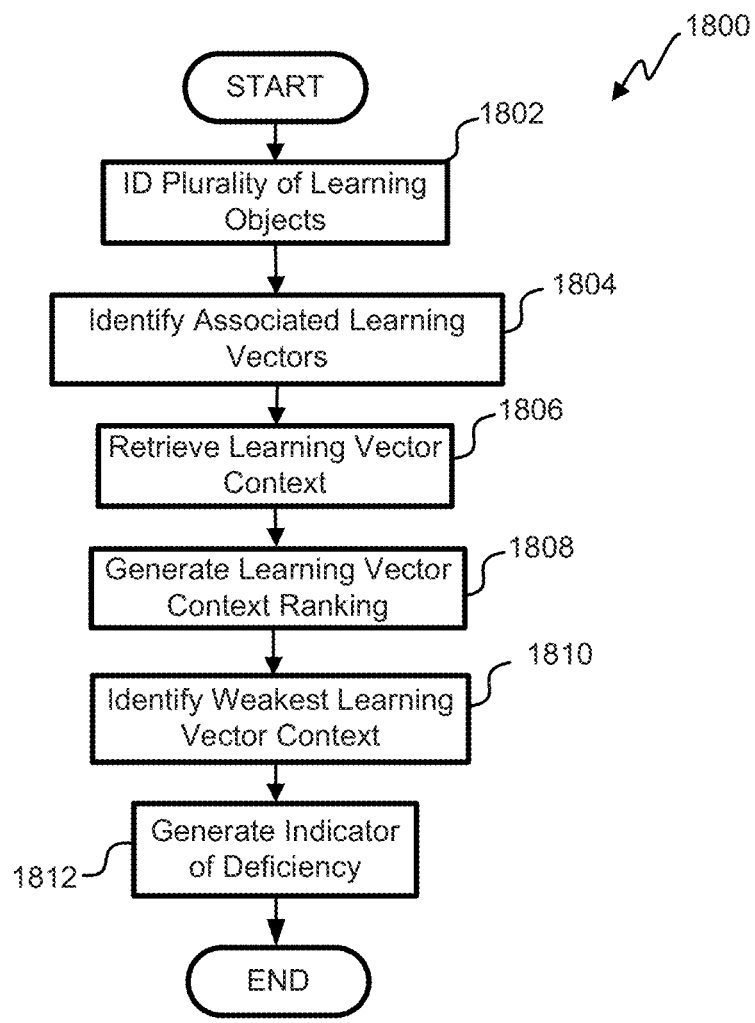
FIG. 18 is a flowchart illustrating one embodiment of a process for identifying a gaming object for improvement via relative ranking.

With reference now to FIG. 18, a flowchart illustrating one embodiment of a process 1800 for optimizing a gaming object is shown. In some embodiments, the process 1800 can be used in connection with the gaming object network 300 to identify gaming objects for optimization, improvement, and/or update. In some embodiments, the process 1800 can be performed by the gaming system 100 and/or a component thereof including, for example, the processor 102 and/or the user device 106. The process begins at block 1802 wherein a plurality of gaming objects is identified. In some embodiments, the plurality of gaming objects can correspond to a set of gaming objects that can include every gaming object within the gaming object network 300, or can include a portion of the gaming objects within the gaming object network 300.

The plurality of gaming objects can be identified in any desired manner. In some embodiments, for example, the plurality of gaming objects can be identified based on association with a subject matter, a skill, a learning ability, a learning style, a gamer, a teacher, or any other desired parameter. In one embodiment, for example, the plurality of gaming objects can be randomly selected from the gaming objects contained within the gaming object network 300. In some embodiments, the processor 102 can identify a plurality of gaming objects by retrieving and using information relating to the gaming objects from the object database 202 and/or the vector database 204.

In some embodiments, identifying the plurality of learning objects can include, for example, identifying the plurality of servers including, for example, database servers 104 and/or data sources 108 that contain the desired learning objects. After the servers storing the desired learning objects are identified, identifying the plurality of learning objects can include outputting a request to the identified servers for the desired learning objects. In response to this request, the identified servers can provide a response such as, for example, providing information relating to the desired learning objects to the server 102 and/or providing the desired learning objects to the server 102.

After the plurality of gaming objects has been identified, the process 1800 proceeds to block 1804 wherein learning vectors associated with the learning objects are identified. In some embodiments, the learning vectors associated with the learning objects can include learning vectors coming to the learning objects and learning vectors going from the learning objects. In some embodiments, the processor 102 can identify the associated learning vectors by retrieving and using information relating to the learning objects from the object database 202 and/or the vector database 204. In some embodiments, this can also include identifying the one or several servers containing the learning vectors and/or information relating thereto. In some embodiments, this can be, for example, the same one or several servers containing the learning objects, and in some embodiments, this can be one or several different servers than those containing the learning objects. In some embodiments, the one or several servers containing the learning vectors can be identified through a series of queries and response, and the information relating to the learning vectors and/or the learning vectors can be provided to the server 102.

After the associated learning vectors have been identified, the process 1800 proceeds to block 1806 wherein learning vector context information is retrieved. In some embodiments, this learning vector context information can identify the effectiveness of the learning vector and/or of the therewith associated learning objects. In some embodiments, this effectiveness can describe the likelihood of the successful traversal of the learning vector by a gamer/student. The learning vector contexts can be retrieved from one or several of the database servers 104, and specifically can be retrieved from one or several databases of the one or several database servers 104 such as, for example, the vector database 204. In some embodiments, the retrieval of the learning vector contexts can comprise one or several queries by the server 102 and/or the user device 106 and one or several responses by the one or several database servers 104. In some embodiments, these one or several responses can comprise the outputting of one or several electric signals containing and/or encoding the learning vector contexts.

After the learning vector contexts have been retrieved, the process 1800 proceeds to block 1808 wherein a learning vector context ranking is generated. In some embodiments, this can include, the aggregation of all of the learning vector contexts, and the comparison of the learning vector contexts such as, for example a comparison of pairs of learning vector contexts. In some embodiments, values indicative of the relative ranking of the learning vector contexts can be associated with some or all of the learning vector contexts. In some embodiments, these values can be outputted from the server 102 to one of the database servers 104 to be stored in one of the databases of the database server such as, for example, the vector database 204.

After a ranking of the learning vector contexts has been generated, the process 1800 proceeds to block 1810, wherein the weakest learning vector context is identified. In some embodiments, the weakest learning vector context is the lowest ranked of the learning vector contexts, and/or is the learning vector context associated with a value indicative of the lowest relative ranking and/or of the greatest weakness.

After the weakest learning vector context has been identified, the process 1800 proceeds to block 1812, wherein an indicator of the deficiency of the learning vector associated with the weakest learning vector context is generated. In some embodiments, this indicator can be, for example, a message identifying one or several inadequate learning vectors. This message can be generated by the processor 102 and/or the user device and can be provided to a user via the user interface 238 and/or be provided to a data source 108 such as an educational resource 108-A. In some embodiments, this indicator of the deficiency of the learning vector can be used as a prompt to modify and/or update the terminal gaming object of the learning vector and/or to evaluate the prerequisite relationship between the incident gaming object in the terminal learning objects connected by the identified learning vector. This indicator of deficiency can be output to one of the database servers 104, and can be, for example, stored in the object database of the recipient one of the database servers 104. In some embodiments, this indicator can be provided to one of the data servers 108, and specifically to the content server 108-A.

Figure 19:
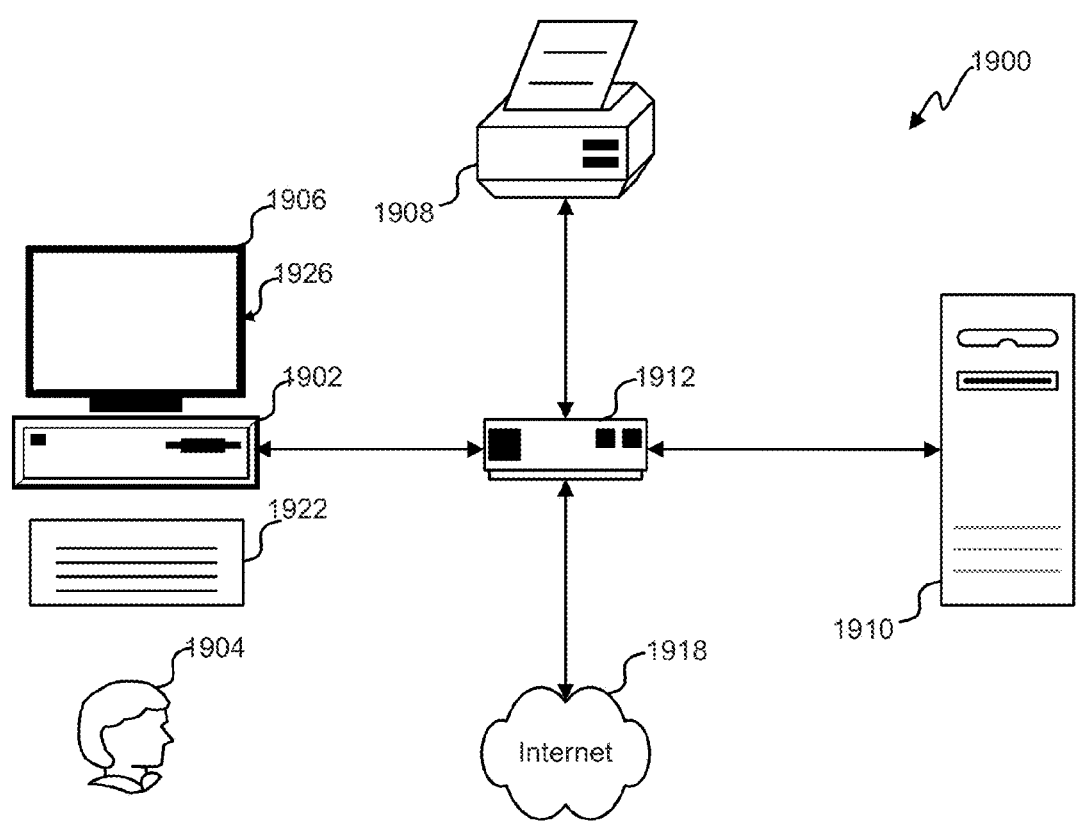
FIG. 19 is a schematic illustration of one embodiment of the computer system.

With reference now to FIG. 19, an exemplary environment with which embodiments may be implemented is shown with a computer system 1900 that can be used by a user 1904 as all or a component of the gaming system 100. The computer system 1900 can include a computer 1902, keyboard 1922, a network router 1912, a printer 1908, and a monitor 1906. The monitor 1906, processor 1902 and keyboard 1922 are part of a computer system 1926, which can be a laptop computer, desktop computer, handheld computer, mainframe computer, etc. The monitor 1906 can be a CRT, flat screen, etc.

A user 1904 can input commands into the computer 1902 using various input devices, such as a mouse, keyboard 1922, track ball, touch screen, etc. If the computer system 1900 comprises a mainframe, a designer 1904 can access the computer 1902 using, for example, a terminal or terminal interface. Additionally, the computer system 1926 may be connected to a printer 1908 and a server 1910 using a network router 1912, which may connect to the Internet 1918 or a WAN.

The server 1910 may, for example, be used to store additional software programs and data. In one embodiment, software implementing the systems and methods described herein can be stored on a storage medium in the server 1910. Thus, the software can be run from the storage medium in the server 1910. In another embodiment, software implementing the systems and methods described herein can be stored on a storage medium in the computer 1902. Thus, the software can be run from the storage medium in the computer system 1926. Therefore, in this embodiment, the software can be used whether or not computer 1902 is connected to network router 1912. Printer 1908 may be connected directly to computer 1902, in which case, the computer system 1926 can print whether or not it is connected to network router 1912.

Figure 20:
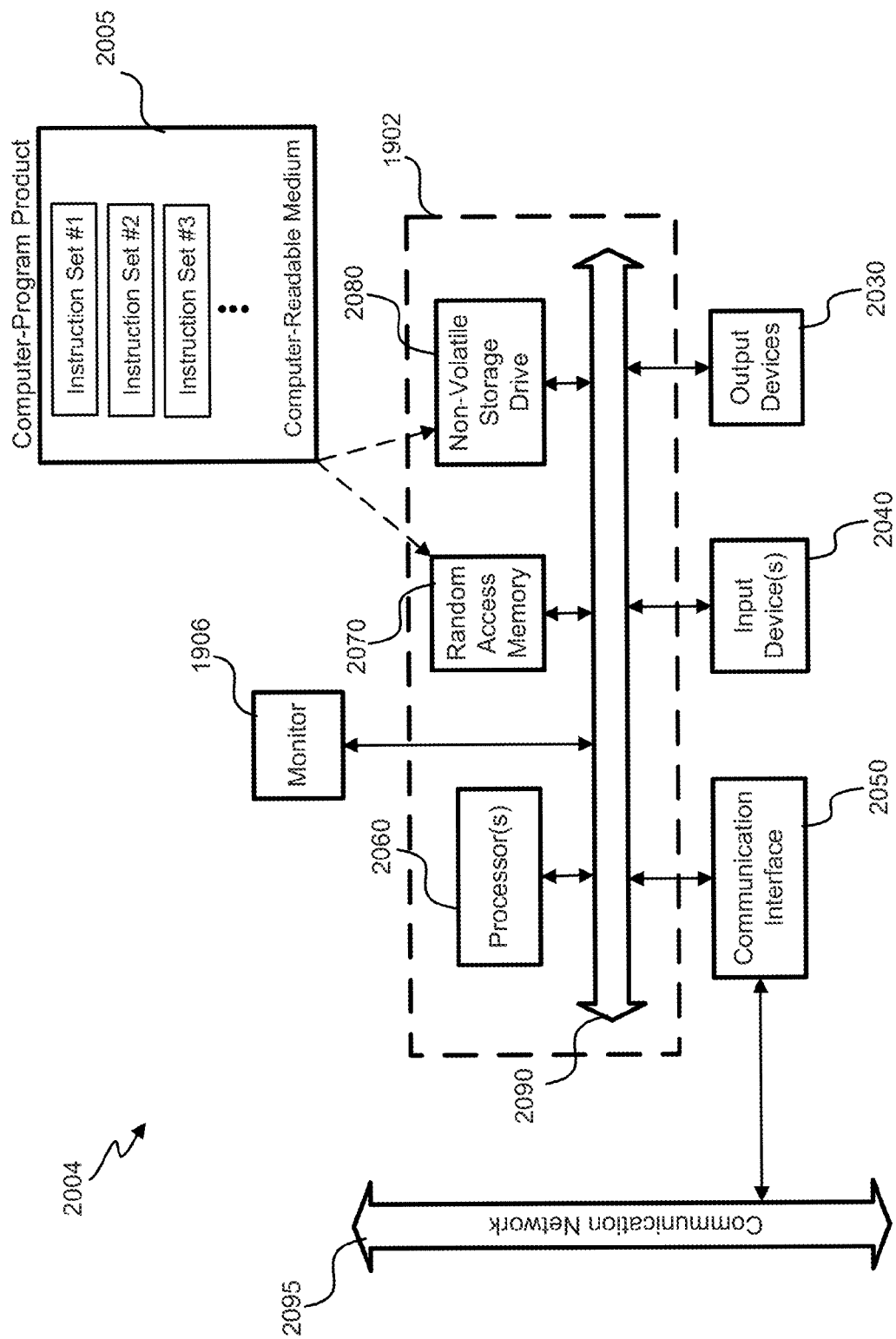
FIG. 20 is a schematic illustration of one embodiment of a special-purpose computer system.

With reference to FIG. 20, an embodiment of a special-purpose computer system 2004 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1926, it is transformed into the special-purpose computer system 2004.

Special-purpose computer system 2004 comprises a computer 1902, a monitor 1906 coupled to computer 1902, one or more additional user output devices 2030 (optional) coupled to computer 1902, one or more user input devices 2040 (e.g., keyboard, mouse, track ball, touch screen) coupled to computer 1902, an optional communications interface 2050 coupled to computer 1902, a computer-program product 2005 stored in a tangible computer-readable memory in computer 1902. Computer-program product 2005 directs system 2004 to perform the above-described methods. Computer 1902 may include one or more processors 2060 that communicate with a number of peripheral devices via a bus subsystem 2090. These peripheral devices may include user output device(s) 2030, user input device(s) 2040, communications interface 2050, and a storage subsystem, such as random access memory (RAM) 2070 and non-volatile storage drive 2080 (e.g., disk drive, optical drive, solid state drive), which are forms of tangible computer-readable memory.

Computer-program product 2005 may be stored in non-volatile storage drive 2080 or another computer-readable medium accessible to computer 1902 and loaded into memory 2070. Each processor 2060 may comprise a microprocessor, such as a microprocessor from Intel® or Advanced Micro Devices, Inc.®, or the like. To support computer-program product 2005, the computer 1902 runs an operating system that handles the communications of product 2005 with the above-noted components, as well as the communications between the above-noted components in support of the computer-program product 2005. Exemplary operating systems include Windows® or the like from Microsoft® Corporation, Solaris® from Oracle®, LINUX, UNIX, and the like.

User input devices 2040 include all possible types of devices and mechanisms to input information to computer system 1902. These may include a keyboard, a keypad, a mouse, a scanner, a digital drawing pad, a touch screen incorporated into the display, audio input devices such as voice recognition systems, microphones, and other types of input devices. In various embodiments, user input devices 2040 are typically embodied as a computer mouse, a trackball, a track pad, a joystick, wireless remote, a drawing tablet, a voice command system. User input devices 2040 typically allow a user to select objects, icons, text and the like that appear on the monitor 1906 via a command such as a click of a button or the like. User output devices 2030 include all possible types of devices and mechanisms to output information from computer 1902. These may include a display (e.g., monitor 1906), printers, non-visual displays such as audio output devices, etc.

Communications interface 2050 provides an interface to other communication networks 2095 and devices and may serve as an interface to receive data from and transmit data to other systems, WANs and/or the Internet 1918. Embodiments of communications interface 2050 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 2050 may be coupled to a computer network, to a FireWire® bus, or the like. In other embodiments, communications interface 2050 may be physically integrated on the motherboard of computer 1902, and/or may be a software program, or the like.

RAM 2070 and non-volatile storage drive 2080 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 2070 and non-volatile storage drive 2080 may be configured to store the basic programming and data constructs that provide the functionality of various embodiments of the present invention, as described above.

Software instruction sets that provide the functionality of the present invention may be stored in RAM 2070 and non-volatile storage drive 2080. These instruction sets or code may be executed by the processor(s) 2060. RAM 2070 and non-volatile storage drive 2080 may also provide a repository to store data and data structures used in accordance with the present invention. RAM 2070 and non-volatile storage drive 2080 may include a number of memories including a main random access memory (RAM) to store of instructions and data during program execution and a read-only memory (ROM) in which fixed instructions are stored. RAM 2070 and non-volatile storage drive 2080 may include a file storage subsystem providing persistent (non-volatile) storage of program and/or data files. RAM 2070 and non-volatile storage drive 2080 may also include removable storage systems, such as removable flash memory.

Bus subsystem 2090 provides a mechanism to allow the various components and subsystems of computer 1902 communicate with each other as intended. Although bus subsystem 2090 is shown schematically as a single bus, alternative embodiments of the bus subsystem may utilize multiple busses or communication paths within the computer 1902.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for identifying a deficient gaming object to a non-gaming user and for prompting the non-gaming user to modify the gaming object, the system comprising:
   a plurality of database servers, wherein the plurality of database servers comprise:
      a plurality of gaming objects comprising an aggregation of content associated with an assessment, wherein the plurality of gaming objects are configured for providing to a gamer for development and assessment of at least one skill;
      information associated with the gaming objects, wherein the information identifies an aspect of the therewith associated gaming object;
   a processor configured to:
      receive a plurality of user inputs from a plurality of user devices corresponding to the traversal of a plurality of gaming vectors associated with at least some of the plurality gaming objects, wherein each of the plurality of gaming vectors connects two of the some of the plurality of gaming objects and identifies a prerequisite relationship between the connected two of the plurality of gaming objects;
      automatically identify a set of gaming objects comprising at least some of the plurality of gaming objects;

automatically output a query to at least one of the plurality of database servers requesting information relating to the set of gaming objects from the at least one of the plurality of database servers;

receive an input from the at least one of the plurality of database servers, wherein the input comprises information relating to the set of gaming objects;

automatically identify a set of gaming vectors from the information relating to the set of gaming objects wherein each of the gaming vectors in the set of gaming vectors comprises a direction identifying the prerequisite relationship and a strength, wherein the strength of the gaming vector is generated from an aggregate of binary indicators based on a gamer experience with the gaming vector, wherein the strength of the gaming vector does not represent a gamer skill level, wherein the plurality of gaming vectors are continuously updated by the processor based on signals received from one or several user devices identifying successes and failures in traversing the plurality of gaming vectors;

automatically retrieve a strength threshold value, wherein the strength threshold value indicates a minimum acceptable strength of one gaming vector;

automatically compare the strength of at least some of the set of gaming vectors to the strength threshold value;

assign a value to the gaming vectors of the plurality of gaming vectors according to a Boolean function, wherein a first value is assigned to one of the gaming vectors of the plurality of gaming vectors if the strength of the one of the gaming vectors of the plurality of gaming vectors exceeds the strength threshold value, and a second value is assigned to one of the gaming vectors of the plurality of gaming vectors if the strength of the one of the gaming vectors of the plurality of gaming vectors does not exceed the strength threshold value, and automatically output a message via a wireless network indicating a deficiency in a gaming object to a supervisor device when the gaming vector associated with the gaming object is assigned the second value, wherein the message activates a user interface of the supervisor device to provide the indication of the deficiency in the gaming object to the user via a screen of the supervisor device.

2. The system of claim 1, wherein identifying a plurality of gaming objects comprises identifying the plurality of servers containing the plurality of gaming objects.

3. The system of claim 2, wherein the plurality of gaming objects comprises a first gaming object stored on a first server, and a second gaming object stored on a second server.

4. The system of claim 3, wherein the first gaming object is stored in a first database of the first server and the second gaming object is stored in a second database of the second server.

5. The system of claim 4, wherein the processor is further configured to identify gaming vectors assigned the second value.

6. The system of claim 5, wherein the processor is further configured to relatively rank the plurality of gaming vectors.

7. The system of claim 6, wherein the processor relatively ranks the plurality of gaming vectors according to the degree to which gamers successfully traverse the plurality of gaming vectors.

8. The system of claim 7, wherein the strength threshold value identifies a minimum acceptable relative rank.

9. A system for identifying a deficient gaming object to a non-gaming user and for prompting the non-gaming user to modify the gaming object, the system comprising:

a plurality of database servers, wherein the plurality of database servers comprise:
  a plurality of gaming objects comprising an aggregation of content associated with an assessment, wherein the plurality of gaming objects are configured for providing to a gamer for development and assessment of at least one skill;
  information associated with the gaming objects, wherein the information identifies an aspect of the therewith associated gaming object;

a plurality of user devices, wherein each of the plurality of user devices is configured to receive one of the plurality of gaming objects via a communication network and provide the one of the plurality of gaming objects to a user of the each of the plurality of user devices via a user interface, wherein each of the plurality of user devices is configured to receive a user input in response to the provided one of the plurality of gaming objects via the user interface and to transmit the response via the communication network;

a processor configured to:
  receive a plurality of user inputs from the plurality of user devices, wherein the user inputs correspond to the traversal of a plurality of gaming vectors associated with at least some of the plurality gaming objects, wherein each of the plurality of gaming vectors connects two of the some of the plurality of gaming objects and identifies a prerequisite relationship between the connected two of the plurality of gaming objects;
  continuously updating the plurality of gaming vectors based on the received plurality of user inputs, wherein the received plurality of user inputs identify successes and failures in traversing the plurality of gaming vectors;
  identify a set of gaming objects comprising at least some of the plurality of gaming objects;
  request a set of gaming vectors associated with the set of gaming objects from at least one of the plurality of database servers, wherein each of the gaming vectors in the set of gaming vectors comprises a direction identifying the prerequisite relationship and a gaming vector strength, wherein the gaming vector strength of the gaming vector is generated from an aggregate of binary indicators based on prior gamer traversal of the gaming vector, and wherein the gaming vector strength of the gaming vector does not represent a gamer skill level;
  receive the set of gaming vectors associated with the set of gaming objects from the at least one of the plurality of database servers;
  retrieve a strength threshold value, wherein the strength threshold value indicates a minimum acceptable gaming vector strength;
  compare the gaming vector strength of at least some of the set of gaming vectors to the strength threshold value;
  assign a value to the gaming vectors of the plurality of gaming vectors according to a Boolean function, wherein a first value is assigned to one of the gaming vectors of the plurality of gaming vectors when the gaming vector strength of the one of the gaming vectors of the plurality of gaming vectors exceeds the strength threshold value, and wherein a second value is assigned to one of the gaming vectors of the plurality of gaming vectors when the gaming vector strength of the one of the gaming vectors of the plurality of gaming vectors does not exceed the strength threshold value, and output a message via the communication network indicating a deficiency in a gaming object to a supervisor device when the gaming vector associated with the gaming object is assigned the second value, wherein the message activates a user interface of the supervisor device to provide the indication of the deficiency in the gaming object to the user via a screen of the supervisor device; and a supervisor device configured to receive the message indicating the deficiency in the gaming object from the processor via the communication network, wherein the user interface of the supervisor device is activated when the message is received.

* * * * *